(12) United States Patent
Hrastar et al.

(10) Patent No.: US 7,324,804 B2
(45) Date of Patent: Jan. 29, 2008

(54) SYSTEMS AND METHODS FOR DYNAMIC SENSOR DISCOVERY AND SELECTION

(75) Inventors: Scott E. Hrastar, Duluth, GA (US); Issam Nadim Haddad, Alpharetta, GA (US)

(73) Assignee: AirDefense, Inc., Alpharetta, GA (US)

( * ) Notice: Subject to any disclaimer, the term of this patent is extended or adjusted under 35 U.S.C. 154(b) by 0 days.

(21) Appl. No.: 10/773,915

(22) Filed: Feb. 6, 2004

(65) Prior Publication Data
US 2004/0218602 A1 Nov. 4, 2004

Related U.S. Application Data

(60) Provisional application No. 60/464,464, filed on Apr. 21, 2003.

(51) Int. Cl.
*H04M 1/66* (2006.01)

(52) U.S. Cl. ............... 455/410; 455/456.1; 455/41.2; 455/404.2; 455/404.1; 455/424; 455/425; 455/423; 370/447; 370/461; 726/22; 726/25; 726/27

(58) Field of Classification Search ........... 455/410, 455/411, 426.2, 425, 404.2, 404.1, 41.2, 456.1, 455/424, 423; 709/228; 370/447, 461, 462, 370/216, 477; 726/22.25, 27
See application file for complete search history.

(56) References Cited

U.S. PATENT DOCUMENTS 5,077,753 A    12/1991  Grau, Jr. et al.
5,231,634 A    7/1993   Giles et al.
5,237,614 A    8/1993   Weiss
5,339,316 A    8/1994   Diepstraten
5,393,965 A    2/1995   Bravman et al.
5,487,069 A    1/1996   O'Sullivan et al.
5,577,209 A    11/1996  Boyle et al.
5,646,389 A    7/1997   Bravman et al.
5,666,662 A    9/1997   Shibuya (Continued)

FOREIGN PATENT DOCUMENTS

WO        WO 98/59428      12/1998

(Continued)

OTHER PUBLICATIONS

*IBM unlocks wireless security services*, IT WORLD.COM (Date Alleged: Oct. 9, 2001) http://www.itworld.com/Net/2629/IDGO11009IBMsecurity (Accessed from Google's cache: Apr. 10, 2003).

(Continued)

*Primary Examiner*—Joseph Feild
*Assistant Examiner*—Randy Peaches
(74) *Attorney, Agent, or Firm*—Fish & Richardson P.C.

(57) ABSTRACT

This application is directed to systems and methods for managing wireless network sensors. A plurality of wireless network sensors in the network region are identified. For each of the network sensors in the plurality of wireless network sensors, a designation of primary or secondary with respect to the network region is selected. A collection agent for the selected network region is determined. An indicator of the determined collection agent is communicated to the plurality of wireless network sensors in the network region. Scan data for the network region is received from the collection agent.

29 Claims, 30 Drawing Sheets

U.S. PATENT DOCUMENTS

| | | | |
|---|---|---|---|
| 5,737,328 | A | 4/1998 | Norman et al. |
| 5,745,479 | A | 4/1998 | Burns et al. |
| 5,745,483 | A | 4/1998 | Nakagawa et al. |
| 5,768,312 | A | 6/1998 | Imamura |
| 5,781,857 | A | 7/1998 | Hwang et al. |
| 5,787,077 | A | 7/1998 | Kuehnel et al. |
| 5,796,942 | A | 8/1998 | Esbensen |
| 5,809,060 | A | 9/1998 | Cafarella et al. |
| 5,825,817 | A | 10/1998 | Tanaka et al. |
| 5,844,900 | A | 12/1998 | Hong et al. |
| 5,866,888 | A | 2/1999 | Bravman et al. |
| 5,870,666 | A | 2/1999 | Tanaka et al. |
| 5,875,179 | A | 2/1999 | Tikalsky |
| 5,896,499 | A | 4/1999 | McKelvey |
| 5,903,848 | A | 5/1999 | Takahashi |
| 5,913,174 | A | 6/1999 | Casarez et al. |
| 5,919,258 | A | 7/1999 | Kayashima et al. |
| 5,940,591 | A | 8/1999 | Boyle et al. |
| 5,948,055 | A | 9/1999 | Pulsipher et al. |
| 5,953,652 | A | 9/1999 | Amin et al. |
| 5,987,609 | A | 11/1999 | Hasebe |
| 6,006,090 | A | 12/1999 | Coleman et al. |
| 6,058,482 | A | 5/2000 | Liu |
| 6,067,297 | A | 5/2000 | Beach |
| 6,070,244 | A | 5/2000 | Orchier et al. |
| 6,104,712 | A | 8/2000 | Robert et al. |
| 6,119,230 | A | 9/2000 | Carter |
| 6,141,778 | A | 10/2000 | Kane et al. |
| 6,145,083 | A | 11/2000 | Shaffer et al. |
| 6,151,357 | A | 11/2000 | Jawahar et al. |
| 6,158,010 | A | 12/2000 | Moriconi et al. |
| 6,178,512 | B1 | 1/2001 | Fifield |
| 6,185,689 | B1 | 2/2001 | Todd, Sr. et al. |
| 6,188,681 | B1 | 2/2001 | Vesuna |
| 6,202,157 | B1 | 3/2001 | Brownlie et al. |
| 6,272,129 | B1 | 8/2001 | Dynarski et al. |
| 6,272,172 | B1 | 8/2001 | Deshpande et al. |
| 6,282,546 | B1 | 8/2001 | Gleichauf et al. |
| 6,289,214 | B1 | 9/2001 | Backstrom |
| 6,292,508 | B1 | 9/2001 | Hong et al. |
| 6,301,668 | B1 | 10/2001 | Gleichauf et al. |
| 6,301,699 | B1 | 10/2001 | Hollander et al. |
| 6,304,973 | B1 | 10/2001 | Williams |
| 6,317,829 | B1 | 11/2001 | Van Oorschot |
| 6,320,948 | B1 | 11/2001 | Heilmann et al. |
| 6,324,647 | B1 | 11/2001 | Bowman-Amuah |
| 6,324,656 | B1 | 11/2001 | Gleichauf et al. |
| 6,330,244 | B1 | 12/2001 | Swartz et al. |
| 6,363,477 | B1 | 3/2002 | Fletcher et al. |
| 6,400,752 | B1 | 6/2002 | Suzuki et al. |
| 6,404,772 | B1 | 6/2002 | Beach et al. |
| 6,411,608 | B2 | 6/2002 | Sharony |
| 6,453,159 | B1 | 9/2002 | Lewis |
| 6,453,345 | B2 | 9/2002 | Trcka et al. |
| 6,466,608 | B1 | 10/2002 | Hong et al. |
| 6,470,384 | B1 | 10/2002 | O'Brien et al. |
| 6,473,449 | B1 | 10/2002 | Cafarella et al. |
| 6,477,198 | B1 | 11/2002 | Gumm |
| 6,484,029 | B2 | 11/2002 | Hughes et al. |
| 6,487,666 | B1 | 11/2002 | Shanklin et al. |
| 6,499,107 | B1 | 12/2002 | Gleichauf et al. |
| 6,501,951 | B2 | 12/2002 | Moore |
| 6,507,864 | B1 | 1/2003 | Klein et al. |
| 6,522,689 | B1 | 2/2003 | Heinrich |
| 6,539,207 | B1 | 3/2003 | del Castillo et al. |
| 6,539,428 | B2 | 3/2003 | Davies |
| 6,674,403 | B2 | 1/2004 | Gray et al. |
| 6,697,337 | B1 | 2/2004 | Cafarelli et al. |
| 6,766,165 | B2 | 7/2004 | Sharma et al. |
| 6,799,047 | B1 | 9/2004 | Bahl et al. |
| 6,874,089 | B2 | 3/2005 | Dick et al. |
| 6,910,135 | B1 | 6/2005 | Grainger |
| 6,920,494 | B2 | 7/2005 | Heitman et al. |
| 6,934,298 | B2 * | 8/2005 | Bentley ..................... 370/447 |
| 2001/0027107 | A1 | 10/2001 | Shinozaki et al. |
| 2001/0030956 | A1 | 10/2001 | Chillariga et al. |
| 2001/0038626 | A1 | 11/2001 | Dynarski et al. |
| 2001/0039579 | A1 | 11/2001 | Trcka et al. |
| 2002/0021745 | A1 | 2/2002 | Negus |
| 2002/0029288 | A1 | 3/2002 | Dobbins et al. |
| 2002/0032871 | A1 | 3/2002 | Malan et al. |
| 2002/0035699 | A1 | 3/2002 | Crosbie |
| 2002/0044533 | A1 | 4/2002 | Bahl et al. |
| 2002/0059434 | A1 * | 5/2002 | Karaoguz et al. ........... 709/228 |
| 2002/0060994 | A1 | 5/2002 | Kovacs et al. |
| 2002/0060995 | A1 | 5/2002 | Cervello et al. |
| 2002/0061031 | A1 | 5/2002 | Sugar et al. |
| 2002/0066034 | A1 | 5/2002 | Schlossberg et al. |
| 2002/0072329 | A1 | 6/2002 | Bandeira et al. |
| 2002/0083343 | A1 | 6/2002 | Crosbie et al. |
| 2002/0087882 | A1 | 7/2002 | Schneier et al. |
| 2002/0090089 | A1 | 7/2002 | Branigan et al. |
| 2002/0090952 | A1 | 7/2002 | Cantwell |
| 2002/0094777 | A1 | 7/2002 | Cannon et al. |
| 2002/0101837 | A1 | 8/2002 | Bender et al. |
| 2002/0112047 | A1 | 8/2002 | Kushwaha et al. |
| 2002/0112185 | A1 | 8/2002 | Hodges |
| 2002/0129138 | A1 | 9/2002 | Carter |
| 2002/0138755 | A1 | 9/2002 | Ko |
| 2002/0147920 | A1 | 10/2002 | Mauro |
| 2002/0160769 | A1 | 10/2002 | Gray |
| 2002/0161755 | A1 | 10/2002 | Moriarty |
| 2002/0174364 | A1 | 11/2002 | Nordman et al. |
| 2002/0176437 | A1 | 11/2002 | Busch et al. |
| 2002/0178383 | A1 | 11/2002 | Hrabik et al. |
| 2002/0181417 | A1 | 12/2002 | Malhotra et al. |
| 2003/0009696 | A1 | 1/2003 | Bunker et al. |
| 2003/0021254 | A1 | 1/2003 | Fukuda |
| 2003/0026198 | A1 | 2/2003 | Diepstraten et al. |
| 2003/0027550 | A1 * | 2/2003 | Rockwell ..................... 455/410 |
| 2003/0036404 | A1 | 2/2003 | Adachi et al. |
| 2003/0048770 | A1 | 3/2003 | Proctor, Jr. |
| 2003/0060207 | A1 | 3/2003 | Sugaya et al. |
| 2003/0061344 | A1 | 3/2003 | Monroe |
| 2003/0061506 | A1 | 3/2003 | Cooper et al. |
| 2003/0063592 | A1 | 4/2003 | Seki et al. |
| 2003/0064720 | A1 | 4/2003 | Valins et al. |
| 2003/0065934 | A1 | 4/2003 | Angelo et al. |
| 2003/0070084 | A1 | 4/2003 | Satomaa et al. |
| 2003/0084323 | A1 | 5/2003 | Gales |
| 2003/0088789 | A1 | 5/2003 | Fenton et al. |
| 2003/0095520 | A1 | 5/2003 | Aalbers et al. |
| 2003/0096577 | A1 | 5/2003 | Heinonen et al. |
| 2003/0096607 | A1 | 5/2003 | Taylor |
| 2003/0100308 | A1 | 5/2003 | Rusch |
| 2003/0105976 | A1 | 6/2003 | Copeland, III |
| 2003/0108016 | A1 | 6/2003 | Bonta |
| 2003/0110398 | A1 | 6/2003 | Dacier et al. |
| 2003/0117966 | A1 | 6/2003 | Chen |
| 2003/0117985 | A1 | 6/2003 | Fujii et al. |
| 2003/0117986 | A1 | 6/2003 | Thermond et al. |
| 2003/0119526 | A1 | 6/2003 | Edge |
| 2003/0120821 | A1 | 6/2003 | Thermond et al. |
| 2003/0123420 | A1 | 7/2003 | Sherlock |
| 2003/0125035 | A1 | 7/2003 | Khafizov et al. |
| 2003/0126258 | A1 | 7/2003 | Conkright et al. |
| 2003/0135762 | A1 | 7/2003 | Macaulay |
| 2003/0140246 | A1 | 7/2003 | Kammer et al. |
| 2003/0149888 | A1 | 8/2003 | Yadav |
| 2003/0161341 | A1 | 8/2003 | Wu et al. |
| 2003/0174680 | A1 | 9/2003 | Kuan et al. |
| 2003/0185244 | A1 | 10/2003 | Wu et al. |
| 2003/0189908 | A1 | 10/2003 | Kuan et al. |
| 2003/0192055 | A1 | 10/2003 | Aoki et al. |

| | | | |
|---|---|---|---|
| 2003/0196115 | A1 | 10/2003 | Karp |
| 2003/0200455 | A1 | 10/2003 | Wu |
| 2003/0217289 | A1 | 11/2003 | Ammon et al. |
| 2003/0221006 | A1 | 11/2003 | Kuan et al. |
| 2003/0224797 | A1 | 12/2003 | Kuan et al. |
| 2004/0003285 | A1 | 1/2004 | Whelan et al. |
| 2004/0068668 | A1 | 4/2004 | Lor et al. |
| 2004/0078598 | A1 | 4/2004 | Barber et al. |
| 2004/0102192 | A1 | 5/2004 | Serceki |
| 2004/0103307 | A1 | 5/2004 | Raphaeli et al. |
| 2004/0107219 | A1 | 6/2004 | Rosenberger |
| 2004/0136318 | A1 | 7/2004 | Bentley |
| 2004/0162995 | A1 | 8/2004 | Muaddi et al. |

FOREIGN PATENT DOCUMENTS

| | | |
|---|---|---|
| WO | WO 01/43467 A1 | 6/2001 |
| WO | WO 02/058346 A2 | 7/2002 |
| WO | WO 02/058346 A3 | 7/2002 |
| WO | WO 02/097560 A2 | 12/2002 |
| WO | WO 03/021851 | 3/2003 |
| WO | WO 03/079708 A1 | 9/2003 |
| WO | WO 03/084255 A1 | 10/2003 |
| WO | WO 03/085544 A1 | 10/2003 |
| WO | WO 03/088547 A2 | 10/2003 |
| WO | WO 03/088687 | 10/2003 |

OTHER PUBLICATIONS

*IBM Research's Wireless Security Auditor One-Step Ahead of Hackers*, MOBILEINFO.COM, Issue 2001-30 (Date Alleged: Jul. 2001) (Alleged Update: Jul. 25, 2001) http://www.mobileinfo.com/News_2001/Issue30/IBM_Auditor.htm (Accessed from Google's cache: Apr. 10, 2003).

*IBM Debuts First Self-Diagnostic Wireless Security Tool on Linux*, LWN.NET, (Date Alleged: Jun. 17, 2002) http://www.lwn.net/Articles/2661 (Accessed: Apr. 10, 2003).

Losi, Stephanie, *IBM Steps Up Wireless Security*, NewsFactor Network (Date Alleged: Oct. 8, 2001) http://www.newsfactor.com/perl/story/14012.html (Accessed: Apr. 10, 2003).

*IBM extends its Wireless Security Auditor with more autonomic features*, Serverworld: Online News (Date Alleged: Jun. 2002) http://www.serverworldmagazine.com/newsflash2/2002/06/19_ibmdwsa.shtml (Accessed: Apr. 10, 2003).

Schwartz, Ephraim, *IBM Offers a Peek at Self-Healing PCS: Autonomic computing initiative will lead to self-configuring desktops and notebooks and greater wireless security*.(Date Alleged: Nov. 19, 2002) http://www.pcworld.com/resource/printable/article/0,aid,107069.asp (Accessed from Google's cache: Apr. 10, 2003).

*IBM initiative addressed wireless security*, M2 PRESWIRE (Date alleged: Oct. 9, 2001) http://www.lexis.com/research (Accessed: Apr. 10, 2003).

Manecksha, Ferina, *IBM to focus on "Think" strategy*, News Straits Times-Management Times (Date Alleged: Jan. 30, 2003) http://www.lexis.com/research (Accessed: Apr. 10, 2003).

Schwartz, Ephraim, *IBM unveils autonomic computing on notebooks, desktops*, Infor World Daily News (Dated Alleged: Nov. 19, 2002) http://www.lexis.com/research (Accessed: Apr. 10, 2003).

Toomgum, Sirvish, "Think" Big Blue, Nation, WorldSources, Inc. (Date Alleged: Nov. 19, 2002) http://www.lexis.com/research (Accessed: Apr. 10, 2003).

Morochove, Richard, *Why Dell lets competitors do the heavy lifting*, Toronto Star (Date Alleged: Nov. 11, 2002) http://www.lexis.com/research (Accessed: Apr. 10, 2003).

*Wireless Security Auditor (WSA)*, IBM Security Research http://www.research.ibm.com/gsal/wsa/ (Accessed: Apr. 10, 2003).

*Distributed Wireless Security Auditor*, IBM Research http://www.research.ibm.com/gsal/dwsa/ (Accessed: Apr. 10, 2003).

*WhereLAN Location Sensor Locating Access Point*, Wherenet U.S.A. (2002), no month listed.

Article entitled "A Short Tutorial on Wireless LANs and IEEE 802.11" by Lough et al., printed on May 27, 2002 in *The IEEE Computer Society's Student Newsletter*, Summer 1997. vol. 5, No. 2 (Accessed Feb. 6, 2004).

* cited by examiner

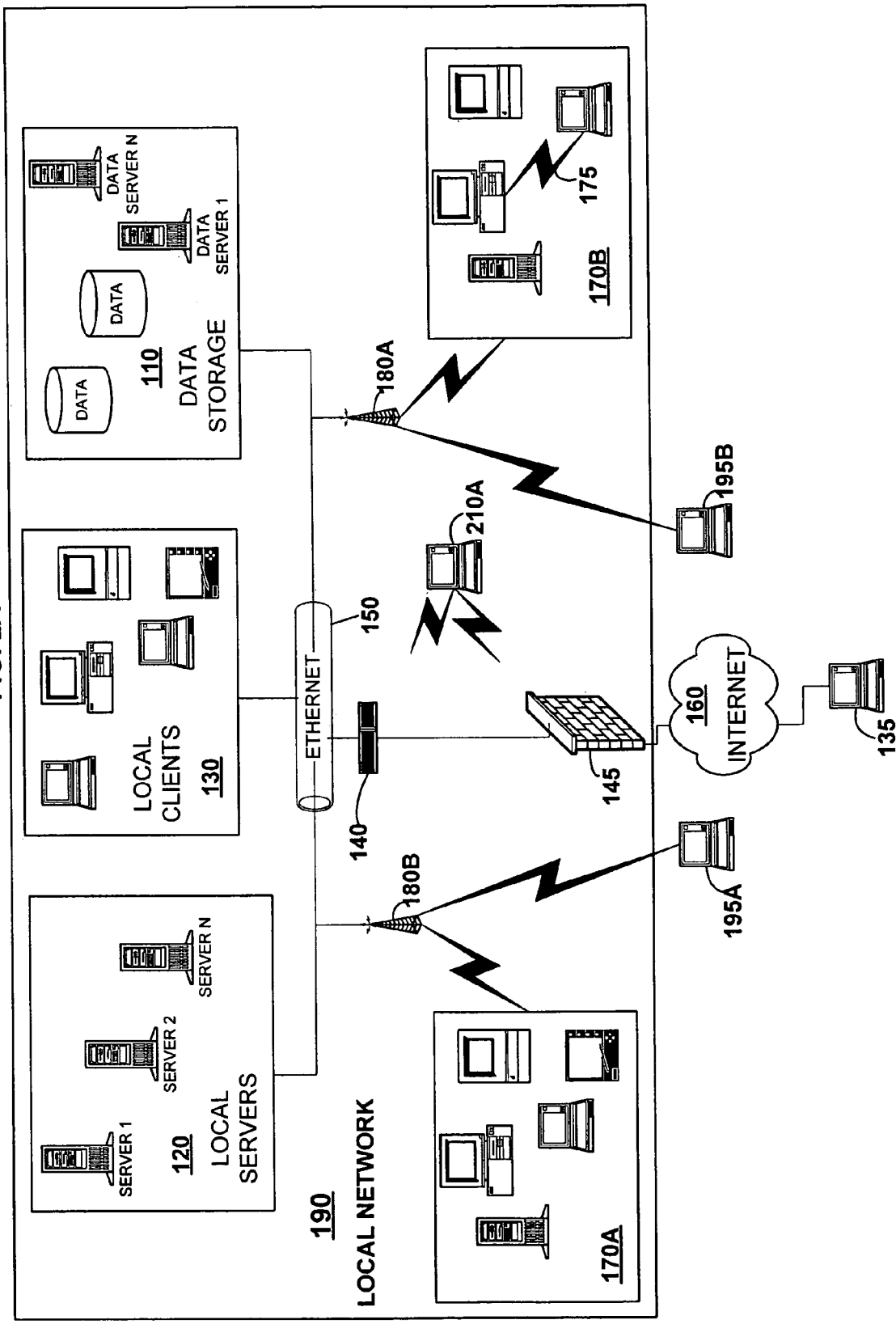

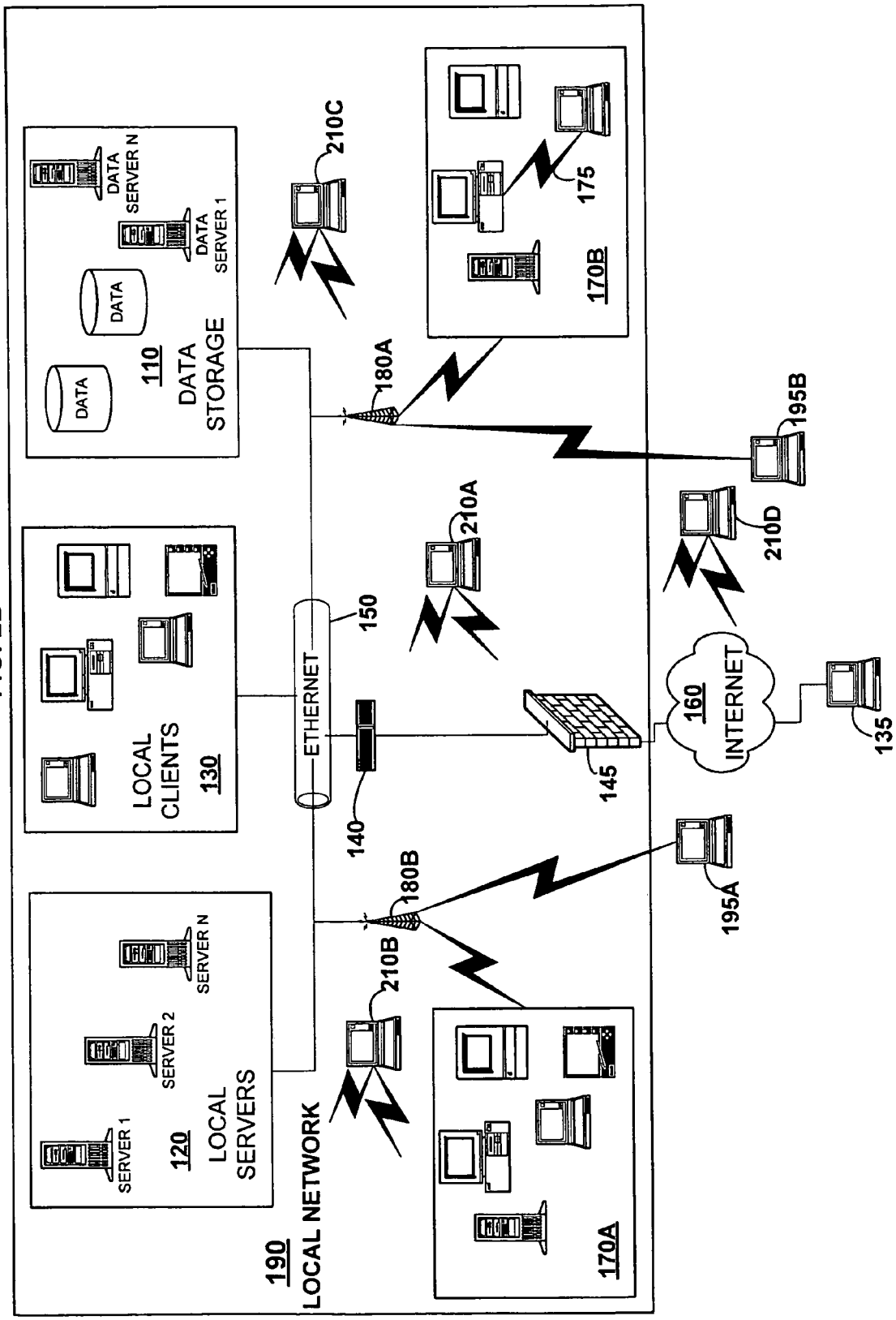

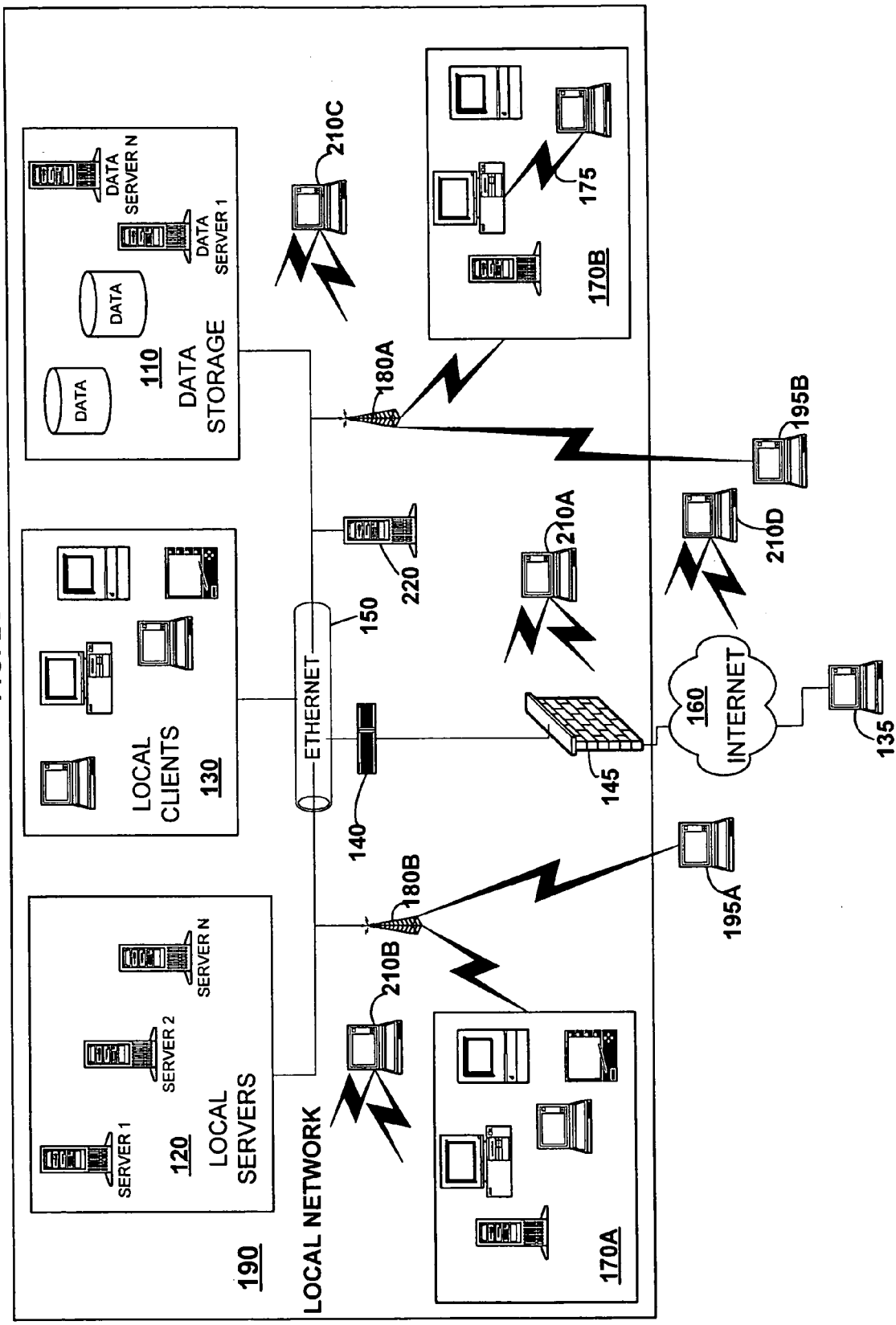

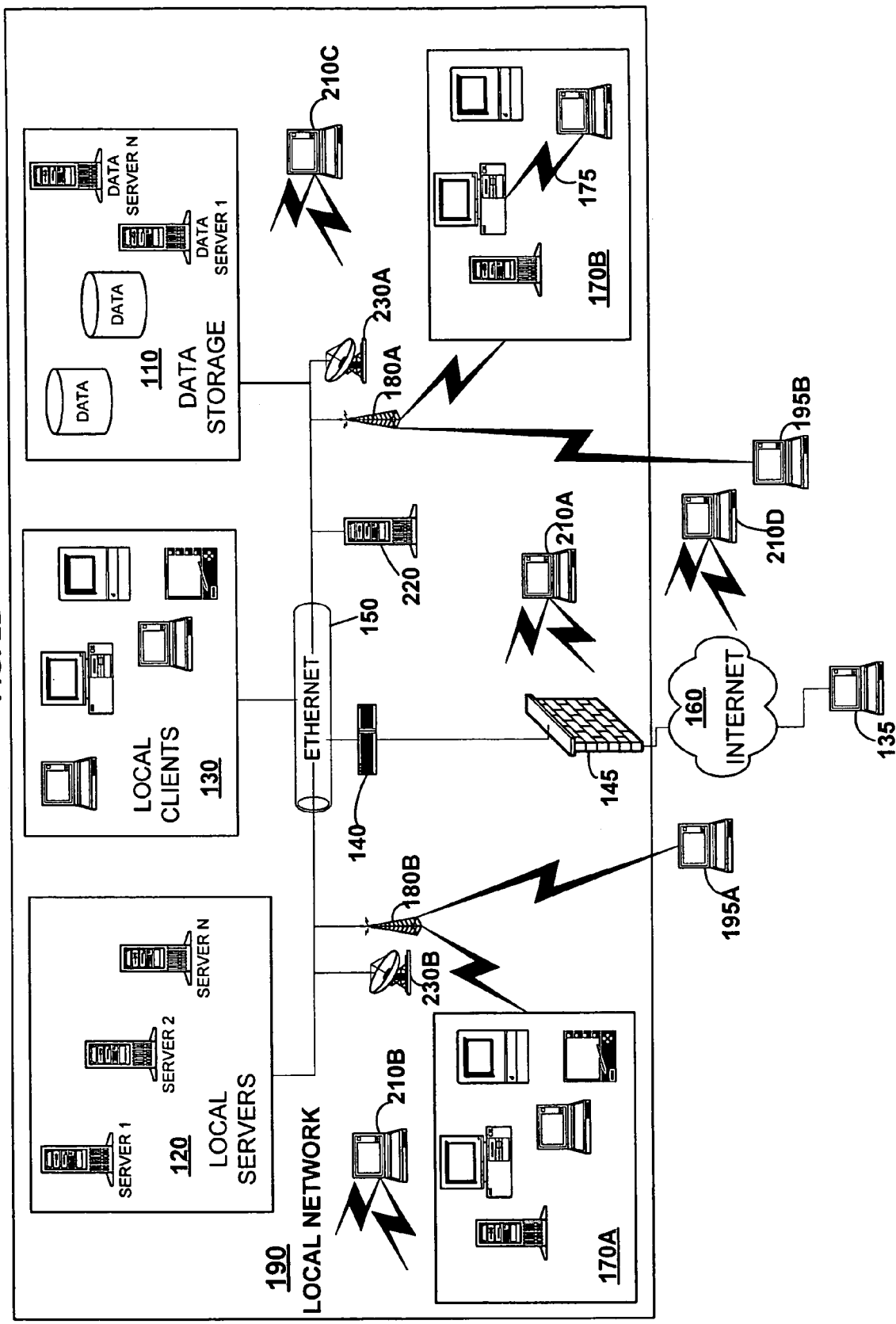

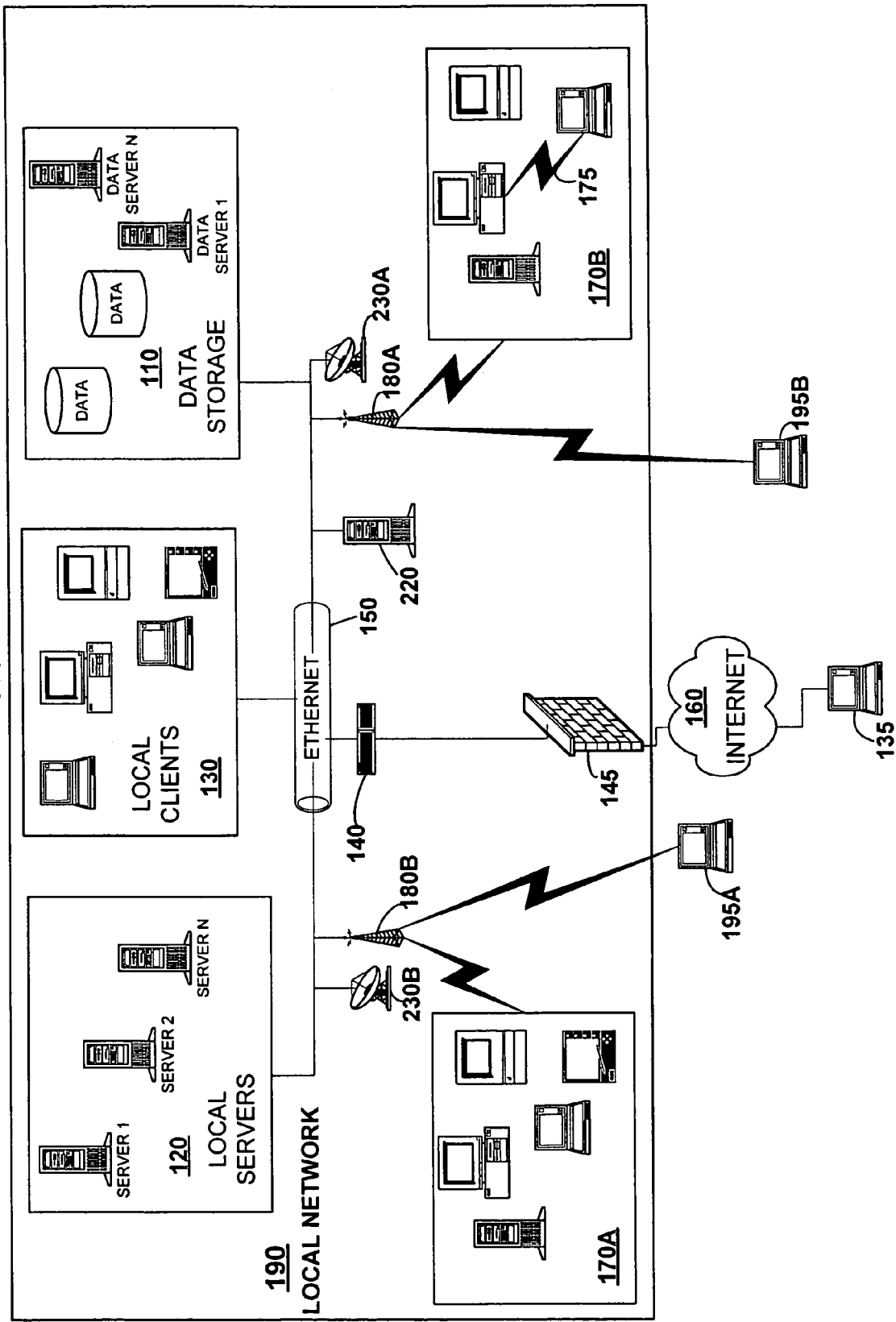

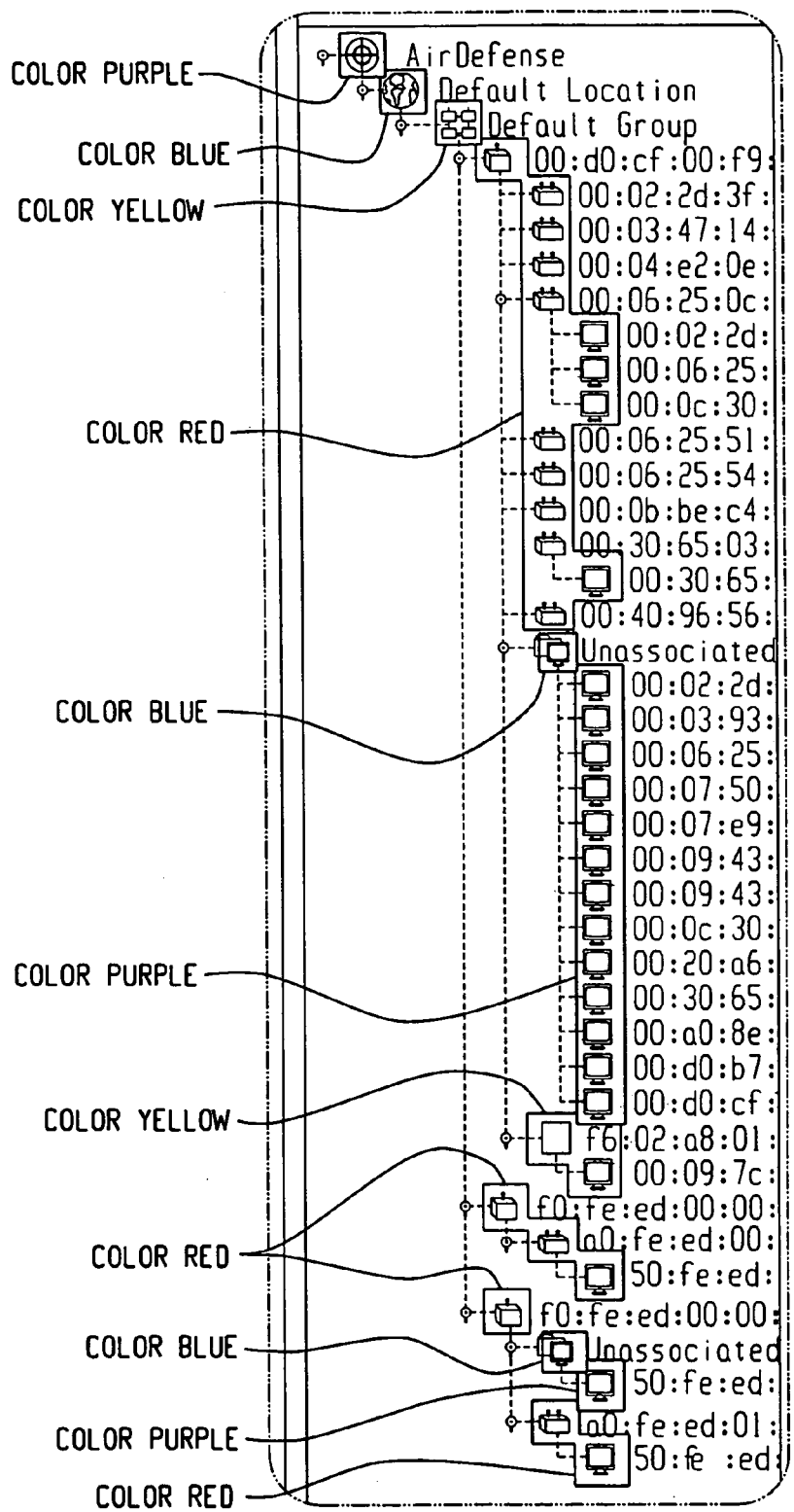
Fig. 12A1

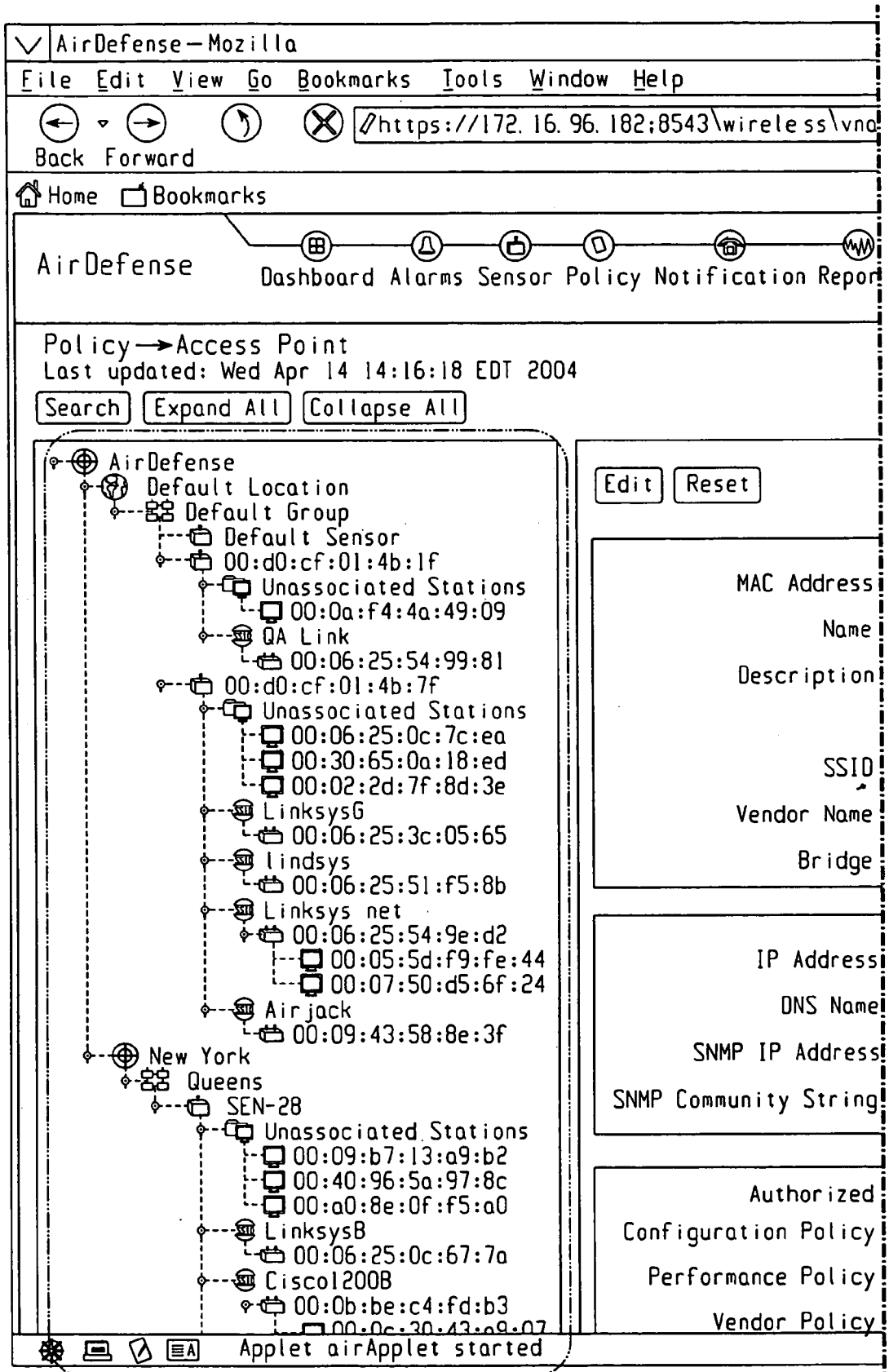
Fig. 13A1

Fig. 13A2

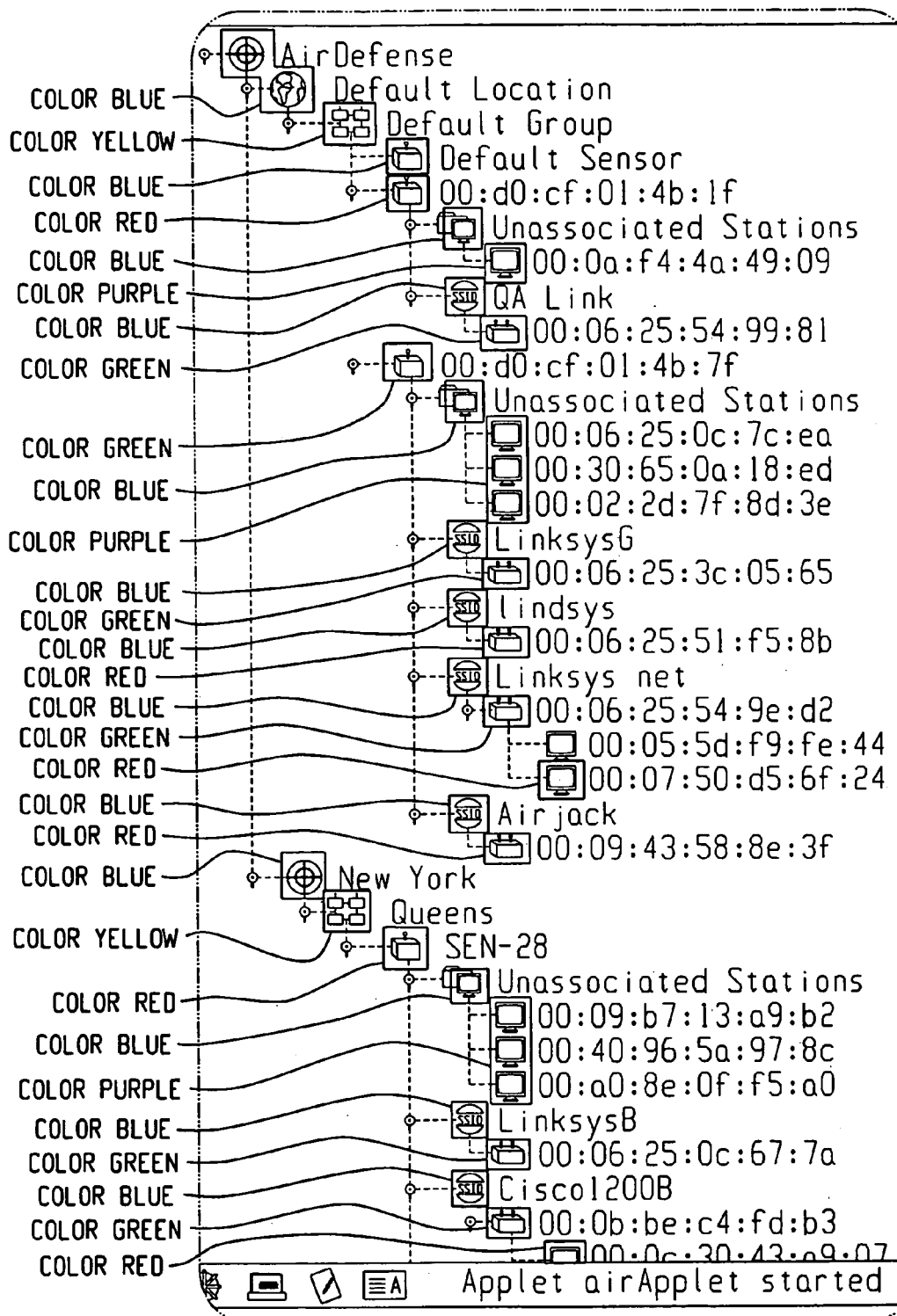
Fig. 13A1a

MATCH TO FIG.13B2

Active Policy Management

Access Point Settings

Model Name: "Cisco 350 Series AP 11.21"
MAC Address: 00:40:96:56:d6:2a

Fixed Channel: 5

Allowed Authentication Modes: ☑ Open  ☑ Shared Key  ☑ LEAP
EAP Authentication Required: ☐ Open  ☑ Shared Key
Allowed WEP Modes: ○ Off  ○ On  ● Both
Allow SSID In Beacon: ● Yes  ○ No
Allowed Rates: ☐ 1 Mbps  ☐ 2 Mbps  ☑ 5.5 Mbps  ☑ 11 Mbps
Use Basic For Rate: ☐ 1 Mbps  ☐ 2 Mbps  ☑ 5.5 Mbps  ☐ 11 Mbps
AP Radio Status: ● Yes  ○ No Close

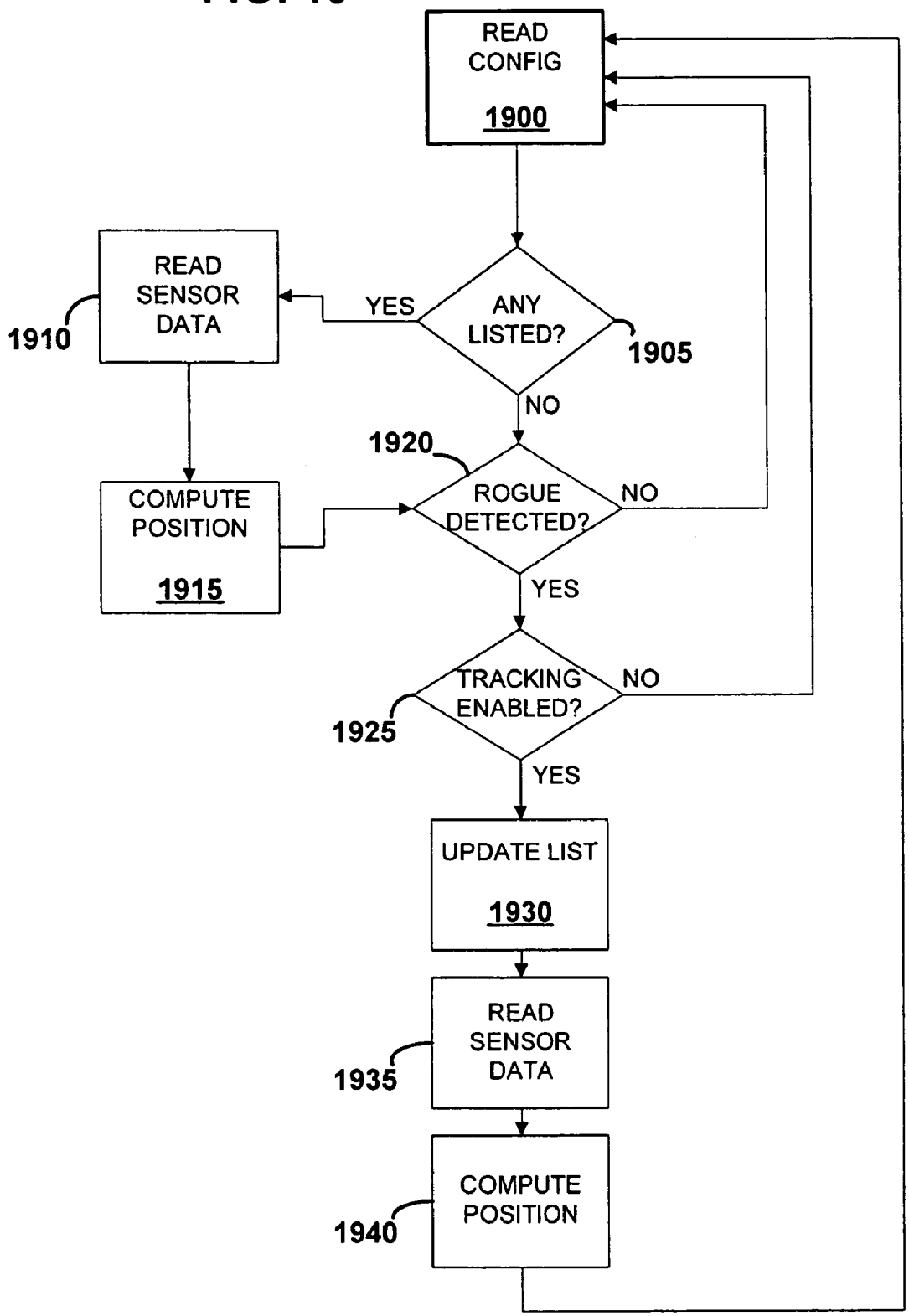

SYSTEMS AND METHODS FOR DYNAMIC SENSOR DISCOVERY AND SELECTION

CROSS-REFERENCE TO RELATED PATENT APPLICATIONS

This application claims priority to commonly assigned U.S. Provisional Patent Application Ser. No. 60/464,464, filed Apr. 21, 2003, entitled "SYSTEMS AND METHODS FOR MANAGING WIRELESS NETWORK ACTIVITY." This application is incorporated by reference herein in its entirety for all purposes.

BACKGROUND

The present invention is directed to systems and methods for securing wireless computer networks. More specifically, without limitation, the present invention relates to systems and methods of managing network sensors.

The Internet is a global network of connected computer networks. Over the last several years, the Internet has grown in significant measure. A large number of computers on the Internet provide information in various forms. Anyone with a computer connected to the Internet can potentially tap into this vast pool of information.

The information available via the Internet encompasses information available via a variety of types of application layer information servers such as SMTP (simple mail transfer protocol), POP3 (Post Office Protocol), GOPHER (RFC 1436), WAIS, HTTP (Hypertext Transfer Protocol, RFC 2616) and FTP (file transfer protocol, RFC 1123).

One of the most wide spread methods of providing information over the Internet is via the World Wide Web (the Web). The Web consists of a subset of the computers connected to the Internet; the computers in this subset run Hypertext Transfer Protocol (HTTP) servers (Web servers). Several extensions and modifications to HTTP have been proposed including, for example, an extension framework (RFC 2774) and authentication (RFC 2617). Information on the Internet can be accessed through the use of a Uniform Resource Identifier (URI, RFC 2396). A URI uniquely specifies the location of a particular piece of information on the Internet. A URI will typically be composed of several components. The first component typically designates the protocol by which the address piece of information is accessed (e.g., HTTP, GOPHER, etc.). This first component is separated from the remainder of the URI by a colon (':'). The remainder of the URI will depend upon the protocol component. Typically, the remainder designates a computer on the Internet by name, or by IP number, as well as a more specific designation of the location of the resource on the designated computer. For instance, a typical URI for an HTTP resource might be:

http://www.server.com/dir1/dir2/resource.htm where http is the protocol, www.server.com is the designated computer and /dir1/dir2/resouce.htm designates the location of the resource on the designated computer. The term URI includes Uniform Resource Names (URN's) including URN's as defined according to RFC 2141.

Web servers host information in the form of Web pages; collectively the server and the information hosted are referred to as a Web site. A significant number of Web pages are encoded using the Hypertext Markup Language (HTML) although other encodings using SGML, eXtensible Markup Language (XML), DHMTL or XHTML are possible. The published specifications for these languages are incorporated by reference herein; such specifications are available from the World Wide Web Consortium and its Web site (http://www.w3c.org). Web pages in these formatting languages may include links to other Web pages on the same Web site or another. As will be known to those skilled in the art, Web pages may be generated dynamically by a server by integrating a variety of elements into a formatted page prior to transmission to a Web client. Web servers, and information servers of other types, await requests for the information from Internet clients.

Client software has evolved that allows users of computers connected to the Internet to access this information. Advanced clients such as Netscape's Navigator and Microsoft's Internet Explorer allow users to access software provided via a variety of information servers in a unified client environment. Typically, such client software is referred to as browser software.

Electronic mail (e-mail) is another wide spread application using the Internet. A variety of protocols are often used for e-mail transmission, delivery and processing including SMTP and POP3 as discussed above. These protocols refer, respectively, to standards for communicating e-mail messages between servers and for server-client communication related to e-mail messages. These protocols are defined respectively in particular RFC's (Request for Comments) promulgated by the IETF (Internet Engineering Task Force). The SMTP protocol is defined in RFC 821, and the POP3 protocol is defined in RFC 1939.

Since the inception of these standards, various needs have evolved in the field of e-mail leading to the development of further standards including enhancements or additional protocols. For instance, various enhancements have evolved to the SMTP standards leading to the evolution of extended SMTP. Examples of extensions may be seen in (1) RFC 1869 that defines a framework for extending the SMTP service by defining a means whereby a server SMTP can inform a client SMTP as to the service extensions it supports and in (2) RFC 1891 that defines an extension to the SMTP service, which allows an SMTP client to specify (a) that delivery status notifications (DSNs) should be generated under certain conditions, (b) whether such notifications should return the contents of the message, and (c) additional information, to be returned with a DSN, that allows the sender to identify both the recipient(s) for which the DSN was issued, and the transaction in which the original message was sent.

In addition, the IMAP protocol has evolved as an alternative to POP3 that supports more advanced interactions between e-mail servers and clients. This protocol is described in RFC 2060.

The various standards discussed herein by reference to particular RFC's are hereby incorporated by reference herein for all purposes. These RFC's are available to the public through the Internet Engineering Task Force (IETF) and can be retrieved from its Web site (http://www.ietf.org/rfc.html). The specified protocols are not intended to be limited to the specific RFC's quoted herein above but are intended to include extensions and revisions thereto. Such extensions and/or revisions may or may not be encompassed by current and/or future RFC's.

A host of e-mail server and client products have been developed in order to foster e-mail communication over the Internet. E-mail server software includes such products as sendmail-based servers, Microsoft Exchange, Lotus Notes Server, and Novell GroupWise; sendmail-based servers refer to a number of variations of servers originally based upon the sendmail program developed for the UNIX operating systems. A large number of e-mail clients have also been developed that allow a user to retrieve and view e-mail messages from a server; example products include Microsoft Outlook, Microsoft Outlook Express, Netscape Messenger, and Eudora. In addition, some e-mail servers, or e-mail servers in conjunction with a Web server, allow a Web browser to act as an e-mail client using the HTTP standard.

As the Internet has become more widely used, it has also created new risks for corporations. Breaches of computer security by hackers and intruders and the potential for compromising sensitive corporate information are a very real and serious threat.

Wireless Local Area Networks (WLANs) offer a quick and effective extension of a wired network or standard local area network (LAN). FIG. 1 depicts a typical LAN 190 including both wired and wireless components. The wired component depicted in FIG. 1 includes a variety of connected systems including local servers 120, local clients 130 and network accessible data storage components 110. By simply installing access points 180A, 180B to the wired network (e.g., Ethernet 150 and router 140), personal computers and laptops equipped with WLAN cards 170A, 170B can connect with the wired network at broadband speeds.

Over the last few years, most deployments of WLANs have conformed to the Institute of Electrical and Electronics Engineers (IEEE) 802.11b standard that operates over the unregulated 2.4 GHz frequency spectrum. The 802.11b standard offers connectivity of up to 11 Mbps—fast enough to handle large e-mail attachments and run bandwidth-intensive applications like video conferencing. While the 802.11b standard now dominates the WLAN market, other variations of the 802.11 standard, such as 802.11a, 802.11g, and supporting standards such as 802.1X, are being developed to handle increased speeds and enhanced functionality. WLAN vendors have committed to supporting a variety of standards. The various 802.11 standards developed by the IEEE are available for download via URL: http://standards.ieee.org/getieee802/802.11.html; these various standards are hereby incorporated by this reference herein.

As businesses connected their LANs to the Internet 160, they installed firewalls 145 to protect their local networks and act as security gates to fend off unauthorized traffic coming from the Internet's information highway such as potential hacker 135. The mobility of air-bound, wireless networks creates security concerns where threats can come from any direction and are not limited to the wired infrastructure. Established security practices of guarding a few wired entry points to the network are no longer effective. A firewall 145 may effectively deter an attack from a wired hacker 135 via the Internet 160; however, wireless hackers 195A, 195B typically enter the LAN 190 through access points 180A, 180B that are already behind the firewall 145. Companies must constantly monitor their airwaves to survey wireless activity and guard against intruders.

Because wireless communication is broadcast over radio waves, eavesdroppers 195A, 195B who merely listen to the airwaves can easily pick up unencrypted messages. Additionally, messages encrypted with the Wired Equivalent Privacy (WEP) security protocol can be decrypted with a little time and easily available hacking tools. These passive intruders put businesses at risk of exposing sensitive information to corporate espionage.

The theft of an authorized user's identity poses one the greatest threats. Service Set Identifiers (SSIDs) that act as crude passwords and Media Access Control (MAC) addresses that act as personal identification numbers are often used to verify that clients are authorized to connect with an access point. However, existing encryption standards are not foolproof and allow knowledgeable intruders to pick up approved SSIDs and MAC addresses to connect to a WLAN as an authorized user with the ability to steal bandwidth, corrupt or download files, and wreak havoc on the entire network.

Outsiders who cannot gain access to a WLAN can none-the-less pose security threats by jamming or flooding the airwaves with static noise that causes WLAN signals to collide and produce CRC errors. These Denial-of-Service (DoS) attacks effectively shut down the wireless network in a similar way that DoS attacks affect wired networks.

Careless and deceitful actions by both loyal and disgruntled employees also present security risks and performance issues to wireless networks with unauthorized access points, improper security measures, and network abuses. Because a simple WLAN can be easily installed by attaching a $80 access point to a wired network and a $30 WLAN card to a laptop, employees are deploying unauthorized WLANs or peer-to-peer wireless connections 175 when IT departments are slow to adopt the new technology.

Incorrectly configured access points are an avoidable but significant hole in WLAN security. Many access points are initially configured to broadcast unencrypted SSIDs of authorized users. While SSIDs are intended to be passwords to verify authorized users, intruders can easily steal an unencrypted SSID to assume the identity of an authorized user.

Authorized users can also threaten the integrity of the network with abuses that drain connection speeds, consume bandwidth, and hinder a WLAN's overall performance. A few users who clog the network by trading large files such as MP3 audio or MPEG video files can affect the productivity of everyone on the wireless network.

The systems and methods as disclosed herein provide solutions to these and other security and/or management issues associated with WLANs and/or encrypted computer networks.

SUMMARY

The present application is directed to systems and methods of managing wireless network sensors. A typical system includes a system data store (SDS) and a system processor in communication with the system data store. The SDS may include multiple physical and/or logical data stores for storing the various types of information. Data storage and retrieval functionality may be provided by either the system processor or data storage processors associated with, or included within, the SDS. Some embodiments can further include one or more wireless receivers that monitor wireless transmissions and/or one or more data collection agents each of which can be included within, or separate from, a wireless receiver.

The system processor is in communication with the SDS via any suitable communication channel(s). The system processor may include one or more processing elements that provide and/or support the desired detection and/or enforcement functionality. In some instances, the system processor can include local, central and/or peer processing elements depending upon equipment and the configuration thereof.

Accordingly, one method of managing wireless network sensors includes a variety of steps that may, in certain cases, be executed by the environment above or be stored as computer executable instructions in and/or on any suitable combination of computer-readable media. A plurality of wireless network sensors are identified in a network region. For each of the wireless network sensors a designation of primary or secondary is selected with respect to the network region. In some instances, a given wireless network sensor can have different designations for different network regions. In some implementations, each designation is communicated to the respective wireless network sensor; in other, certain defaults could apply (e.g., if no designation received, designation is deemed to be secondary).

At least one collection agent is determined for a selected network region. In some cases, multiple collection agents can be determined for a given network region. A collection agent aggregates data from one or more sensors and/or collection agents. A collection agent can be included within, or be separate from, a particular wireless network sensor, which can be internal or external to the given network region. An indicator of the determined collection agent is communicated to the plurality of wireless network sensors in the network region. The wireless network sensors can then communicate monitored data to the determined collection agent.

Scan data is received for the network region from the collection agent. The scan data is typically derived at least in part from data monitored by a wireless network sensor with a primary designation for the network region.

In some instances, the process can be repeated a number of times for a given network region, for additional network regions and/or both. Repetition can be on a periodic or a periodic basis.

Additional advantages of these systems and methods will be set forth in part in the description which follows, and in part will be obvious from the description, or may be learned by practice. The advantages will be realized and attained by means of the elements and combinations particularly pointed out herein. It is to be understood that both the foregoing general description and the following detailed description are exemplary and explanatory only and are not intended as restrictive.

BRIEF DESCRIPTION OF THE DRAWINGS

The accompanying drawings, which are incorporated in and constitute a part of this specification, illustrate various aspects of the disclosed systems and methods and together with the description, serve to explain and/or exemplify their principles.

FIGS. 2A-E graphically depicts LANs incorporating various preferred configurations.

FIG. 12A1 is a larger rendering of the left panel of FIG. 12A.

Figure 13A2:
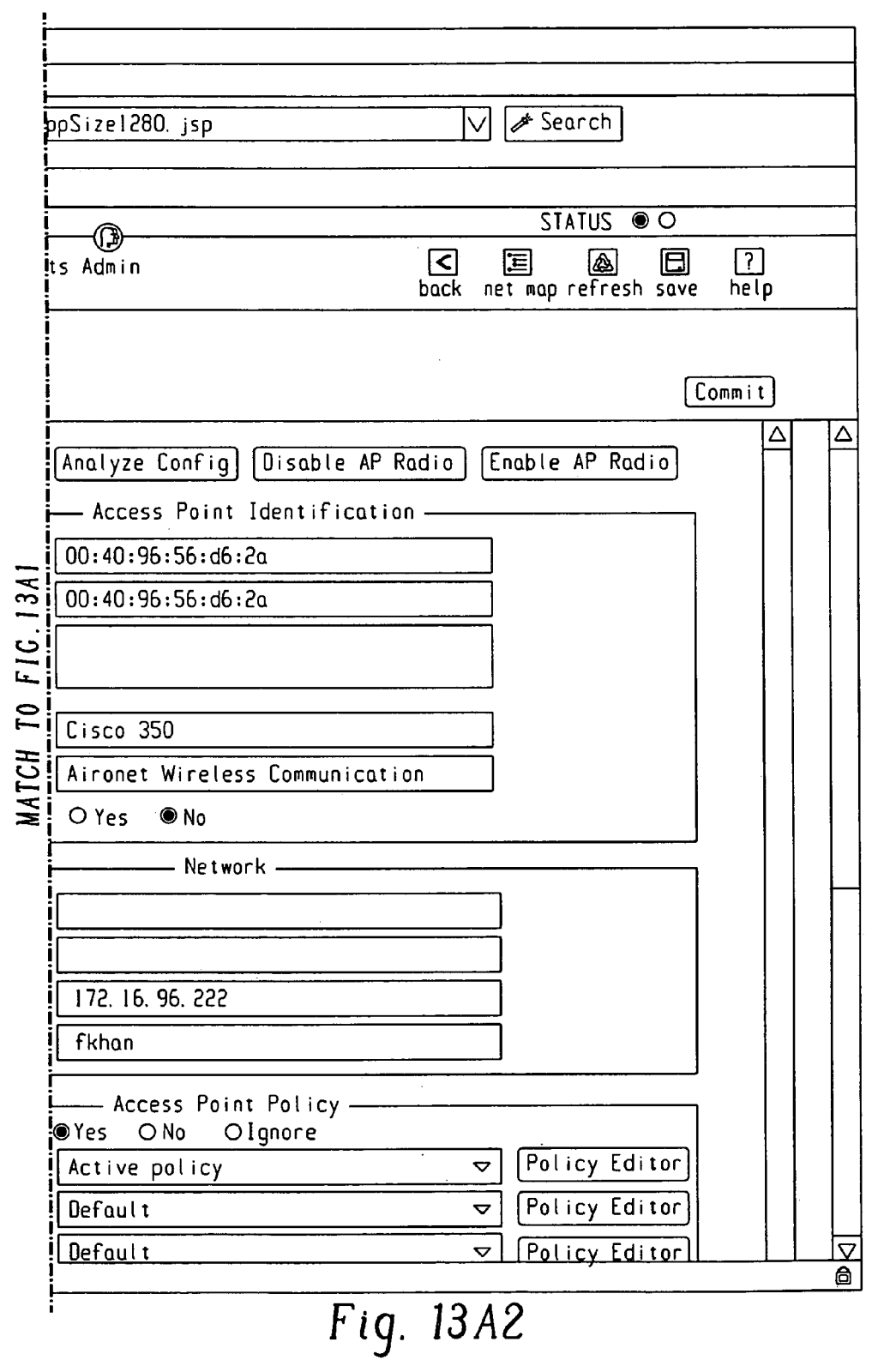
Figure 13B2:
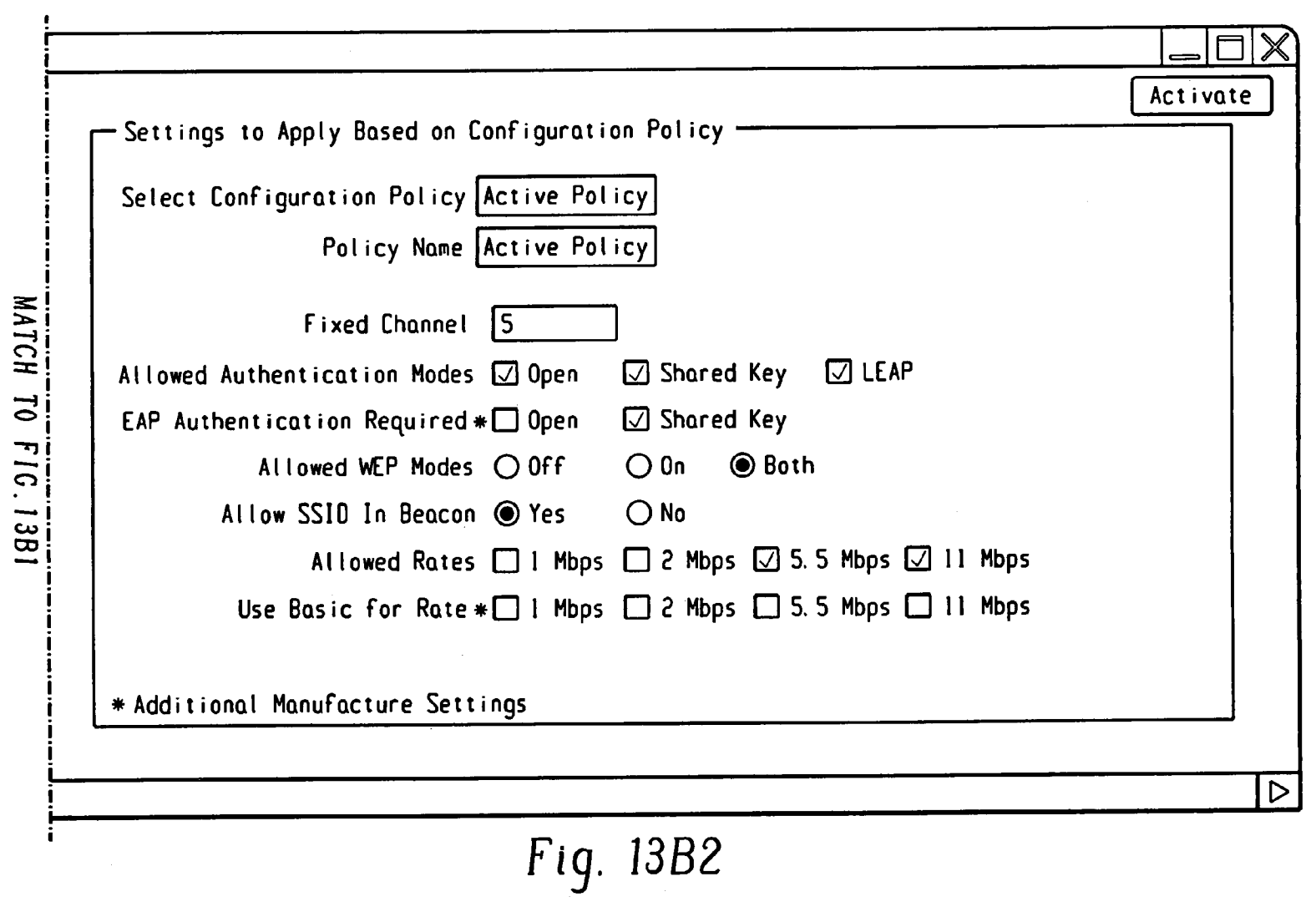

FIGS. 13A1, 13A2, 13B1 & 13B2 depict sample screens providing interfaces for configuration of automated policy enforcement.

FIG. 13A1*a* is a larger rendering of the left panel of FIG. 13A1.

FIG. 19 is a flow chart depicting an alternative adaptive location tracking process.

DETAILED DESCRIPTION

Figure 1:
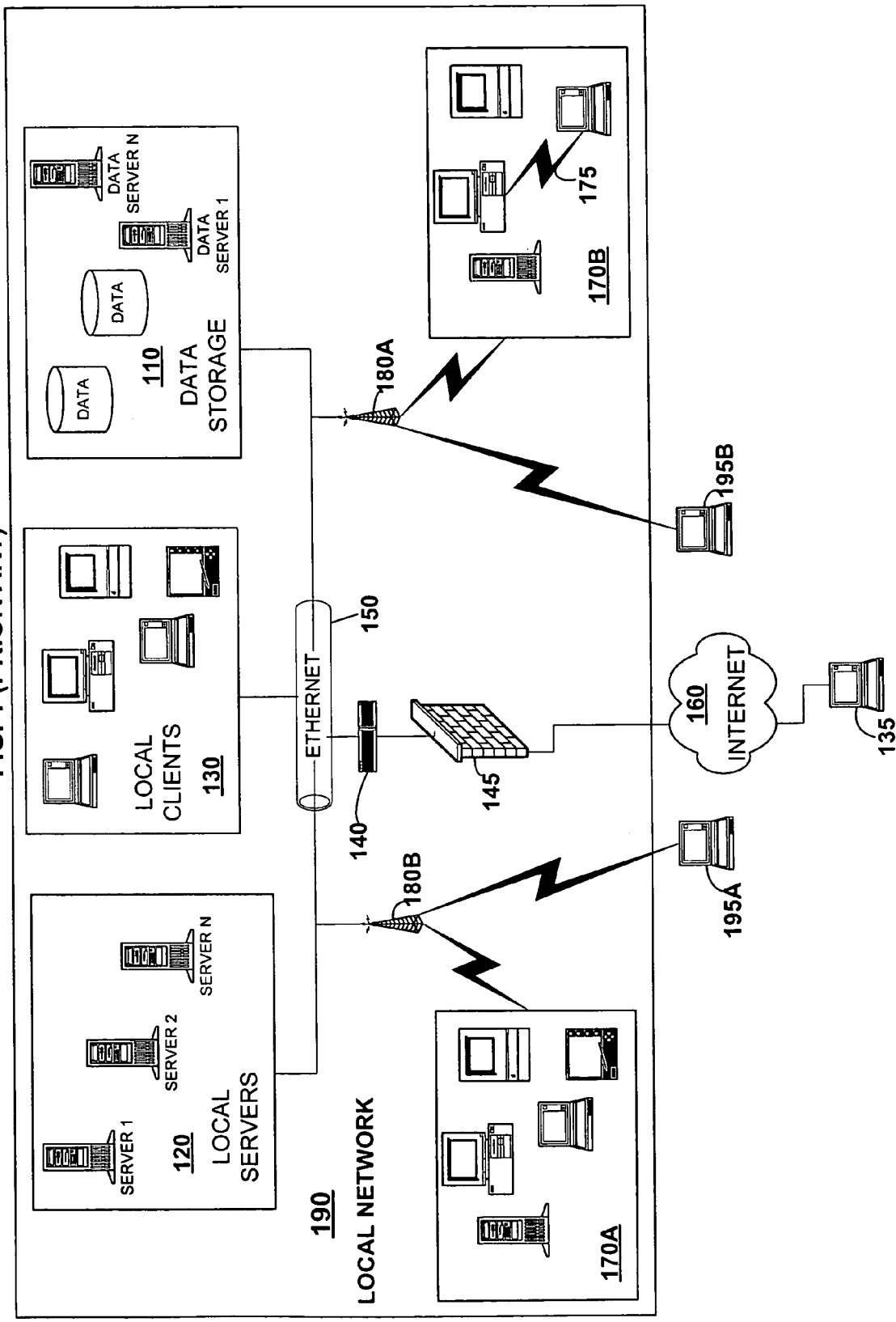
FIG. 1 graphically depicts a typical LAN with both wired and wireless components.

Exemplary systems and methods are now described in detail. Referring to the drawings, like numbers indicate like parts throughout the views. As used in the description herein, the meaning of "a," "an," and "the" includes plural reference unless the context clearly dictates otherwise. Also, as used in the description herein, the meaning of "in" includes "in" and "on" unless the context clearly dictates otherwise. Finally, as used in the description herein, the meanings of "and" and "or" include both the conjunctive and disjunctive and may be used interchangeably unless the context clearly dictates otherwise; the phrase "exclusive or" may be used to indicate situation where only the disjunctive meaning may apply.

The term "Wi-Fi" is short for wireless fidelity and is another name for IEEE 802.11b. The foregoing discussion of exemplary embodiments may use terminology or make reference to the IEEE 802.11b standard, or other 802.11 variant; however, those skilled in the art will appreciate that systems and methods may be applied to WLANs meeting these standards as well as WLANs developed according to competing WLAN standards. The term "frame" as used herein shall mean broadly any discretely defined communication transmitted via a computer network and shall not be limited to those specific frame types (control, management, data and error) defined according to 802.11X standards. As used herein, the term "sensor" or "sensors" as used herein can broadly include wired or wireless sensors, wireless access points and/or combined sensor/access points; in addition, a "sensor" can also include a data collection agent that aggregates data from downstream sensors.

Architecture of a Typical Environment

FIGS. 2A-E depicts several LAN environments including several configurations of systems and methods disclosed herein. These figures depict a typical LAN environment as depicted in FIG. 1 having wired and wireless components. In contrast to FIG. 1, FIGS. 2A-E include one or more hardware components supporting exemplary environments. The depicted hardware components include a system processor, an SDS and one or more interfaces to one or more wireless and/or encrypted communications network over which electronic communications are transmitted and received.

The hardware components depicted in these figures are outlined as follows:

In FIG. 2A, the hardware components include a single device 210A that includes a local processor serving as the system processor, or at least a portion thereof, and the one or more interfaces to the wireless network. The device 210A is preferably a mobile computer system such as a notebook computer. The local primary and/or secondary storage of device 210A may serve as the SDS; alternatively, portions of the SDS may be provided by other systems capable of communicating with the device 210A such as network addressable data storage 110, local servers 120 and/or wireless stations 170A, 170B. In some configurations, the device's interfaces to the wireless network may be limited to one or more wireless receivers. In others, the interfaces may include one or more wireless transmitters as well as one or more transmitters. If wireless transmitters are included, the device 210 may communicate over LAN 190 using a wireless access point 180A, 180B. In addition, included wireless transmitters may be used to support one or more of the active defense measures described in greater detail below. In some configurations, the device 210A may further include a wired connection (not shown) to Ethernet 150 allowing direct communication between it and systems connected to the wired portion of LAN 190.

In FIG. 2B, the hardware components include multiple devices 210A, 210B, 210C, 210D. Each device 210A-D includes a local processor and one or more interfaces to the wireless network and is preferably a mobile computer system such as a notebook computer. The individual local processors in the aggregate serve as the system processor. The SDS may include a combination of storage local to each of the devices and/or external storage accessible via the LAN 190. As described above with respect to FIG. 2A, each device includes at least a wireless receiver but may also include additional wireless receivers and/or wireless transmitters. Each device may also include a wired connection (not shown) to Ethernet 150. Finally, the devices 210A-D may further use existing interfaces and/ or incorporate additional interfaces to allow peer-to-peer communication among themselves.

In FIG. 2C, the hardware components include multiple devices 210A, 210B, 210C, 210D, 220. Each device 210A-D may include the various components as described above with respect to FIG. 2B. Device 220 includes a local processor and one or more communication interfaces; this device may be referred to hereinafter as the host system. Device 220's communication interfaces may include only a wired communication interface and may receive data related to wireless communications as forwarded by devices 210A-D over the wire Ethernet 150. In addition to, or instead of, the wired communication interface, device 220 may include a one or more wireless communication interfaces each of which may include a wireless receiver, a wireless transmitter or both. In configurations where devices 210A-D support peer-to-peer communication, device 220 may in some of such participate in the peer-to-peer communication and, in such instances, its communication interfaces would include the appropriate communication interface to support this participation. The system processor functionality in the depicted example may be provided by the host system alone and/or by some combination of the devices 210A-D. The host system may in some implementations provide the SDS for the environment; alternatively, the SDS may be supported by some combination of the local storage among the devices 210A-D, the local storage in the host system and external storage available through LAN 190.

In FIG. 2D, the hardware components include multiple devices 210A, 210B, 210C, 210D, 220, 230A, 230B. Devices 210A-D, 220 support the same functionality and include the same range of components as provided above with respect to FIG. 2C. In addition, devices 230A, 230B are sensor devices that monitor wireless traffic over the wireless network. These sensor devices at least include a wireless receiver for monitoring the traffic and a communication interface wired (as depicted) or wireless (not shown) allowing communication with one or more of the devices 210A-D and/or the host system 220. In some instances, the sensor devices 230A, 230B may include a wireless transmitter for supporting communication with the other hardware components and/or for supporting various active wireless network defensive measures as discussed below. In some configurations, the sensor device 230A, 230B may further include local processing capability and or local storage capability; in some such, the system processor and/or the SDS may incorporate these local capabilities of the sensor devices 230A, 230B.

In FIG. 2E, the hardware components include multiple devices 220, 230A, 230B. In this configuration, the host system 220 and sensor devices 230A, 230B include the same functionality and range of components as discussed above with respect to FIGS. 2D and 2E respectively. In such configurations, the host system 220 will typically provide a significant portion of the system processor functionality and will only have limited capacity to directly receive wireless network communication. In some of these implementations, the host system 220 may have no wireless communication interface.

The depicted hardware components include a system processor potentially including multiple processing elements, that may be distributed across the depicted hardware components, where each processing element may be supported via Intel-compatible processor platforms preferably using at least one PENTIUM III or CELERON (Intel Corp., Santa Clara, Calif.) class processor; alternative processors such as UltraSPARC (Sun Microsystems, Palo Alto, Calif.) could also be used. In some systems, dynamic sensor discovery and selection functionality, as further described below, may be distributed across multiple processing elements. The term processing element may refer to (1) a process running on a particular piece, or across particular pieces, of hardware, (2) a particular piece of hardware, or either (1) or (2) as the context allows. The sensor devices 230A, 230B depicted in FIGS. 2D-E may in some preferred configurations include more limited optimized local processors such as a digital signal processor (DSP). Other implementations can use in addition, or instead, a general purpose processor, an application specific integrated circuit (ASIC), a field programmable gate arrays (FPGA), multiple such and/or combinations thereof.

The depicted hardware components include an SDS that could include a variety of primary and secondary storage elements. In one configuration, the SDS would include RAM as part of the primary storage; the amount of RAM might range from 64 MB to 4 GB in each individual hardware device although these amounts could vary and represent overlapping use such as where the host system 220 supports additional functionality such as integrated with firewall system 145 for providing unified wired and wireless security. The primary storage may in some implementations include other forms of memory such as cache memory, registers, non-volatile memory (e.g., FLASH, ROM, EPROM, etc.), etc. The sensor devices 230A, 230B depicted in FIGS. 2D-E may in some implementations include more limited amounts and kinds of primary storage. In one such implementation, the primary storage in the sensor devices includes FLASH memory.

The SDS may also include secondary storage including single, multiple and/or varied servers and storage elements. For example, the SDS may use internal storage devices connected to the system processor. In implementations where a single processing element supports all of the security analysis functionality, such as seen in FIGS. 2A and 2E, a local hard disk drive may serve as the secondary storage of the SDS, and a disk operating system executing on such a single processing element may act as a data server receiving and servicing data requests.

It will be understood by those skilled in the art that the different information used in the security enhancement processes and systems may be logically or physically segregated within a single device serving as secondary storage for the SDS; multiple related data stores accessible through a unified management system, which together serve as the SDS; or multiple independent data stores individually accessible through disparate management systems, which may in some environments be collectively viewed as the SDS. The various storage elements that comprise the physical architecture of the SDS may be centrally located, or distributed across a variety of diverse locations.

The architecture of the secondary storage of the system data store may vary significantly in different implementations. In several such, database(s) are used to store and manipulate the data; in some such implementations, one or more relational database management systems, such as DB2 (IBM, White Plains, N.Y.), SQL Server (Microsoft, Redmond, Wash.), ACCESS (Microsoft, Redmond, Wash.), ORACLE 8i (Oracle Corp., Redwood Shores, Calif.), Ingres (Computer Associates, Islandia, N.Y.), MySQL (MySQL AB, Sweden) or Adaptive Server Enterprise (Sybase Inc., Emeryville, Calif.), may be used in connection with a variety of storage devices/file servers that may include one or more standard magnetic and/or optical disk drives using any appropriate interface including, without limitation, IDE and SCSI. In some environments, a tape library such as Exabyte X80 (Exabyte Corporation, Boulder, Colo.), a storage attached network (SAN) solution such as available from (EMC, Inc., Hopkinton, Mass.), a network attached storage (NAS) solution such as a NetApp Filer 740 (Network Appliances, Sunnyvale, Calif.), or combinations thereof may be used. In others, the data store may use database systems with other architectures such as object-oriented, spatial, object-relational or hierarchical.

Instead of, or in addition to, those organization approaches discussed above, certain environments may use other storage implementations such as hash tables or flat files or combinations of such architectures. Such alternative approaches may use data servers other than database management systems such as a hash table look-up server, procedure and/or process and/or a flat file retrieval server, procedure and/or process. Further, the SDS may use a combination of any of such approaches in organizing its secondary storage architecture.

The hardware components may each have an appropriate operating system such as WINDOWS/NT, WINDOWS 2000 or WINDOWS/XP Server (Microsoft, Redmond, Wash.), Solaris (Sun Microsystems, Palo Alto, Calif.), or LINUX (or other UNIX variant). In one implementation, the devices 210A-D and/or host system 220 include a LINUX (or other UNIX variant) operating system; although others may include a WINDOWS/XP (or other WINDOWS family) operating system.

Depending upon the hardware/operating system platform of the overall environment, appropriate server software may be included to support the desired access for the purpose of configuration, monitoring and/or reporting. Web server functionality may be provided via an Internet Information Server (Microsoft, Redmond, Wash.), an Apache HTTP Server (Apache Software Foundation, Forest Hill, Md.), an iPlanet Web Server (iPlanet E-Commerce Solutions—A Sun—Netscape Alliance, Mountain View, Calif.) or other suitable Web server platform. The e-mail services may be supported via an Exchange Server (Microsoft, Redmond, Wash.), sendmail or other suitable e-mail server. Some environments may include one or more automated voice response (AVR) systems that are in addition to, or instead of, the aforementioned access servers. Such an AVR system could support a purely voice/telephone driven interface to the environment with hard copy output delivered electronically to suitable hard copy output device (e.g., printer, facsimile, etc.), and forward as necessary through regular mail, courier, inter-office mail, facsimile or other suitable forwarding approach.

Figure 7A:
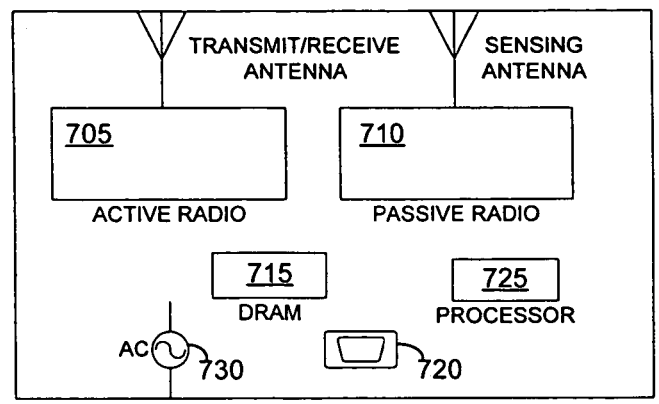
FIGS. 7A-C are diagram depicting exemplary architectures for sensor devices.
Figure 7B:
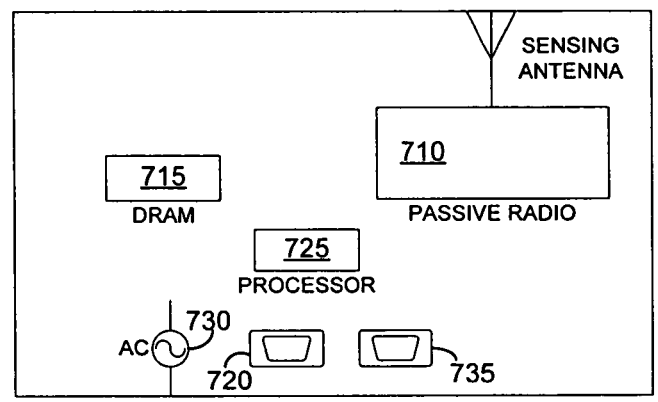
Figure 7C:
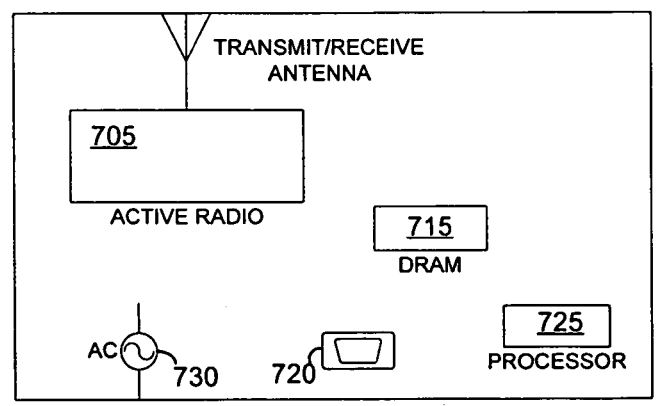

Some configurations include sensor devices 230A, 230B of a form such as depicted in FIGS. 7A-C. FIG. 7A depicts a sensing device having combined functionality of an access point and sensor. The device includes a transceiver antenna 705 and a sensing antenna 710. The transceiver antenna 705 allows receipt and transmission of wireless signals according to a predetermined protocol such as a variant of IEEE 802.11. Wireless stations associate with the active radio (transceiver antenna) which connects through port 720 to a wired network such as a network interface to a local Ethernet and/or to a further wireless network (transceiver not shown), a modem allowing connection to a network or direct connection to a host system or peer system or combinations thereof. The sensing antenna 710 allows reception of wireless signals according to the protocol without impacting performance of transceiver. The sensing antenna 710 receives all wireless signals in parallel with the transceiver antenna 705. The sensor can further include local data storage 715 that serves as the SDS, or a portion thereof. This local storage 715 contains any necessary operating code and/or data such as accumulated security data, network configuration data, sensor identification information and/or network communication related data. This local storage typically include DRAM, FLASH memory or combinations thereof. The sensor can further include a local processor 725 that serves as the system processor, or a portion thereof. This local processor 725 supports communication management and security collection, and in some implementations security analysis, functionality. The local processor can be any microprocessor, ASIC, DSP, FPGA or combination thereof that has the computing power capable of managing the two wireless components 705 and 710 and the auxiliary components of the device (e.g., local storage 715, network interface 720, etc.); for example, a Pentium Class microprocessor (Intel) or faster is capable of managing the computing needs. The device will also include a connection to a power source such as depicted alternating current (AC) interface 730 although other embodiments could in addition, or instead, include a power over Ethernet compatible interface or a repository for one or more disposable and/or rechargeable batteries.

In a network with a multitude of sensing agents, dynamic sensor discovery can be used to create primary and secondary sensing devices and clustered data forwarding. This can lead to several advantages, including optimized sensing uptime, minimized monitoring redundancy, and distributed processing workload. An agent will collect data from one or more sensors, and either create a local representation of such data in a local data store, send it directly to a remote data store or perform both operations. Sensor election will select, from a number of sensors in a given area, a primary and one or more secondary or backup sensors. This election can be based on a number of factors, including without limitation coverage area, functional capability and/or numerical priority based on device address.

Figure 17:
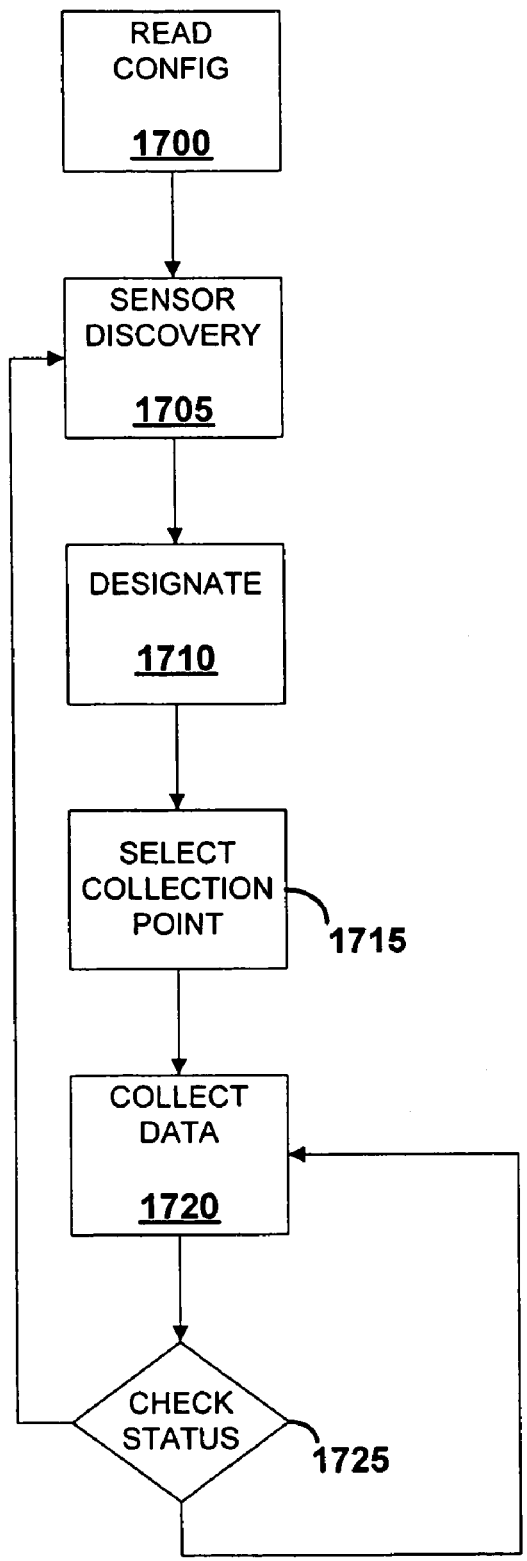
FIG. 17 is a flow chart depicting a process for managing network sensors.

Multiple sensing agents can be used in some environments to collect data within or from a single sensor or across multiple sensors. FIG. 17 depicts a dynamic sensor discovery process in a network with a multitude of sensing agents. A plurality of wireless network sensors in a network region are identified. In step 1700, configuration information associated with a wireless network is read from a configuration file. In some instances, this step need not occur; in some such instances, configuration information is not required or can be determined implicitly or dynamically.

In step 1705, wireless network sensors within a given region are identified. In some implementations, a broadcast announcement message is sent via either the wired or wireless network interface to a set of sensors potentially within the region. Sensors monitor particular logical network ports to recognize and process such messages. Each of the identified sensors within a region is designated as either a primary or secondary (backup) sensor for the region, step 1710. This election can be based on coverage area, functional capability and/or numerical priority based on device address. In some implementations, the designation is communicated to each sensor, and the receiving sensor may alter configuration and monitoring parameters based upon the designation. A collection point is selected, step 1715. A communication indicating the determined collection agent is transmitted to the wireless sensors in the network region. The collection agent collects data from the one or more identified sensors. The collection agent can create a local representation of such data in a local datastore, sends it directly to a remote datastore or performs both operations, step 1720.

In the some instances, such as depicted, one or more of the wireless sensors, typically at least the one designated as primary, are monitored for status changes in step 1725. Upon a detection of a status change at one or more of the identified sensors can trigger a particular event. Such an event can include one or more of forwarding of collected data from the collection agent, collecting data from the sensor(s) with a change in status, step 1720 or reconfiguring by performing sensor discovery again, step 1705.

The above process in some environments can be repeated for a number of network regions. In addition, or instead, the process can be repeated a number of times for the same network region. The repetition can occur periodically or a periodically. For a periodic repetition, the repetition can result from occurrence of an event or upon request.

FIG. 7B depicts a stand-alone sensor system. In this system, a wireless transceiver for supporting access point functionality is not included. The description above with respect to FIG. 7A provides description of the like numbered components in FIG. 7B. This system includes a further communication interface 735. This additional interface can be used to connect further devices such as a standard access point. This would be useful for installing a sensor at a location with an existing access point without having to run another network line. Any data sent outbound from the device connected to interface 735 would be forwarded via network interface 720. Any data received at network interface 720 directed to the device would be forwarded via interface 735.

FIG. 7C depicts a modified access point system. In this system, a separate antenna is not provided for parallel monitoring of wireless signals. Instead, wireless transceiver 705 is responsible for both access point and signal monitor functionality. This functionality can be implemented in software or hardware of the local processor 725, or as a modified logic within the transceiver itself. This system has the advantage that existing access points with sufficient local processing capability can be modified through either a hardware addition or a software upgrade to support the monitoring capability. One disadvantage is that the original access point may not have been intended to support both functionality and, therefore, access point functionality may be degraded in some instances.

Figure 8A:
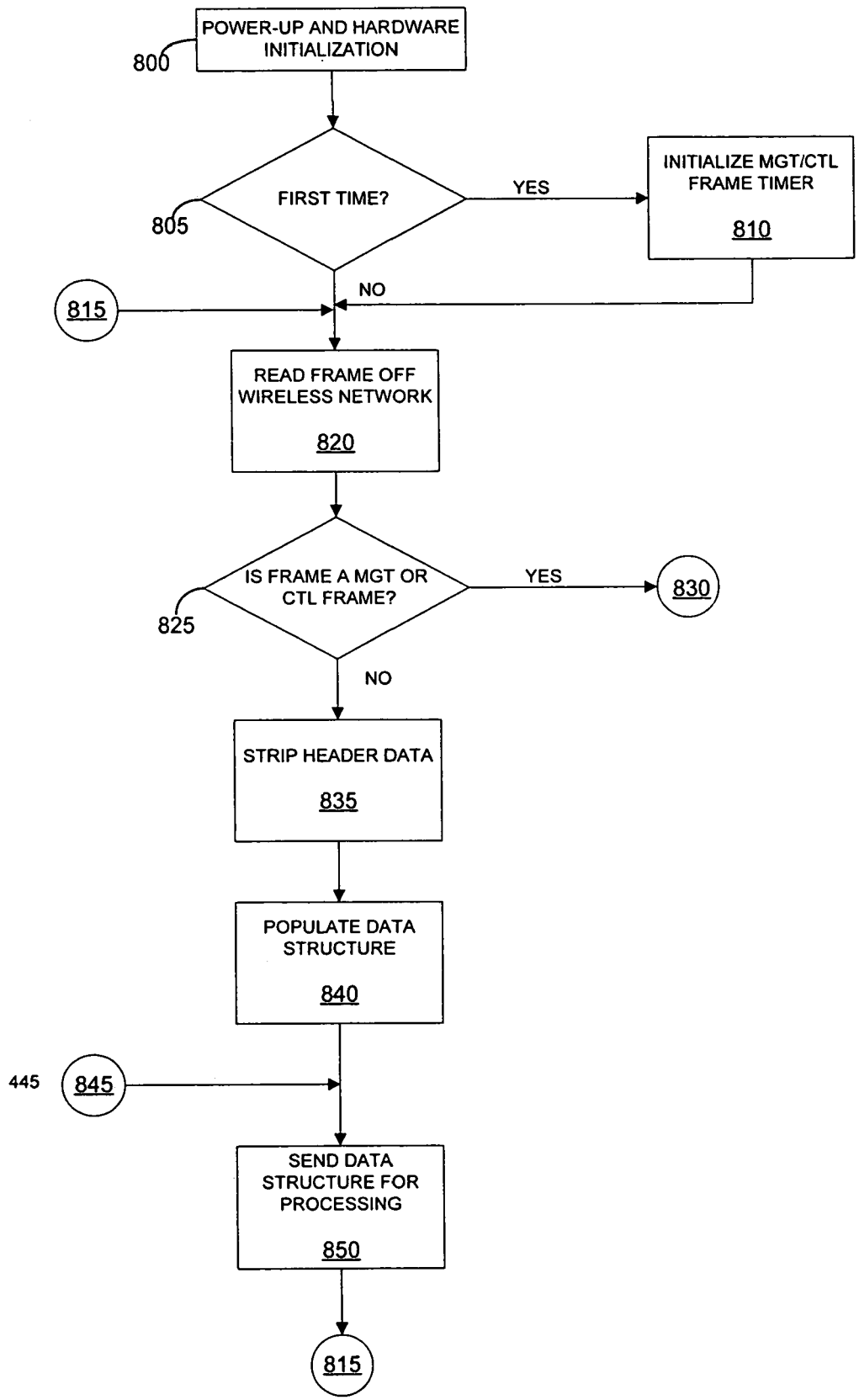
FIGS. 8A-B are flow charts depicting an exemplary security data collection process.
Figure 8B:
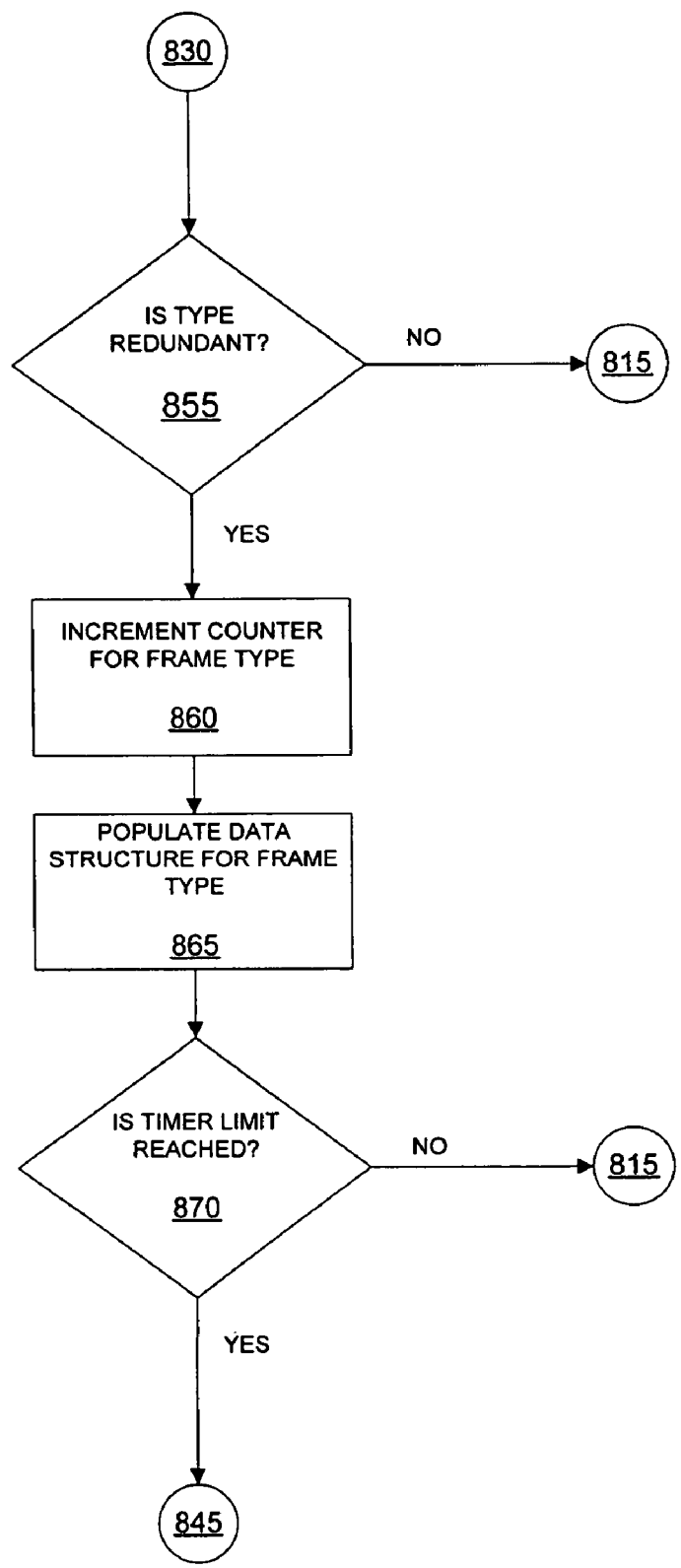

As previously described, the sensors 230A-B and/or devices 210-D in some configurations collect and forward security related data to a host system 220 for further processing and analysis. Some such environments provide for local processing of security data. FIGS. 8A-B are flow charts depicting an exemplary security data collection process. In some implementations, this process can be executed by sensors 230A-B and/or devices 210A-D.

In some particular environments using an 802.11 compatible network, the hardware sensors read 802.11 radio waves and strip management and control frames, aggregate statistics and send collected information to a backend server. A hardware sensor can have several configurations. Three such as depicted in FIGS. 7A-7C would be a stand-alone hardware sensor (FIG. 7B), a combination 802.11 Access Point/hardware sensor (FIG. 7A), and a modified 802.11 Access Point capable of stripping management and control frames and sending them back to a central server for analysis (FIG. 7C).

A hardware sensor will typically include at least one 802.11 radio capable of reading 802.11 radio waves. To provide functionality for securing a wireless network, the hardware sensor strips 802.11 management and control frames off of wireless data transmissions and sends real-time or batched data back to a centralized server (e.g., host system 220) for analysis and processing to determine intrusions or other network activity such as health or performance monitoring or performing such analysis and processing locally in peer-to-peer configurations.

In the three above mentioned configurations, the stand-alone hardware sensor would have an 802.11 radio operating in "promiscuous mode" in order to be undetectable from the airwaves and still read all 802.11 network traffic. In operating in promiscuous mode, the hardware sensor would not be able to transmit data such as beacon management and would be in a read-only operation mode. The sensor software embedded on the device would read 802.11 frames from the wireless network and interrogate them to strip the management and control frames from the data frames, collect the data and send it to the back-end server. The process to collect the data in one preferred approach is as follows:

The physical hardware powers up and loads the operating system (preferred OS: Real-Time Linux or RTOS) to an operational state, step 800. The first-time execution of the sensor process after power up (step 805), a timer is initialized for management and control frames buffering (step 810). The timer allows the management and control frames to be buffered until the timer reaches a predetermined elapsed time, at which point they will be forwarded to a server or peer for processing or processed locally. Although other implementations can forward unbuffered management and control frames and would therefore not require a timer, or any process steps involving the timer.

A wireless packet frame is then read from the wireless network, step 820. Frames are read so that the frame content can be interrogated in down-stream processes. This is also the entry point 815 in the process for retrieving the next frame after interrogation of the present frame.

The packet frame read off the wireless network is interrogated to determine if the frame is of a redundant type such as management or control frames, step 825. If the frame is of a redundant type, processing continues at entry point 830 in FIG. 8B. Management and control frames are broadcast more frequently than data frames and are protocol specific. Further interrogation of a management or control frame is performed to determine whether the frame is a redundant type frame (i.e., Beacon Frame), step 855. If not, control passes back to entry point 815 in FIG. 8A. Management and control frames such as beacon frames are broadcast more frequently than data frames and can be buffered as one record with a frame count and to reduce the traffic on the network as frames are transmitted to the server or to a peer or to reduce overhead of local processing. The buffering can be accomplished by maintaining a frame count for the particular type of redundant frame (step 860) and populating an appropriate data structure based upon the redundant frame type (step 865). If an appropriate time interval has elapsed or if a particular time has been reached (step 870), or if no buffering is intended, processing proceeds to entry point 845 in FIG. 8A for forwarding of the redundant frame information to the central server or peer or for local processing depending upon the particular system. If the timer does not trigger transmission or processing, processing continues at entry point 815 for retrieval of the next frame in FIG. 8A.

If the frame is not of a redundant type, processing continues at step 835 where the header data is stripped from the wireless packet frame. The header data is used to get origin/destination data as well as for maintaining state.

In step 840, a data structure is populated with pertinent information concerning wireless station state and protocol activity as well as origin and destination information for later down-line processing by a backend analysis server, by a peer or a local processor.

Once data is accumulated and preprocessed by the remote sensor, the resulting data structures are passed back to the central server or a peer over IP or locally processed for intrusion detection analysis (step 850). The process continues at entry point 815 with the retrieval of the next frame.

The device that is a combination hardware sensor and access point, one 802.11 radio would operate as a normal 802.11 access point operating in infrastructure mode that would allow wireless stations to associate and pass data through to the wired network. The additional 802.11 radio would operate in promiscuous mode just as a stand-alone hardware sensor would operate. This would give the device the ability to send and receive data as a normal 802.11 access point while utilizing the additional radio to monitor the airwaves against intrusions and monitor the wireless network for performance and health monitoring.

The device that is an access point modified to provide monitoring capability would utilize a single 802.11 radio to send and receive data with wireless stations but would utilize an SNMP mechanism to send traps back to a back end server when events occur such as intrusions or attacks against the access point. This method is not as effective as the previously mentioned devices but can provide additional information that is not collected by standard operating access points.

In one environment, devices 210A-D and host system 220 can be configured locally or remotely, and configuration can occur through an interactive interface and/or through a command line interface. The interactive interface is accessible locally whereas the command line interface is accessible either locally or remotely. Remote access is preferably granted through the use of a secure shell (SSH) client communicating with an SSH server running on the device or host system.

In some applications, remote monitoring of wireless nodes can be constrained by the available network capacity linking the remote sensor to one or more collection agents and/or centralized management and monitoring applications. To allow operation in such environments, adaptive network bandwidth control can provide an ability to dynamically decrease or increase the use of bandwidth while preserving monitoring fidelity across the population of detectable wireless devices. Bandwidth control may be implemented either via static rate configuration that is used to specify an upper bound on utilized network bandwidth, via dynamic determination based upon historical data and/or configuration information or via network signaling that may be used to alter the utilized bandwidth dynamically over time. In either case, the maximum available bandwidth is used to control not only the rate of traffic but also the sampling of the wireless network activity.

Figure 15:
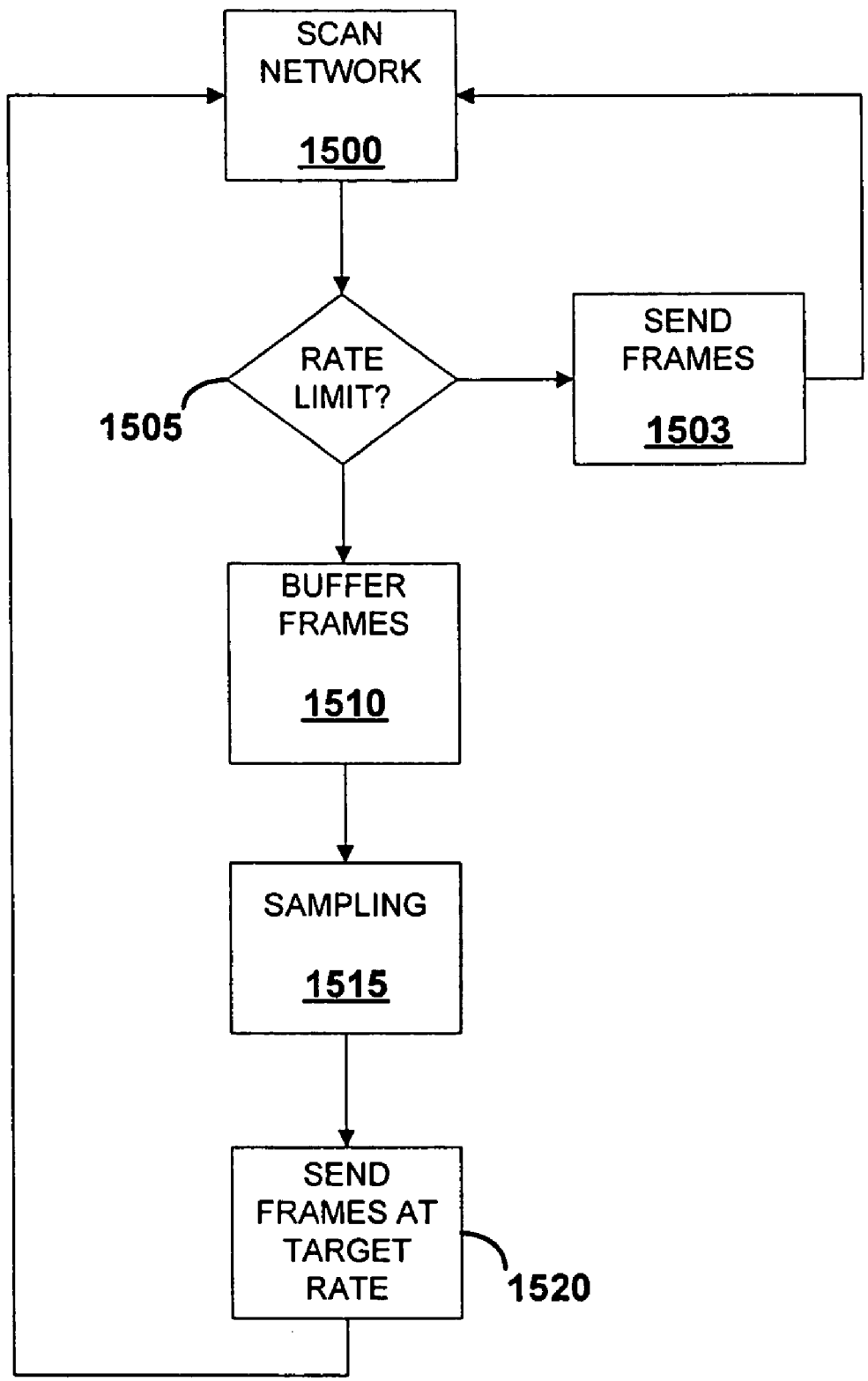
FIG. 15 is a flow chart depicting an adaptive monitoring process.

FIG. 15 depicts an exemplary process where a remote sensor is linked to a centralized management and monitoring application to allow remote monitoring of wireless nodes in environments constrained by the available network capacity. Network traffic is scanned in step 1500. A determination is made as to whether the bandwidth limit has been reached in step 1505. If the bandwidth limit is not met, the frame can be transferred to a monitoring application in step 1503.

If the limit has been met, buffering and/or filtering of the scanned network traffic occurs and transferred to the monitoring application at a more metered rate. In step 1510, frames are buffered into a local data store within the remote sensor. As long as there is sufficient buffering to absorb traffic bursts that exceed the targeted maximum bandwidth utilization, no captured or incoming data has to be discarded. In the case, however, where such buffering is insufficient, downsampling of the data stream can occur to meet the target bandwidth constraint. To do this, network traffic is sampled in such a manner to preserve samples across each of the monitored wireless devices in step 1515. This can be done via weighted round-robin servicing of each unique device, as identified via its MAC address. In addition to, or instead of, downsampling, low priority information can be discarded first. For example, redundant data, low threat data, data from a sensor more often sampled than others and/or network control frame data can be discarded in a prioritize, or unprioritized manner. In addition, or instead, data can be aggregated with previously buffered data where feasible. The frames are sent in conformance with the target rate in step 1520 and then network scanning continues in step 1500.

Wireless Network Topology Mapping and Visualization

Management of a wireless network differs in many ways from the management of a wired network. One important difference is the more dynamic nature of nodes (computers, PDAs, 802.11 cell phones, etc) in the network. In a wired network, connections to the network occur only at fixed locations. In a wireless network, nodes are not tied to physical connectivity to the network; a wireless network has no traditional boundaries and its topology can change at a fairly high rate.

This dynamic change is due to the ability of wireless network users to roam across multiple networks as well as the ability of modem wireless protocols to support instantaneous creation of ad hoc networks. Additionally, due to the nature of wireless RF transmission, connectivity may vary much more dynamically than in a wired network. This is due to physical channel variations such as noise, multipath, transmission obstacles, etc. that are not typically a factor in wired networks. Given these features, the connectivity patterns and network topology can change from moment to moment.

Figure 9:
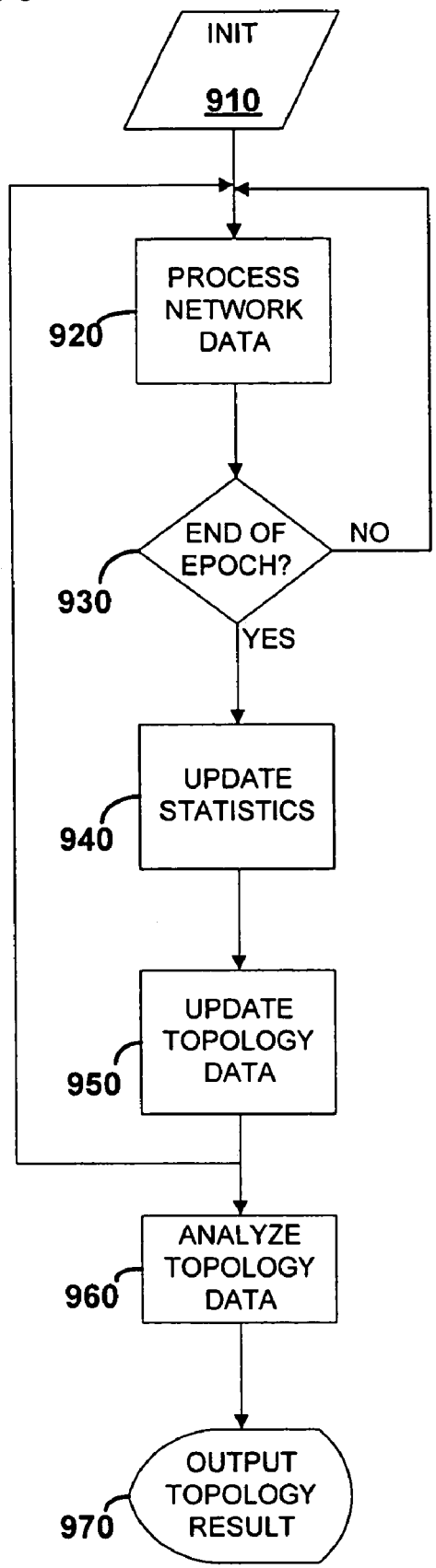
FIG. 9 is a flow chart depicting steps in an exemplary wireless network topology tracking process.

FIG. 9 depicts a process that supports the capture, and in some cases visualization, of a wireless network topology over time. This mechanism utilizes the stateful analysis capabilities of the network behavior engine to capture and track the connectivity patterns of users and the networks that are established over time.

The monitoring process is initialized in step 910. Network data is accumulated over a defined time period (an epoch or interval) by processing network data in step 920 until an epoch is complete as determined in step 930. This epoch may vary in length depending upon the depth of analysis and state accumulation desired. In any case, at the end of an epoch, statistical and state analysis is performed on the accumulated data in step 940. In step 950, topology data is generated and/or updated from the network data and/or data generated in step 940.

Figure 4:
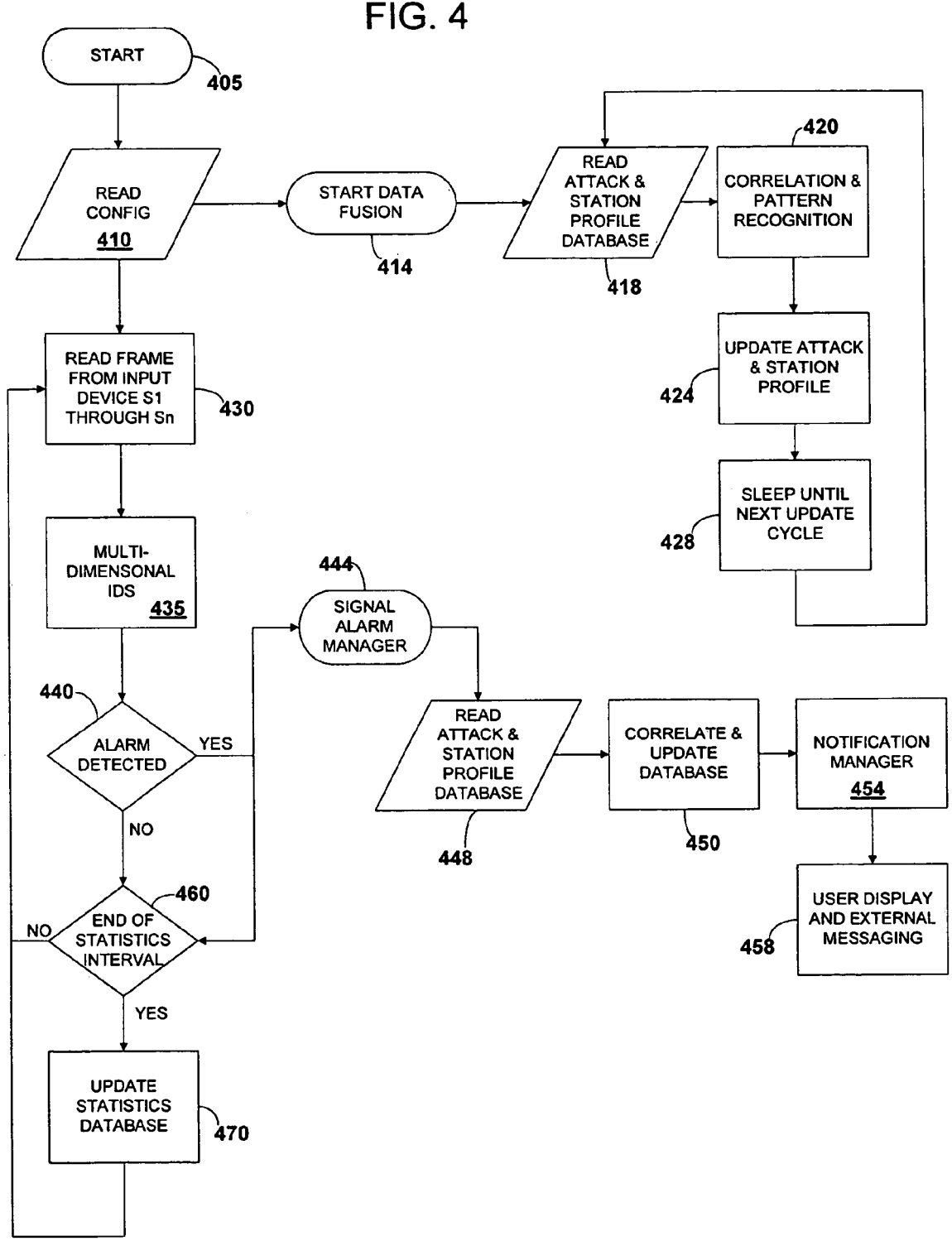
FIG. 4 is a flow chart of an example multiple input wireless intrusion detection process including multiple input correlation and long-term data fusion.

This data accumulation process (steps 910-940) can be the same monitoring process as depicted and described herein below with respect to FIG. 4. Initialization in step 910 can include the FIG. 4 configuration process as previously discussed. In such case, topology updating 950 would occur concurrently with, before or after the statics update step 470. In some such processes, the multidimensional IDS process step 435 can include testing for various departures from topology expectations.

Step 960, topology analysis may occur automatically after each epoch; alternatively, progression to step 960 may only occur as a result of an on-demand inquiry from a user or another system. In either case, the topology data can be analyzed in several ways.

For analysis purposes, this topology can then be represented mathematically as a graph, with a set of nodes and edges interconnecting the nodes per the observed pattern. This generated topology can also be further processed to generate a visualization or to compare with a prior network topology to evaluate potential security and/or policy violations. The topology comparison in some instances could include rules-based comparison for potential security and/or policy violations. In addition, or instead, the topology could be subject to a pattern matching-based comparison to identify a topology state that violates security and/or policy constraints. Any suitable pattern matching approach could be used; in some instances, neural networks, lexical analysis and/or bit masking could be included as part of such pattern matching. Through collection of state information related to activity, usage and connectivity patterns, the topology can be constructed and updated over time as new state information is collected by the system. Additional information also includes device identity and classification, allowing each node in the network to be represented in terms of its capabilities, its state and its usage patterns. Further, these patterns can also be analyzed via a number of mechanisms including pattern matching to discriminate between normal and anomalous activity.

Figure 12A:
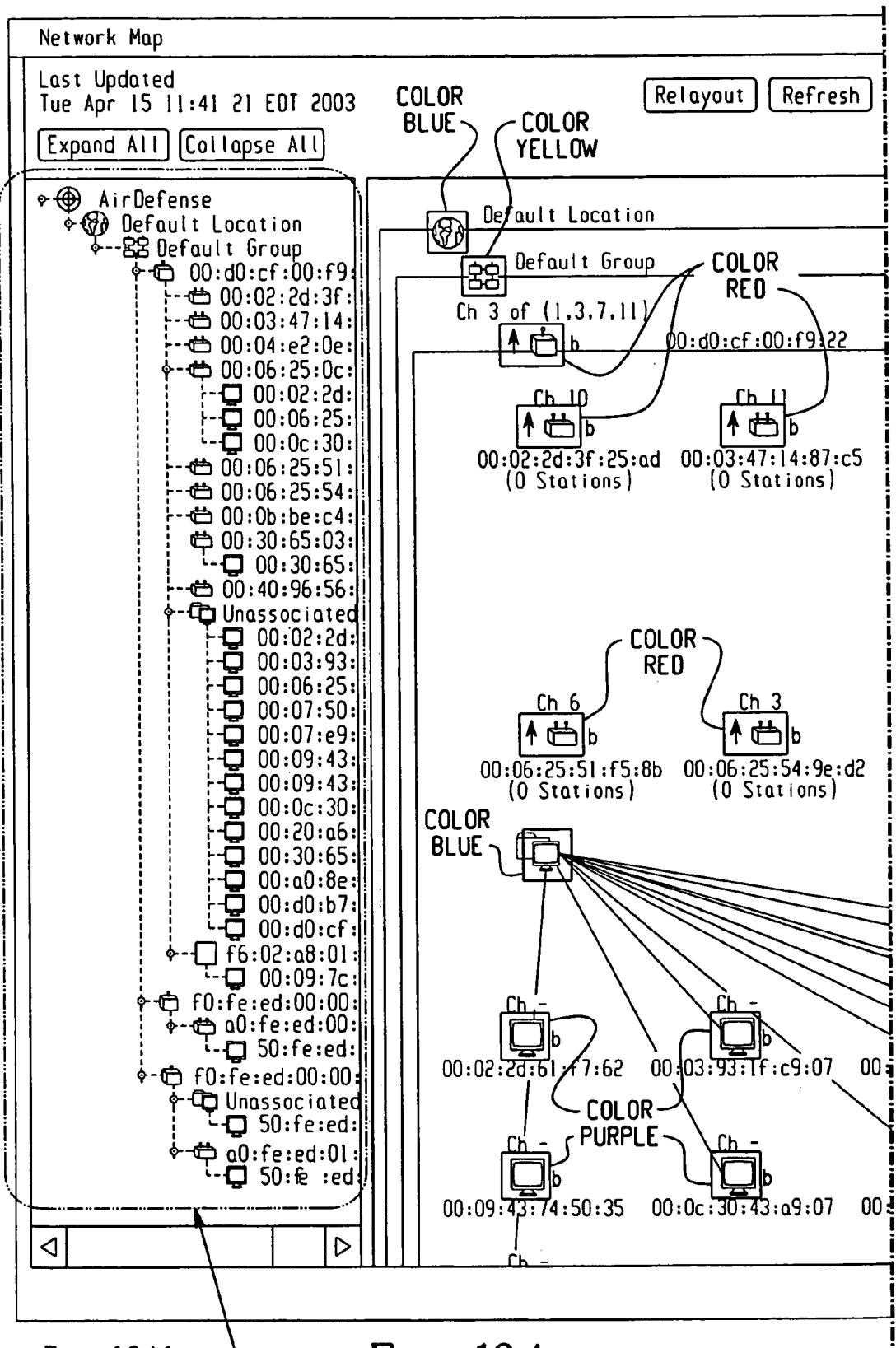
FIG. 12A-B is a figure depicting a sample visualization of a wireless network topology.
Figure 12B:
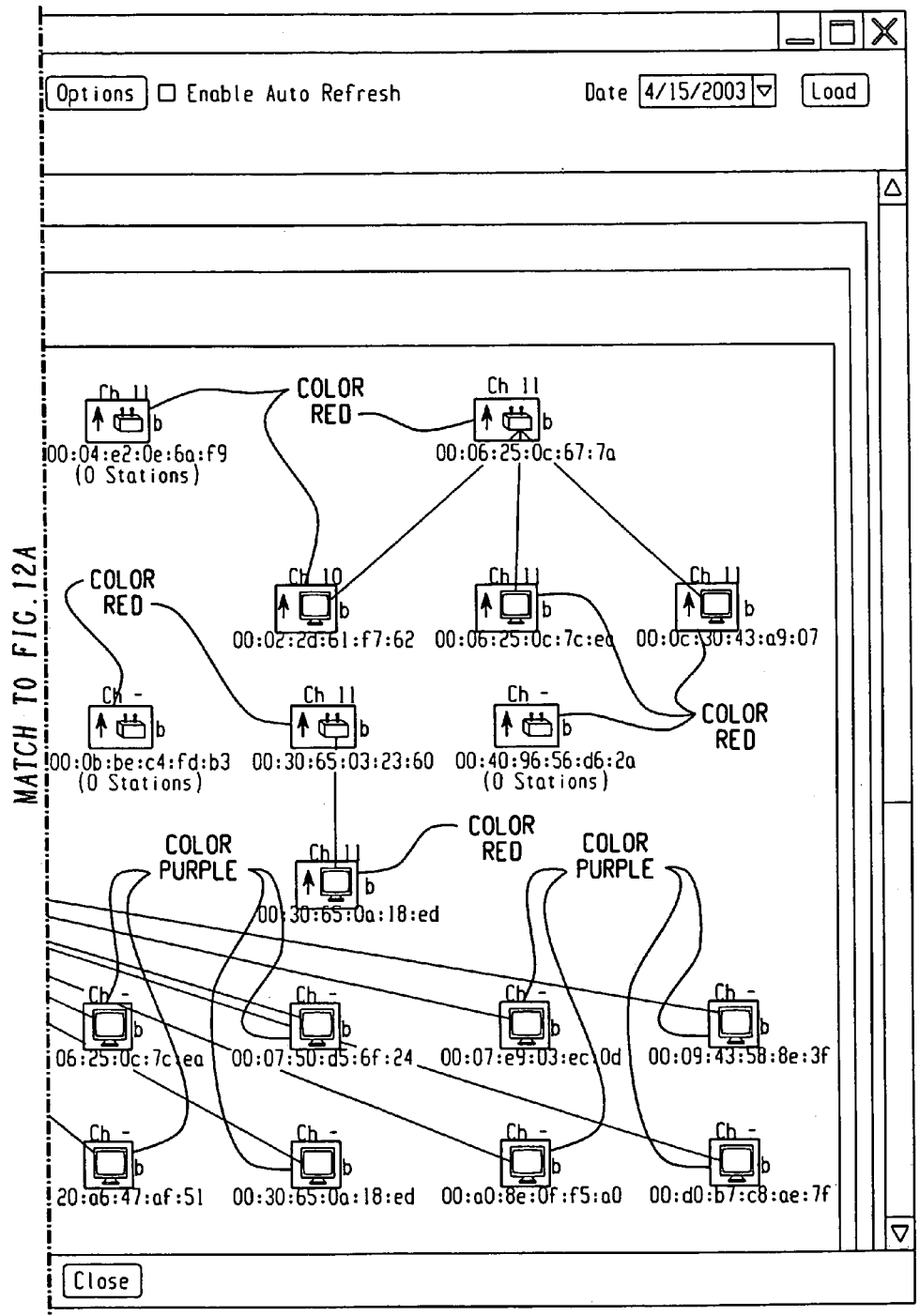

The analyzed topology data is then output in step 970. This topology information can be output as a visualization in some instances through the use of graphical representations with encodings for state, traffic, security; and connectivity. FIGS. 12A, 12A1 and 12B depict an example visualization interface showing a tracked topology. In such cases employing a graphical representation, color of various graphical items can be used to convey additional information regarding the state, traffic, security and connectivity of particular devices represented by the graphical items.

In one particular implementation as depicted in these figures, the colors have prescribed meanings as follows for sensors, access points/bridges and stations:

Sensors: Sensors can be blue, green or red and can have the letters L, S, LL, SS, SL, or LS. L means locked on channel, and S means scanning channels. The single versus double letters is for the two different types of hardware.
    Blue—Default Sensor that is a placeholder for imported/manual added devices that have not been observed yet.
    Green—Sensor is online.
    Red—Sensor is off-line.

Access Points/Bridges: Access Points and bridges can be blue, green, red, or gray.
    Blue: manually added or imported into the system but has not been observed yet
    Green: authorized
    Red: unauthorized
    Gray: ignored Stations: Wireless stations can be blue, green, red, gray, purple or orange. Stations can also have a W in them if they are on a watch list.
    Blue: manually added or imported into the system but has not been observed yet
    Green: authorized on the access point (could be current state or historical)
    Red: unauthorized on the access point (could be current state or historical)
    Gray: ignored
    Purple: unassociated wireless station
    Orange: adhoc station In addition to, or instead of, a visualization output, an alert could be generated if a topology violation were detected as a result of the analysis. Such a notification could be in the form of a communication to a user and/or another system as described in further detail below with respect to alerts.

To facilitate network performance optimization, calibration and location tracking, an infrastructure-based site survey mechanism can use deployed sensors or access points. These sensors can record wireless network RF signal characteristics per device per location per protocol and frequency band. These signal characteristics can then be used as calibration information describing the particular network being monitored.

In one implementation, site survey mode can be enabled via either explicit start/stop signaling passed to the sensor or access point or automatically via a prescribed "site-survey" data pattern. In the case of explicit signaling, the site survey client can perform a handshake with each monitoring sensor or access point, or with a proxy of all such sensors such as a centralized management subsystem that acts as a collection agent for one or more sensors, access points or combined sensor/access points. This handshake can be done in secure or non-secure mode, and can be used to start and stop data collection as well as to provide site survey client identifiers and calibration data such as position coordinate information. In secure mode, the contact can use encryption technology, authentication technology or combinations thereof. In the case of an automatic calibration, the prescribed pattern can use a defined "START SSID", "END SSID" and "IDLE SSID" to indicate that the client is starting a survey, ending a survey or transitioning between locations on the floor plan being surveyed and calibrated.

Synchronization of calibration location and RF signal data can be done via explicit exchange of physical coordinate and site survey client ID information as part of the start and stop signaling exchange. This can result in a virtual session that exist for the duration between the start and stop messaging exchange. During this time, data collected by the sensor(s) and Access Point(s) is tagged by calibration position and contains a vector of RF signal characteristics; such characteristics can include, without limitation, any combination of signal strength, signal-to-noise ratio, and noise level. Client identifiers can be a standard device hardware address, such as the MAC address, sent in combination with a recognized wireless service set ID (SSID).

Coordinate information can also be received. Such information can be encoded as pixel positions within a loaded bitmap that would typically represent the floor plan being surveyed and calibrated for location tracking. This information may be encoded into the probe requests or uploaded to the system via a post-processing step. The client identifiers are correlated with either encoding of the pixel positions within the probe requests as unique SSID values or through post-processing of the signal strength database in which the pixel positions and SSID values are uploaded and compared to the recorded SSIDs and signal strength values. This allows a linkage between the wireless survey client probing at pixel position (x,y,z) and the RF signal properties for this position that have been recorded by one or more sensors.

Figure 18:
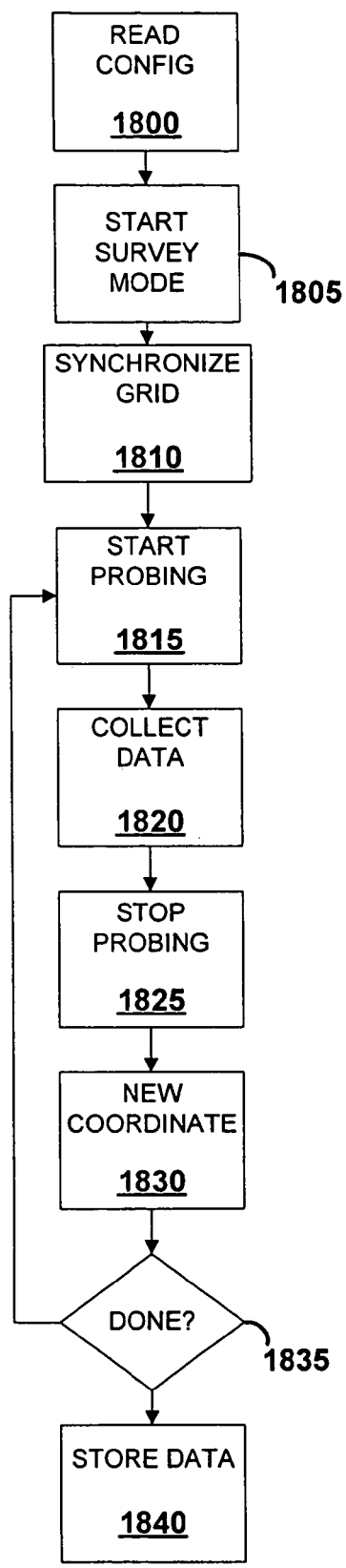
FIG. 18 is a flow chart depicting a site survey mechanism using deployed sensors or Access Points.

FIG. 18 depicts an infrastructure-based site survey mechanism utilizing deployed sensors or access points to facilitate network performance optimization. These signal characteristics can then be uploaded to a system data store where they may be used as calibration information describing the particular network being monitored. Alternatively, the characteristics can be processed locally or in a peer-to-peer environment in conjunction with other deployed sensors and/or access points.

In step 1800, configuration information associated with a wireless network and/or data collection agents and/or sensors associated therewith is read from a configuration file. In some instances, this step need not occur; in some such instances, configuration information is not required or can be determined implicitly or dynamically.

Site survey mode is initiated in step 1805. In some implementations, site survey mode can be enabled via either explicit start/stop signaling passed to the sensor or Access Point or automatically via a prescribed "site-survey" data pattern. In the case of explicit signaling, the site survey client typically performs a handshake with each monitoring sensor and/or Access Point, or with one or more proxies acting as data collection agents for all such sensors. This handshake can be done in secure or non-secure mode, and can be used to start and stop data collection as well as to provide site survey client identifiers and calibration data such as position coordinate information.

Synchronization of calibration location and RF signal data collection is begun in step 1810. In one implementation, this can occur via explicit exchange of physical coordinate and site survey client ID information as part of the start and stop signaling exchange. This results in a virtual session that exists for the duration between the start and stop messaging exchange.

Probing begins at step 1815. The sensors are used to record wireless network RF signal characteristics. In a typical implementation, the process loops through the steps 1815 to 1830 on a per device per location per protocol and frequency band basis. In step 1825, data collected by the sensor(s) or AP(s) is tagged by calibration position and contains a vector of RF signal characteristics. The RF signal characteristics can include a variety of attributes such as one or more of signal strength, signal-to-noise ratio, and noise level. Once probing is stopped in step 1825 for a particular iteration, the process moves to a new coordinate in step 1830, and determines if calibration is finished in step 1835. If a new coordinate is identified requiring probing, the process continues at step 1815 with the probing of the new coordinate.

Upon completion of calibration as determined at step 1835, the survey data is stored. Typically, the data can be uploaded to a database and stored based upon the client identifiers, the received coordinate information, the received RF signal characteristic data or combinations thereof in step 1840. The data is stored in the SDS. The portion of the SDS can be either local to the device performing the calibration such as a centralized management system, remote in a centralized data archive or distributed across surveyed clients or proxies.

The entire process can, in some implementations, be performed on a periodic or a periodic basis. The periodicity of periodic performance can be according to a predetermined maintenance, reporting and/or analysis schedule. A periodic repetition can occur as a result of an external request from a user or other system or upon occurrence of one or more predetermined events.

A graphic map of the site to be surveyed (e.g., pixel map/bitmap) can be used in some implementations as a backdrop for device coordinates. In some such implementations, coordinates in the survey can be correlated to pixel and/or bit positions in the graphic map.

Access Point Configuration

In some implementations, an interactive interface is provided for configuring the access point and various hardware components and supplying a variety of configuration data including thresholds values of various kinds. In one such implementation, an administration program area provides such an interface and allows:

- definition and configuration of access point settings and policies;
- definition of authorized user identities and authorized types or modes of behavior
- creation and/or designation of thresholds used to trigger intrusion/detection alarms for authorized access points;
- creation and/or designation of default thresholds used to trigger intrusion/detection alarms for non-authorized access points; and
- configuration of settings for the various hardware/software components.

The administration program area, in some environments, offers standard windowing interface featuring tabbed pages for easy navigation between configuration functions. From within each of the tabbed pages, an Edit button allows modification of the values. After editing the data, Accept temporarily saves the changes. Commit permanently saves and applies edits (until edited again). Accepted changes persist until the system is restarted whereas committed changes persist until across restarts.

One particular implementation automatically attempts to detect and record all the configured properties for all access points it observes. The settings constitute access point "policies"—when access point properties deviate from those recorded, one or more alarms can be generated. The values for an access point can be modified manually to alter the generation of specific alarms. Policies for off-line access points can also be created in some implementations using an Add feature.

The table below provides a summary of several access point properties displayable and/or configurable in some exemplary systems and methods.

| Values | Description |
|---|---|
| Access Point ID | The MAC address of the access point. |
| Access Point Name | The user-defined name of the access point. |
| Extended Service Set ID | The name of the Extended Service Set indicating the wireless network to which the access point belongs. |
| Access Point Vendor | The manufacturer of the access point. In some cases, this is detected by comparing the first three bytes of its MAC address with a database of OUI numbers. |
| Supported Rates | The data transfer rates the access point supports. In some cases, this value (or these values) can be edited to specify the supported rates. |
| Authentication Modes | Whether the access point accepts non-authenticated network connections and/or also accepts shared key authentication. (If connections are detected that deviate from either of these settings, an alarm can be generated.) |
| Configure to Run WEP | Whether or not the access point is configured to require WEP encryption. |
| AP Mgmt From Wireless Network | Whether the access point is configured to allow users to directly administer its settings over the wireless network. |
| Authorized Access Point | Whether this access point is authorized to be present in the air space. Unauthorized access points, when detected, can generate alarms. (In some instances, a change in this value will not take effect until the system is restarted.) |

For each access point, a station maintenance screen or menu may allow the specification of the stations that are authorized to use it. One particular exemplary implementation of such a screen or menu, automatically detects all stations within the footprint of the access point's Basic Service Set (BSS) and enters their MAC addresses in an Observed column. Such stations can be indicated as an authorized member of the BSS by selecting them in the Observed column and designating them as Valid. Designated stations are moved to a Valid column. (Stations can, in some instances, be designated as invalid by selecting and marking them in the Valid column.) Stations not auto-detected can be manually entered by specifying its MAC address in a Enter New Station input field and triggering an Add Station feature. Authorization of stations can also be done via file import, access control server export or via direct configuration through a typical access point configuration and management port.

Access Point Threshold Configuration and Aggregate Station Thresholds

Systems and methods can generate alerts if network traffic that exceeds thresholds is detected. In one particular implementation, all detected or manually configured off-line access points are listed in a SelectAP pick list. Thresholds associated with each access point in the pick list can be edited by selecting the particular access point. Such threshold values can be either temporary (until the next restart) or persistent across restarts (until a further edit designated as persistent).

| Values | Description |
|---|---|
| Signal Strength Threshold | If the signal strength for any station in the BSS is lower than this value, an alarm can be generated. |
| # of Associations per Minute | Enter the maximum number of associations per minute to allow with all stations combined. (Preferably, this value is not higher than twice the number of stations in the BSS.) |
| # of Associated Stations | Enter the maximum number of stations allowed to associate at any one time with this access point. The number should reflect the actual number of stations. If a greater number is detected, an alarm can be generated. |

The following table outlines a set of thresholds used in one particular implementation that refer to the network characteristics encompassing all stations and traffic in the BSS. Special care should be taken when creating the "byte thresholds" that immediately follow. Several factors govern the values entered for each:

The "transmission rate" of the access point—how much data it can transmit—is the first consideration. If the transmission rate is only 1 megabyte per second, the thresholds will be much lower than if the transmission rate is 11 megabytes per second.

All four "directions" of traffic (wired to wired, wired to wireless, wireless to wired, and wireless to wireless) must add up to less than 100% of available bandwidth. Many administrators will set the individual thresholds such that their combined value is less than 80% of available bandwidth.

| Value | Description |
|---|---|
| # Bytes into BSS from Wired Net | Enter the maximum number of bytes of data per minute allowed into the BSS from the wired portion of your network. If a greater number is detected, an alarm can be generated. |
| # Bytes from BSS to Wired Net | Enter the maximum number of bytes of data per minute allowed out of the BSS to a wired portion of your network. If a greater number is detected, an alarm can be generated. |
| # Bytes between Stations in BSS | Enter the maximum number of bytes of data per minute allowed to be transmitted within the BSS from all stations. If a greater number is detected, an alarm can be generated. |
| # Bytes from Wired Net to Wired Net | Enter the maximum number of bytes of data per minute allowed to be transmitted from a wired portion of the network to another wired portion of the network, using the access point as a bridge. If a greater number is detected, an alarm can be generated. |
| Total Data Frames Seen | Enter the maximum number of data frames per minute from all stations combined allowed to be transmitted. If a greater number is detected, an alarm can be generated. |
| Total Mgmt Frames Seen | Enter the maximum number of management frames per minute from all stations combined allowed to be transmitted. If a greater number is detected, an alarm can be generated. |

-continued

| Value | Description |
|---|---|
| Total Ctrl Frames Seen | Enter the maximum number of control frames per minute from all stations combined allowed to be transmitted. If a greater number is detected, an alarm can be generated. |
| Total Ad hoc Frames Seen | Enter the maximum number of ad hoc frames per minute from all stations combined allowed to be transmitted. If a greater number is detected, an alarm can be generated. |

Individual Station Thresholds

The following table outlines a set of potential thresholds applied to any individual station in one particular implementation. If any single station reaches one of these thresholds, an alarm can be generated.

| Column | Description |
|---|---|
| Signal Strength Threshold | If the signal strength for any station in the BSS is lower than this value, an alarm can be generated. |
| # of Associations per Minute | Enter the maximum number of associations per minute any station is allowed to make with an access point. If a greater number is detected, an alarm can be generated. |
| # of Bytes Transmitted | Enter the maximum number of bytes of data per minute any station is allowed transmit. If a greater number is detected, an alarm can be generated. |
| # of Bytes Received | Enter the maximum number of bytes of data per minute any station is allowed to receive. If a greater number is detected, an alarm can be generated. |
| # of Data Frames Transmitted | Enter the maximum number of data frames per minute any station is allowed to transmit. If a greater number is detected, an alarm can be generated. |
| # of Data Frames Received | Enter the maximum number of data frames per minute any station is allowed to receive. If a greater number is detected, an alarm can be generated. |
| # of Mgmt Frames Transmitted | Enter the maximum number of management frames per minute any station is allowed to transmit. If a greater number is detected, an alarm can be generated. |
| # of Mgmt Frames Received | Enter the maximum number of management frames per minute any station is allowed to receive. If a greater number is detected, an alarm can be generated. |
| # of Ctrl Frames Transmitted | Enter the maximum number of control frames per minute any station is allowed to transmit. If a greater number is detected, an alarm can be generated. |
| # of Ctrl Frames Received | Enter the maximum number of control frames per minute any station is allowed to receive. If a greater number is detected, an alarm can be generated. |
| # of Fragment Frames Seen | Enter the maximum number of fragment frames per minute from any station that are allowed. If a greater number is detected, an alarm can be generated. |
| # of Decrypt Error Frames Seen | Enter the maximum number of decrypt error frames per minute from any station that are allowed. If a greater number is detected, an alarm can be generated. |

Access Point Station Thresholds

The following table outlines a set of thresholds, in one particular implementation, applied to the access point itself, and will typically be somewhat more than the Aggregate Station thresholds.

| Column | Description |
|---|---|
| Signal Strength Threshold | If the signal strength for any frame is lower than this value, an alarm can be generated. |
| # of Associations per Minute | Whereas stations must associate with an access point, access points do not associate with themselves. Therefore, this value should be zero, indicating that it does not associate. |
| # of Bytes Transmitted | Enter the maximum number of bytes of data per minute this access point is allowed to transmit. If a greater number is detected, an alarm can be generated. |
| # of Bytes Received | Enter the maximum number of bytes of data per minute this access point is allowed to receive. If a greater number is detected, an alarm can be generated. |
| # of Data Frames Transmitted | Enter the maximum number of data frames per minute this access point is allowed to transmit. If a greater number is detected, an alarm can be generated. |
| # of Data Frames Received | Enter the maximum number of data frames per minute this access point is allowed to receive. If a greater number is detected, an alarm can be generated. |
| # of Mgmt Frames Transmitted | Enter the maximum number of management frames per minute this access point is allowed to transmit. If a greater number is detected, an alarm can be generated. |
| # of Mgmt Frames Received | Enter the maximum number of management frames per minute this access point is allowed to receive. If a greater number is detected, an alarm can be generated. |
| # of Ctrl Frames Transmitted | Enter the maximum number of control frames per minute this access point is allowed to transmit. If a greater number is detected, an alarm can be generated. |
| # of Ctrl Frames Received | Enter the maximum number of control frames per minute this access point is allowed to receive. If a greater number is detected, an alarm can be generated. |
| # of Fragment Frames Seen | Enter the maximum number of fragment frames per minute this access point can see before generating an alarm. |
| # of Decrypt Error Frames Seen | Enter the maximum number of decrypt error frames per minute this access point can see before generating an alarm. |

Default Threshold Information

In one particular implementation, whenever a new access point is detected or manually entered, the specified default settings are applied until it is manually customized. It is assumed that new or unauthorized access points are potential hackers, so it is preferable to set the default thresholds fairly low.

Aggregate Station Thresholds

The table below outlines a set of thresholds that refer to the combined statistics for all stations in one particular implementation.

| Column | Description |
|---|---|
| Signal Strength Threshold | If the signal strength for any station in the BSS associated with an unknown access point is lower than this value, an alarm can be generated. |
| # of Associations per Minute | Whereas stations must associate with an access point, access points do not associate with themselves. Therefore, this value should be zero, indicating that it does not associate. |

-continued

| Column | Description |
|---|---|
| # of Associated Stations | Enter the maximum number of stations allowed to associate with unknown access points. The number should reflect your actual stations. If a greater number is detected, an alarm can be generated. |
| # Bytes into BSS from Wired Net | Enter the maximum number of bytes of data per minute allowed into the BSS through unknown access points from the wired portion of your network. If a greater number is detected, an alarm can be generated. |
| # Bytes from BSS to Wired Net | Enter the maximum number of bytes of data per minute allowed out of the BSS through unknown access points to a wired portion of your network. If a greater number is detected, an alarm can be generated. |
| # Bytes between Stations in BSS | Enter the maximum number of bytes of data per minute allowed to be transmitted within the BSS from all stations through unknown access points. If a greater number is detected, an alarm can be generated. |
| # Bytes from Wired Net to Wired Net | Enter the maximum number of bytes of data per minute allowed to be transmitted through unknown access points from a wired portion of the network to another wired portion of the network, using the access point as a bridge. If a greater number is detected, an alarm can be generated. |
| Total Data Frames Seen | Enter the maximum number of data frames per minute for all stations combined allowed to be transmitted through unknown access points. If a greater number is detected, an alarm can be generated. |
| Total Mgmt Frames Seen | Enter the maximum number of management frames per minute for all stations combined allowed to be transmitted through unknown access points. If a greater number is detected, an alarm can be generated. |
| Total Ctrl Frames Seen | Enter the maximum number of control frames per minute for all stations combined allowed to be transmitted through unknown access points. If a greater number is detected, an alarm can be generated. |
| Total Ad hoc Frames Seen | Enter the maximum number of ad hoc frames per minute for all stations combined allowed to be transmitted through unknown access points. If a greater number is detected, an alarm can be generated. |

Individual Station Thresholds

The set of thresholds outlined in the table below apply to any individual station in one particular implementation, and will typically be lower than the Aggregate Station thresholds.

| Column | Description |
|---|---|
| Signal Strength Threshold | If the signal strength for any station associated with an unknown access point is lower than this value, an alarm can be generated. |
| # of Associations per Minute | Enter the maximum number of associations per minute any station is allowed to make with an unknown access point. If a greater number is detected, an alarm can be generated. |
| # of Bytes Transmitted | Enter the maximum number of bytes of data per minute any station is allowed transmit through unknown access points. If a greater number is detected, an alarm can be generated. |
| # of Bytes Received | Enter the maximum number of bytes of data per minute any station is allowed to receive through unknown access points. If a greater number is detected, an alarm can be generated. |

-continued

| Column | Description |
|---|---|
| # of Data Frames Transmitted | Enter the maximum number of data frames per minute any station is allowed to transmit through unknown access points. If a greater number is detected, an alarm can be generated. |
| # of Data Frames Received | Enter the maximum number of data frames per minute any station is allowed to receive through unknown access points. If a greater number is detected, an alarm can be generated. |
| # of Mgmt Frames Transmitted | Enter the maximum number of management frames per minute any station is allowed to transmit through unknown access points. If a greater number is detected, an alarm can be generated. |
| # of Mgmt Frames Received | Enter the maximum number of management frames per minute any station is allowed to receive through unknown access points. If a greater number is detected, an alarm can be generated. |
| # of Ctrl Frames Transmitted | Enter the maximum number of control frames per minute any station is allowed to transmit through unknown access points. If a greater number is detected, an alarm can be generated. |
| # of Ctrl Frames Received | Enter the maximum number of control frames per minute any station is allowed to receive through unknown access points. If a greater number is detected, an alarm can be generated. |
| # of Fragment Frames Seen | Enter the maximum number of fragment frames per minute from any station that are allowed. If a greater number is detected, an alarm can be generated. |
| # of Decrypt Error Frames Seen | Enter the maximum number of decrypt error frames per minute from any station that are allowed. If a greater number is detected, an alarm can be generated. |

Access Point Station Thresholds

The set of thresholds in the table below applies to all unauthorized access points in one particular implementation.

| Column | Description |
|---|---|
| Signal Strength Threshold | If the signal strength for any access point is lower than this value, an alarm can be generated. |
| # of Associations per Minute | Enter the maximum number of associations per minute between any access point and stations. (It is recommended that this value not be higher than twice the number of stations in your BSS.) |
| # of Bytes Transmitted | Enter the maximum number of bytes of data per minute allowed to be transmitted from any access point. If a greater number is detected, an alarm can be generated. |
| # of Bytes Received | Enter the maximum number of bytes of data per minute allowed to be received by any access point. If a greater number is detected, an alarm can be generated. |
| # of Data Frames Transmitted | Enter the maximum number of data frames per minute allowed to be transmitted by any Access point. If a greater number is detected, an alarm can be generated. |
| # of Data Frames Received | Enter the maximum number of data frames per minute allowed to be received by any access point. If a greater number is detected, an alarm can be generated. |
| # of Mgmt Frames Transmitted | Enter the maximum number of management frames per minute allowed to be transmitted by any access point. If a greater number is detected, an alarm can be generated. |
| # of Mgmt Frames Received | Enter the maximum number of management frames per minute allowed to be received by any access point. If a greater number is detected, an alarm can be generated. |

-continued

| Column | Description |
|---|---|
| # of Ctrl Frames Transmitted | Enter the maximum number of control frames per minute allowed to be transmitted by any access point. If a greater number is detected, an alarm can be generated. |
| # of Ctrl Frames Received | Enter the maximum number of control frames per minute allowed to be received by any access point. If a greater number is detected, an alarm can be generated. |
| # of Fragment Frames Seen | Enter the maximum number of fragment frames per minute allowed for any access point. If a greater number is detected, an alarm can be generated. |
| # of Decrypt Error Frames Seen | Enter the maximum number of decrypt error frames per minute allowed for any access point. If a greater number is detected, an alarm can be generated. |

Some environments may allow for self-configuration of some or all of the thresholds discussed above. Such self-configuration could occur through a learning mode in which the systems and methods can monitor traffic on the wireless computer network for the first several hours or days after installation. In such a learning mode, alarm notifications can be disabled. It is expected that, in the beginning, the generation of alarms will be very high—hundreds or thousands per day depending on actual network traffic—until thresholds in accordance with the network's normal activity are determined. Once an accurate picture of normal network traffic has been captured, and thresholds are reflective of normal activity, a switch to normal operations mode enables alarm notifications.

In one particular implementation, a command line interface is provided to configure settings that are not available within the graphical user interface. For example, the IP address of a hardware component can be changed, its system clock reset or set to "sync" with a network time server. In other implementations, the graphical user interface and/or the command line interface can allow significant overlap of configuration capability. Further, some implementations have only one or the other interface type. Finally, some implementations provide no interactive interface for configuration and are limited to reading configuration data from a file, deriving configuration data from past monitoring of the wireless computer network or otherwise receiving this data. The command line interface in one particular implementation can be accessed either on the hardware component such as through a command shell such as the Linux Gnome Terminal or over the network using an SSH (preferably, version 2) client.

In one particular implementation, a command shell automatically opens on the hardware component after booting. A terminal icon can appear on the task bar at the bottom of the display; clicking the icon opens additional terminal windows. At the command line prompt, a command is entered to launch the command line interface.

An SSH client is launched and connected to the hardware component's IP address. The identity of the user making the connection is verified. At the command line prompt, enter the following command to launch the command line interface:

Command Line Interface

In one particular implementation, the screen displays in the terminal window provide five "program areas":

Network—offering options to change IP address, DNS servers, hostname, domain name, mail server, ARP, and create "allow" and "deny" lists.

Date—allowing time and date editing, time zone setting, and configuration of an NTP server.

Service—providing tools to fine-tune the hardware component parameters, configure data management, and reboot and shut down the component.

Users—allowing creation, editing, and deletion of user accounts allowed access to the graphical user interface.

Help—tips on using the application, and detailed help topics.

Network

Opening the network settings program area, the following commands are available in one particular implementation:

| Command | Description |
|---|---|
| IP | IP address config<br>Allows modification of the IP address, Subnet mask, and default gateway for the hardware component logged onto. The "IP configuration" screen opens, displaying the current network configuration and allows modification. |
| DNS | Define DNS servers<br>Adding or deleting a DNS nameserver.<br>The "Nameserver screen" opens, displaying your current DNS server's IP address and allows addition, deletion and modification.<br>Note: Multiple DNS servers can in some cases have an "order" for processing DNS requests. The first server on the list (identified by the numeral 1) is the first to offer name resolution; the second server on the list (identified by the numeral 2) is the second to process the request if the first is unable to do so. In order to change the order preference of multiple servers, all must be deleted and re-entered in the desired order for them to process DNS requests. |
| HNAME | Set hostname<br>Changing the name of the hardware component. The Hostname screen displays your current hostname and allows modification.<br>Bear in mind that whenever the hostname is changed, its name must also be modified in all devices that refer to it (e.g., DNS servers). |
| DNAME | Set domain name<br>Changing the domain to which the hardware component belongs. The Domain name screen displays your current domain name and allows modification.<br>Bear in mind that whenever the domain name is changed, it must also be modified in all devices that refer to it (e.g., DNS servers). |
| MRELAY | Config mail relay host<br>Configuring a hardware component to send alarms by email. The Mail relay host screen appears and allows entry of qualified hostnames.<br>In one particular environment, mail relay hosts may be referred to by IP address or fully qualified hostname (e.g., myhostname.mydomainname.com) of a mail server to process email alarm messages.<br>Note: the mail server must be configured to allow this appliance to relay email through it, or at least to direct its mail to another mail server that will relay it. |
| ARP | Config permanent ARP table<br>Creating a permanent ARP table. The ARP table screen displays your current ARP records and allows modification.<br>In order to protect connections between this hardware component and remote administrators from being hijacked by man-in-the-middle ARP "blasts" (that redirect traffic for this IP address to an alternate MAC address), it is preferable to create permanent ARP records for gateways and other important machines. |

-continued

| Command | Description |
| --- | --- |
| HALLOW | Configure/etc/hosts.allow file
Specifying which machines are allowed to connect to the hardware component. The Allow list screen displays your current list of allowed machines and allows modification.
Machines allowed to connect to this hardware components can be specified. Only those whose IP address, subnet, fully qualified hostname, or domain name match an entry in this list are allowed to connect to this hardware component to run the available administrative programs and routines. |
| HDENY | Config/etc/host.deny file
Identifying machines that may not connect to the hardware component. The Deny list screen displays your current list of denied machines and allows modification.
Machines not allowed to connect to this hardware component can be specified. Anyone whose IP address, subnet, fully qualified hostname, or domain name matches an entry in this list are not allowed to connect to this hardware component
Note: HALLOW, in one particular implementation, takes precedence over HDENY. For example, if 123.456.789.963 is on the allow list, yet the subnet 123.456.789. is on the deny list, the individual machine above is allowed to connect to the appliance. |

Opening the date settings program area, the following commands are available in one particular implementation:

| Command | Description |
| --- | --- |
| TIME | Time/Date config
Allows configuration of the time/date for the hardware component. |
| TZ | Set time zone
Allows configuration of the time zone for the hardware component. |
| NTP | Enable/disable NTP
Allows configuration of the hardware component to use a network time server. |

Note: If you change the system time because, for example, you move the appliance's location from the east to west coast of the United States, you must also locate a new network time server in the same time zone.

Services

Opening the set appliance parameters, configure data management, and restart or shutdown the system area, the following commands are available in one particular implementation:

| Command | Description |
| --- | --- |
| TUNE | Tune appliance parameters
Allows users to modify some of the core values related to the environment's functionality. |
| DMGT | Data management
Allows users to modify how the environment stores its data. |
| REBOOT | Reboot system
Allows graceful restart of the hardware component. |
| HALT | Halt system
Allows graceful shutdown of the hardware component. |

Users

Opening the Users program area, the following commands are available in one particular implementation:

| Command | Description |
| --- | --- |
| NEWU | Create user |
| EDITU | Edit user |
| DELU | Delete user |

The functionality of these features can in one particular implementation match with like functionality provided in a standard LINUX user management facility.

Various methods and functions as exhibited in various systems described above and below with respect to dynamic sensor discovery and selection. In some implementations, one or more processors within architectures of the environments as described above may execute the steps in such methods and provide such functionality. The functionality may spread across multiple processing elements. In other cases, any suitable computer readable storage device, media or combination of devices and/or media, including primary storage such as RAM, ROM, cache memory, etc. or secondary storage such as magnetic media including fixed and removable disks and tapes; optical media including fixed and removable disks whether read-only or read-write; paper media including punch cards and paper tape; or other secondary storage as would be known to those skilled in the art, may store instruction that upon execution by one or more processors cause the one or more processors to execute the steps in such methods and to provide such functionality.

Vulnerability Assessment and Threat Identification

Vulnerability assessment is accomplished by analyzing WLAN traffic, and discovering access points and workstations. The system determines how many bytes of data stations are sending and receiving, the mean signal strength for an entire day or the hi/low signal strength for each minute. It can distinguish between network traffic internal to the wireless network and traffic originating from or destined to the physical, wired-network and which stations are the largest senders and receivers of data. The system produces broad summaries of data that report high, low, and mean values for a variety of traffic parameters, and detailed views that show minute-by-minute snapshots of your traffic. Traffic parameters include the breakdown of frame traffic (control, management, data, and error frames) and network routing information. The system determines if any traffic has not been encrypted, users are authenticated, and all hardware is properly configured. The system detects rogue deployments by identifying and locating unauthorized WLANs and ad hoc networks (peer-to-peer networks) that violate company policy and jeopardize security. The system identifies suspicious WLAN traffic across unauthorized channels and frequencies, which can be a common sign of intruders accessing your WLAN or employees abusing their network privileges.

The systems and methods according to one particular implementation use an audit of existing wireless hardware and perform a survey the air space surrounding the wireless network prior to activating intrusion detection. In this way, a baseline activity level can be determined.

Step 1: Hardware Audit

Identify every access point in the wireless computer network. Obtain or determine for each its MAC address, Extended Service Set name, manufacturer, supported transmission rates, authentication modes, and whether or not it is configured to run Wired Equivalent Privacy (WEP) and wireless administrative management. In addition, identify every workstation equipped with a wireless network interface card, and record the MAC address of each device. Take note of any physical features in the environment (walls, competing electronic devices such as microwave ovens, cordless phones, etc.) that might interfere with wireless signals.

The hardware audit serves as the baseline against which the systems and methods described herein can compare. That is, all access points and wireless stations should be detected by the various systems and methods described herein. (If an access point or station is not detected, follow logical troubleshooting steps.) On the other hand, it is likely that more devices than expected will be detected. Some of these may be stations or access points not identified or of which no one was aware. Others may be "rogue" devices—surreptitious or unauthorized installations in the network—or harmless equipment belonging to nearby companies, and others may be actual hackers. Once the systems and methods are in intrusion detection mode, all detected access points and stations can be reported.

Step 2: Survey Perimeter

Preferably a mobile hardware component is walked around the perimeter of the wireless computer network in a powered up state (allowing it to collect data as it is moved), or placed in a central location for 12 to 24 hours to collect a larger amount of data. A set of one or more distributed sensors could be used instead of, or in addition to, such a mobile hardware component. The benefit of a "walk-around" survey is that it generates a nearly immediate picture of the existing wireless "air space." The benefit of a "stationary" survey is that over a longer period of time, is greater certainty of detecting devices that only operate intermittently or hackers attempting to penetrate the network off-hours. Repetition of the survey, whether walking or stationary, should occur on all 11 channels.

Stationary Data Collection

Depending on the size of the wireless network, a hardware component can be placed at the four corners or at intermediate points in the Extended Service Set footprint. At each location, the component should be allowed to passively monitor network traffic for 12-24 hours. Hard copy of network data should be preserved prior to each move.

Walk-Around Data Collection

Simply walk around the perimeter of the wireless network with the hardware component powered on and open to an overview screen. The various access points and stations within the wireless computer network can be detected. Compare this information with the hardware audit made prior to collecting this data. Repeat this walk-around survey for each of the eleven channels.

Step 3: Configure to "Recognize " this Network

Each access point detected should be designated as authorized or unauthorized. Each observed station should be designated as valid or not.

Step 4: Place Hardware Components in Discrete Locations throughout the Wireless Network.

Leave a component in each location from 1-3 days. Each day, print reports to preserve captured information. Based upon this information, specific access point and station related thresholds can be tuned to distinguish between normal and abnormal traffic patterns.

Figure 3:
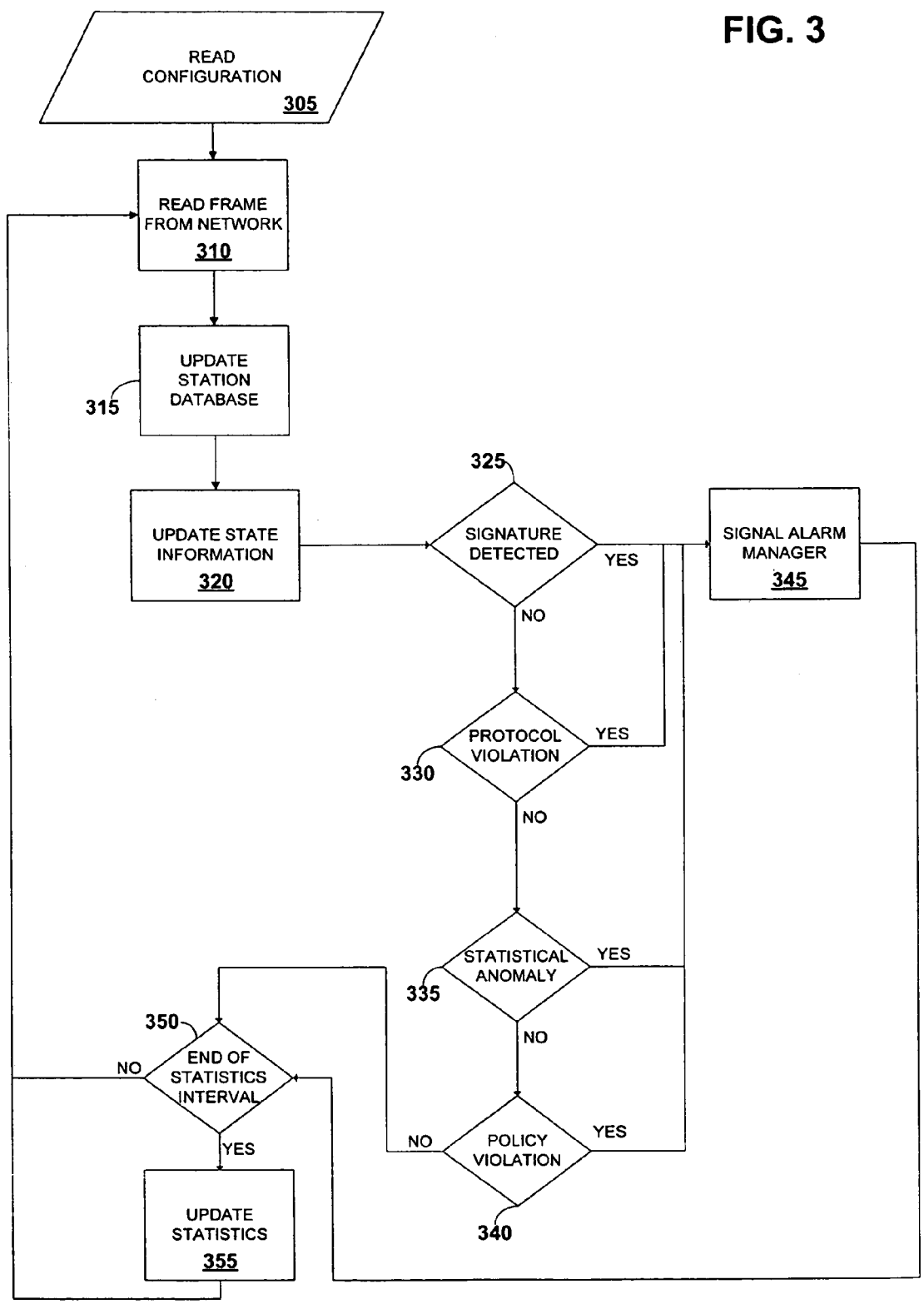
FIG. 3 is a flow chart of a multi-dimensional wireless intrusion detection process.

The intrusion detection system (IDS) engine listens to wireless network traffic. FIG. 3 depicts one preferred process the IDS follows in evaluating data associated with received traffic. In the depicted exemplary process, all packets pass through four detections systems: signature-based testing, protocol-based testing, anomaly-based testing, and policy deviation-based testing; other implementations may use one or more of these tests, or other tests, in varying combinations.

Initially, configuration information is received in step 305, typically including network default data and risk criteria. This information can be retrieved from a file, derived or obtained from monitoring the network and/or entered interactively at the outset of the process. The system reads or receives frames from the wireless network in step 310. The received frames are interrogated as follows.

The information within the frame is interrogated to determine if a known attack signature has been identified in step 325. Signatures encode datalink layer attack patters as combinations of packet sequences and state. For example, active probing emits a pattern or sequence of network requests. This sequence can be recognized by its packet sequence signature. If the attack signature is identified, the intrusion detection system signals an alarm manager to deliver an alert to the administrator in step 345.

If no attack signature is identified, the frame information is passed through a protocol violation engine to determine if the protocol used in the frame is authorized in step 330. Protocol analysis examines whether or not protocol usage is legitimate. For example, emitting a large number of association or disassociation requests in a short interval is not a legitimate use of the protocol. If the protocol used in the frame is outside of the authorized protocol set, the intrusion detection system signals an alarm manager to deliver an alert to the administrator in step 345.

If the protocol test passes, in step 335, the IDS checks the frame data for statistical anomalies against the SDS, or a statistics database maintained therein. Anomaly based detection computes such values as the mean, non-zero mean, standard deviation, autocorrelation and peak for each time slice throughout the day. This can be used to create a normalized statistics database for each time slice and user. Current activity is then monitored and compared with the recorded statistics vector. If the difference is larger than a configurable threshold, an alert is generated. Instead of, or in addition to, this approach, a Bayes test can be applied to deduce the probability that the current statistics vector is an attack as opposed to a legitimate sequence. If an anomaly exists, the intrusion detection system signals an alarm manager to deliver an alert to the administrator in step 345.

If no anomaly is detected, the system interrogates the frame to determine if a pre-defined policy has been violated in step 340. Policy testing compares the observed activity with a configurable set of activity rules stored in the SDS. For example, a rule can declare that only specific hosts with specific addresses and specific network cards can access the network. If a pre-defined policy has been violated, the intrusion detection system signals an alarm manager to deliver an alert to the administrator in step 345.

The tests outlined above and depicted in FIG. 3 are performed serially. In other implementations, one or more of these tests may occur in parallel. Further, subsequent tests only occur if a prior test was passed. In a further implementation, all tests occur irrespective of the outcome of a prior test; consequently, a single read frame could potentially generate an alarm for every test performed on it.

Alerts can be in the any suitable form delivered to any suitable platform including, without limitation, a screen display to a monitor, a page to a pager, an outgoing voice call to telephone, a SMS message to a mobile telephone, an e-mail message to a valid address, posted to a Web page available via an appropriate Web server or WAP alert to a WAP enabled device. Various types of screen displays and reports may be used to provide information regarding generated alarms.

In one particular implementation referred to as AirDefense Mobile in U.S. Provisional Patent Application Ser. No. 60/381,829 entitled "SYSTEMS AND METHODS FOR NEWTORK SECURITY" filed May 20, 2002, preferred interfaces for reviewing and reporting alarms are described in detail. The contents of this application are hereby incorporated by this reference herein for all purposes.

In some environments, the outputs of all IDS test are then compared and a confidence level computed in step 345. In one such, in the case where only a statistical anomaly is detected, it is flagged as a lower level performance alert. In the case where one or more other violations are detected, the alarm is elevated to an intrusion alarm.

Some environments may use a variety of data stores in implementing the above process to track data across multiple iterations of the process; such data stores can in one preferred embodiment be part of an SDS as described above. Some such environments can include a statistics database, a station database and/or a state data store. In such environments, some or all of the following steps depicted in FIG. 3 can occur.

In step 315, a station database is updated. This database contains, in one implementation, per station and per access point records with information describing device address, communications state, timestamps of first and last activity, counts of byte transmissions and local policy information describing whether device is authorized or not for usage in the monitored network.

In step 320 state information is updated. State refers to whether or not the device has been seen before and whether or not the station is unauthenticated and unassociated, authenticated, authenticated and associated or unknown state information associated with the wireless computer network.

In step 350, a determination is made as to whether a particular statistics interval has been complete. If so, statistics in an SDS are updated in step 355, and processing continues with the next frame in step 310. Otherwise, processing simply continues in step 310 with the next reading or receiving of a frame.

A modified and enhance version of the above approach is used where network traffic is monitored from multiple input devices such as with the configurations depicted in FIGS. 2B-E. FIG. 4 depicts this enhanced process starting at step 405.

Step 410 is analogous to step 305 from the process of FIG. 3. In step 410, configuration information is received. As before, this is typically done through reading system configuration files, monitoring the network and/or interactive entry at the outset of the process. This information typically includes network default data and risk criteria such as access point configuration data (MAC Address of the access point, Access Point Name, etc.), station configuration data and various thresholds values.

In step 430, a wireless packet frame is received from each input device (e.g., hardware components 210A-D, host system 220 and/or sensors 230A, 230B). Frames are read so that the frame content can be interrogated.

Each read frame is interrogated by a multi-dimensional intrusion detection system (IDS) such as detailed above with respect to FIG. 3, and the outputs of all IDS tests are then compared and a confidence level computed in step 435. As with the process above, other tests either alone, in combination with each other or in combination with one or more of those described above may be used in other implementations.

In step 440, in the case where only a statistical anomaly is detected, it is flagged as a lower level performance alert. In the case where, in addition to the statistical anomaly, one of the other violations has been detected, the alarm is elevated to an intrusion alarm and an alarm manger is alerted in step 444. Other implementations do not rely on aggregate test outcome but determine alarm status on single test outcomes. Further, some implementations can use other test types and outcome combinations to determine type and severity of alarms generated.

If an alarm is not detected in step 440, a test to see if a predetermined interval for gathering statistics has been reached occurs in step 460. If the end of the pre-configured statistics gathering interval has occurred, the SDS is updated in step 470 to reflect the statistics gathered from the received frames over the interval. Statistics are gathered by monitoring traffic between network nodes, minute-by-minute statistics about BSS frame types and traffic volumes, summaries of transmission statistics for all stations associated with access points, current-minute transmission statistics for all Stations, and detailed minute-by-minute transmission statistics for any individual station in the wireless computer network.

Data fusion occurs on a batch basis by aggregating data from multiple databases. This process begins at step 414. The process integrates statistical data from multiple databases that is generated through frame monitoring and intrusion detection engines. This approach provides a methodology for managing data received from input devices such as hardware devices 210A-D and/or sensors 230A, 230B deployed at multiple sites and for aggregating enterprise data at a single central system such as host 220.

The Attack and Station Profile database is read at step 418 to begin a processing loop to integrate databases from separate sources. Correlation and pattern recognition is performed at step 420 to update the attack and station profiles in step 424. The processing loop then sleeps at step 428 until the next processing loop interval is to take place based on the pre-configured time interval or trigger.

After the alarm manager is signaled in step 444, the attack and station profile database is read in step 448; in this step, existing attacks are queried and existing station security state is queried. In step 450, this data is compared to the newly generated alarm. If it is sufficiently similar, no new external notification occurs in step 454. If it is not, a new notification message is generated in step 454 and console display and/or external messaging of the alarm occurs in step 458.

In some environments, the scanning of air waves for network activity can be adaptive in nature. In a typical configuration, wireless network channels are scanned for activity according to a predefined pattern. According to an adaptive approach, the predefined pattern can serve as an initial and/or baseline pattern. This pattern can then be adapted based upon actual activity in the scanned channels.

This mechanism allows the system to deterministically scan all wireless channels through time-based multiplexing while also allowing the system to adaptively adjust the time spent on a given channel based on current and past activity.

Figure 14:
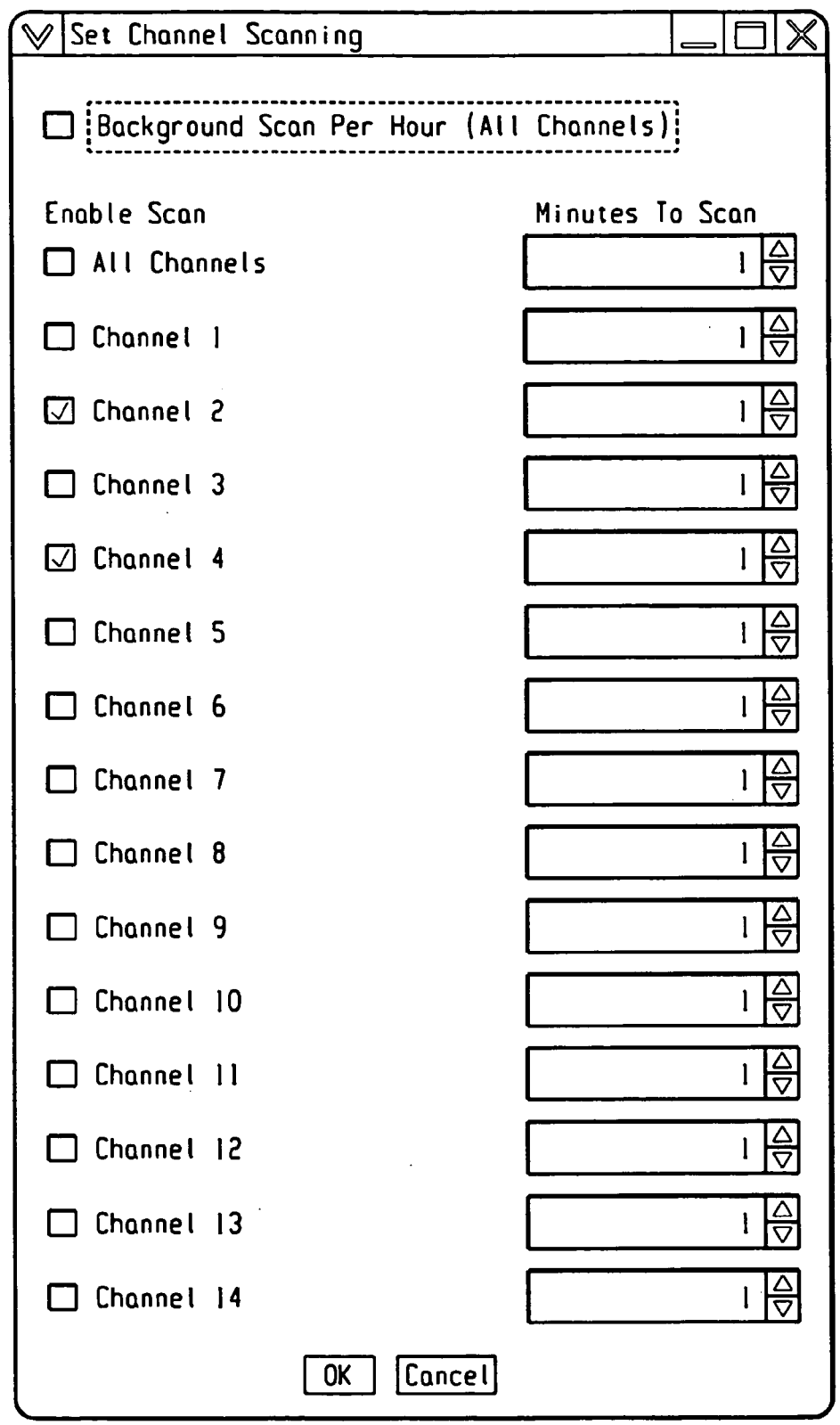
FIG. 14 depicts an exemplary interface for configuring a default or baseline scan pattern.

A typical scenario would be to monitor a fixed set of channels and periodically perform a background scan of the remaining channels; FIG. 14 depicts an example interface for configuring such a baseline or default scan pattern. If any activity is observed on a channel expected to be idle or unauthorized activity is discovered, the system adapts by adding this channel to its primary scanning pattern. If activity then diminishes, this channel will be removed from the primary scanning pattern and then scanned next during the background scanning mode. The system can utilize either pre-configured thresholds or user-entered thresholds to determine the trigger point at which to start or stop dynamic monitoring of the channel. Additionally, automated controls can be included that will lock onto the channel if a security violation has been detected per the underlying multi-dimensional analysis engine.

Figure 11:
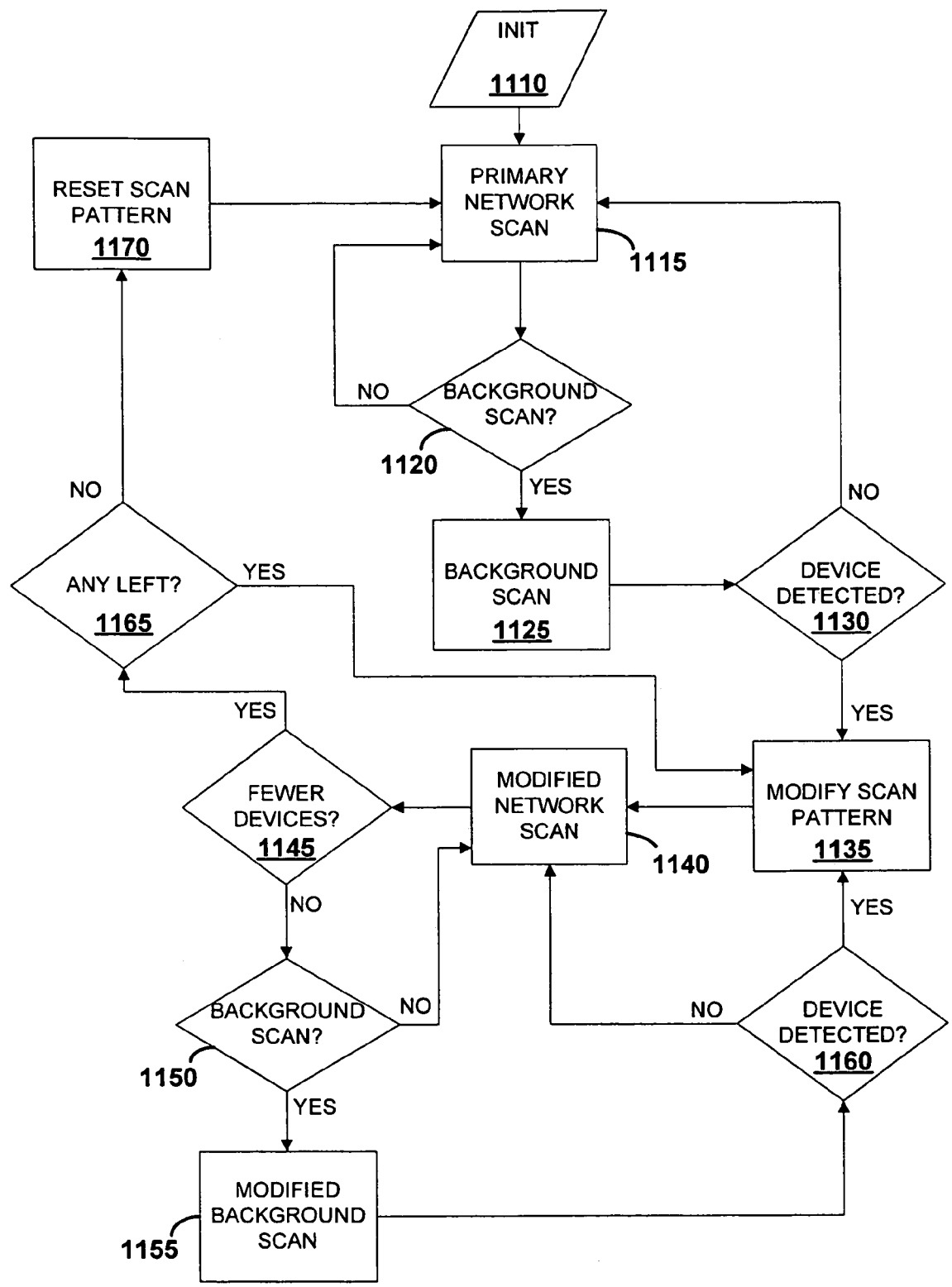
FIG. 11 is a flow chart depicting an adaptive scanning process.

With reference to FIG. 11, the monitoring system is initialized in step 1110. Initialization in step 1110 can include the FIG. 4 configuration process and/or the step 910 initialization in FIG. 9 as previously discussed. After initialization, a primary network scan occurs according to a predetermined scan pattern in step 1115. A background scan can occur after each primary network scan. Alternatively, as depicted, a background scan may only occur based upon a particular trigger condition such as random determination, after a certain number of primary scan or after a certain time period has passed. A decision as to whether the particular condition to trigger a background scan has occurred is made at step 1120. In step 1125, the background scan occurs. A determination is then made in step 1130 as to whether an unauthorized device has been detected during the background scan. If not, processing continues at step 1115 with a primary network scan.

If a device was detected, the scan pattern for the primary network is adapted in step 1135. This modified scan pattern is then used for scanning the wireless channels in step 1140. As above, background scans can occur after each such modified scan, or as depicted, can occur according to a trigger condition. In step 1145, a determination if fewer unauthorized devices were identified in the modified scan. If so, a determination is then made as to whether any unauthorized devices are still being detected in step 1165. If no unauthorized devices are still being detected, the scan pattern is reset to the predetermined original scan pattern at step 1170 and processing continues with a primary scan at step 1115. If some unauthorized devices are still being detected, the 10 scan pattern is modified accordingly in step 1135 and processing continues with step 1140.

If fewer devices were not found in step 1145, a determination is made as to whether a background scan should occur in step 1150. If not, processing continues with a further modified scan at step 1140. If so, at step 1115, the background scan occurs. A determination is made in step 1160 as to whether a previously unidentified unauthorized device has been detected. If so, the scan pattern is modified accordingly in step 1135 and processing continues with step 1140. If not, the processing continues with step 1140.

Those skilled in the art will readily appreciate that the described process is exemplary and that the steps described need not occur in the exact order described but can proceed logically in other apparent orderings. For instance, the background scan determination loop in the modified scan portion of the flow could as readily occur before the fewer device determination step as after. Additional order alterations should be apparent and are contemplated.

Further, enhanced implementations may utilize multi-channel receivers in which adaptive scanning may occur uniquely per receiver. This allows, for example, multiple channels or multiple frequency bands to be scanned and monitored in parallel.

As described above, systems and methods described herein can automatically generate alarms whenever certain events or conditions occur within your wireless 30 network. In some such systems and methods, an alarm manager providing an interface for viewing can be provided; such an interface is described in greater detail in co-pending U.S. Provisional Patent Application Ser. No. 60/381,829 entitled "SYSTEMS AND METHODS FOR NEWTORK SECURITY" filed May 20,2002. The following table identifies the alarms, alarm subtypes and severities available in one particular implementation referred to as AirDefense Mobile.

| Alarm Type | Alarm Subtype | Alarm Level |
| --- | --- | --- |
| DoS Attack | De-authenticate<br>AirDefense Mobile detects when a hacker pretends to be an Access point and broadcasts a "de-authenticate" message. This forces all Stations to re-authenticate themselves, generating excessive network traffic, and causing inconsistent connectivity and data transfer. | Critical |
| | Disassociate<br>AirDefense Mobile detects when a hacker pretends to be an Access point and broadcasts a "disassociate" message. This forces all Stations to re-associate themselves with the Access Point, generating excessive network traffic, and causing inconsistent connectivity and data transfer. | Critical |
| Unauthorized Station | Not on allow list<br>AirDefense Mobile detects a Station whose MAC address is not on its Valid list. (A Valid list is maintained by the system.) | Critical |
| Threshold | GLB CRC errors<br>AirDefense Mobile detects if CRC errors exceeded configured limits (CRC errors are generated when checksums fail on individual frames.) | Major |
| | BSS assoc count<br>AirDefense Mobile detects when the number of associations within an entire BSS, in any given minute, exceed the number specified in configuration information | Major |

-continued

| Alarm Type | Alarm Subtype | Alarm Level |
|---|---|---|
| | BSS signal strength<br>AirDefense Mobile detects when the signal strength in any access point falls below a specified threshold. | Critical |
| | BSS fragments<br>AirDefense Mobile detects when the number of fragmented frames within any minute exceed a specified threshold. | Minor |
| | BSS decrypt errors<br>AirDefense Mobile detects when the number of decrypt error frames within any minute exceed a specified threshold. | Major |
| | BSS assoc stations<br>AirDefense Mobile detects when the total number of associated Stations within an entire BSS, in any given minute, exceed a specified number. | Minor |
| | BSS tbw in<br>AirDefense Mobile detects when, during any minute, the number of bytes of data entering the BSS from the wired portion of your network exceed a set threshold. | Minor |
| | BSS tbw out<br>AirDefense Mobile detects when, during any minute, the total number of bytes of data going from the BSS to a wired portion of your network exceed a set threshold. | Minor |
| | BSS tbw intra<br>AirDefense Mobile detects when, during any minute, the total number of bytes of data originating from and destined for the BSS exceed a specified threshold. | Minor |
| | BSS tbw thru<br>AirDefense Mobile detects when, during any minute, the total number of bytes of data originating from a wired portion of the network hop through the BSS to another wired portion of the network exceed a set threshold. | Minor |
| | BSS data<br>AirDefense Mobile detects when, during any minute, the total number of data frames in the BSS exceed a specified threshold. | Major |
| | BSS mgt<br>AirDefense Mobile detects when, during any minute, the total number of management frames in the BSS exceed a specified threshold. | Major |
| | BSS ctl<br>AirDefense Mobile detects when, during any minute, the total number of control frames in the BSS exceed a set threshold. | Major |
| | BSS ad hoc<br>AirDefense Mobile detects when, during any minute, the total number of Ad Hoc frames in the BSS exceed a specified threshold.<br>Note: Wireless network adaptor cards of lesser quality will randomly generate Ad Hoc frames. AirDefense Mobile's default threshold (1) may cause all of these spurious frames to generate an alarm. After monitoring the network for a week or two, it may be advisable to set the threshold to a number at or a little higher than what the network normally generates. | Critical |
| | STA assoc count<br>AirDefense Mobile detects, during any minute, when any Station associates with an access point more times than provided by a specified threshold. | Major |
| | STA signal strength<br>AirDefense Mobile detects, during any minute, when any station's signal strength falls below a value specified. | Critical |
| | STA fragments<br>AirDefense Mobile detects, during any minute, when any station generates more fragmented frames than a specified value. | Minor |
| | STA decrypt errors<br>AirDefense Mobile detects, during any minute, when any station generates more decrypt errors than a set threshold. | Major |
| | STA tbw received<br>AirDefense Mobile detects, within any minute, when any station receives more bytes of data than a predetermined threshold. | Minor |
| | STA tbw transmitted<br>AirDefense Mobile detects, within any minute, when any station transmits more bytes of data than specified in a set threshold. | Minor |
| | STA data received<br>AirDefense Mobile detects, within any minute, when any station receives more data frames than a specified threshold. | Major |

-continued

| Alarm Type | Alarm Subtype | Alarm Level |
|---|---|---|
| | STA data transmitted<br>AirDefense Mobile detects, within any minute, when any station transmits more data frames than a specified threshold. | Major |
| | STA mgt received<br>AirDefense Mobile detects, within any minute, when any station receives more management frames than a specified threshold. | Major |
| | STA mgt transmitted<br>AirDefense Mobile detects, within any minute, when any station transmits more management frames than a set threshold. | Major |
| | STA ctl receive<br>AirDefense Mobile detects, within any minute, when any station receives more control frames than a specified threshold. | Major |
| | STA ctl transmit<br>AirDefense Mobile detects, within any minute, when any station transmits more control frames than a set threshold. | Major |
| ID Theft | Out of sequence<br>AirDefense Mobile detects when frames are transmitted out of sequence. This suggests that someone has spoofed a Station and is sending data at the same time as the legitimate Station. | Critical |
| | Vendor out of character<br>AirDefense Mobile compares every Station's transmissions against an internal database of known vendor "transmission profiles" or "signatures." If the actual network traffic does not match the vendor-profile associated with the Station's Wireless NIC, AirDefense Mobile assumes that the traffic originates from an unauthorized station using a spoofed NIC. | Critical |
| | Anomalous signal strength<br>AirDefense Mobile tracks the high, low, and mean signal strength of each station many times a minute throughout the day. Whenever it detects that the Station's signal strength deviates from the norm, it generates an alarm. | Critical |
| Access Point Mode | WEP mode changed<br>AirDefense Mobile detects when the WEP value in an access point's beacon differs from the value it is supposed to be. (AirDefense Mobile auto-detected the WEP property, or it was manually entered.) | Critical |
| | Rate changed<br>AirDefense Mobile detects when the supported transmission rate values in an access point's beacon differs from the value it is supposed to be. (AirDefense Mobile auto-detected the rate property, or it was manually entered.) | Critical |
| | Channel changed<br>AirDefense Mobile detects whenever an access point changes channels. (The channel is identified in configuration information.) | Critical |
| | Cf changed<br>AirDefense Mobile detects when the Point Coordination value in an AP's beacon changes. A change in this field may indicate that the access point was reconfigured, though this is not necessarily a problem. (The Point Coordination field refers to the access point's mode of collision avoidance.) | |
| | Essid changed<br>AirDefense Mobile detects when the access point's broadcast of its Extended BSS ID changes. The ESSID information is stored as configuration information. | |
| Unauthorized AP Admin | AirDefense Mobile detects when administration sessions are being conducted directly with the access point. | Critical |
| Odd Mgt. Frame | Sta tx ap mgt fr<br>AirDefense Mobile detects when a Station is transmitting a management frame reserved for access point's use. | Critical |
| | Ap tx illegal mgt fr<br>AirDefense Mobile detects when an access point transmits an illegal management frame. | Critical |
| | Out of spec frame<br>AirDefense Mobile detects when an access point transmits a frame that does not follow 802.11b standards. | Critical |
| | Other bogus frame<br>AirDefense Mobile detects when an access point transmits any frame it does not understand. | Critical |

-continued

| Alarm Type | Alarm Subtype | Alarm Level |
| --- | --- | --- |
| Ad Hoc Net Detected | AirDefense Mobile detects when Stations are directly transmitting and receiving to and from each other without using an authorized access point.<br>Note: Unlike all other alarms that are generated every time the network event is detected within a minute, AirDefense Mobile will only generate an Ad Hoc Network alarm once in the current 24 hour period for each MAC address. | Critical |
| AP Beacon Rate | AirDefense Mobile detects when an access point's beacon rate changed. | Critical |

The present systems and methods allow an end-user to specify and implement the security and policy constraints associated with a particular wireless network deployment. Once configured with such information, the network activity is monitored on a continuous basis to determine if the activity is within the guidelines specified by the established constraints.

If the activity is found to not be in compliance with the established constraints, a real-time alarm is generated and reported to the user through a number of mechanisms. These mechanisms can include Web, Email, SNMP and Syslog notification. In some implementations, the response is not limited to notification. These implementations can include automated enforcement and/or active defensive measures as discussed below.

Automated Policy Enforcement

Some implementations support automated enforcement of constraints including, without limitation, thresholds and/or alarms. In such implementations, attempts to rectify the policy deviation through re-configuration of the affected device or devices can occur automatically upon detection of the deviation. This reconfiguration attempts to implement the specified policy within the relevant devices.

This process can be viewed as a form of a feedback control loop. In many cases, such a loop operates by comparing a reference input to a measured output, computing their difference, and using this difference to adjust the desired output. This continues to drive the desired output to compliance with the reference input.

Figure 10:
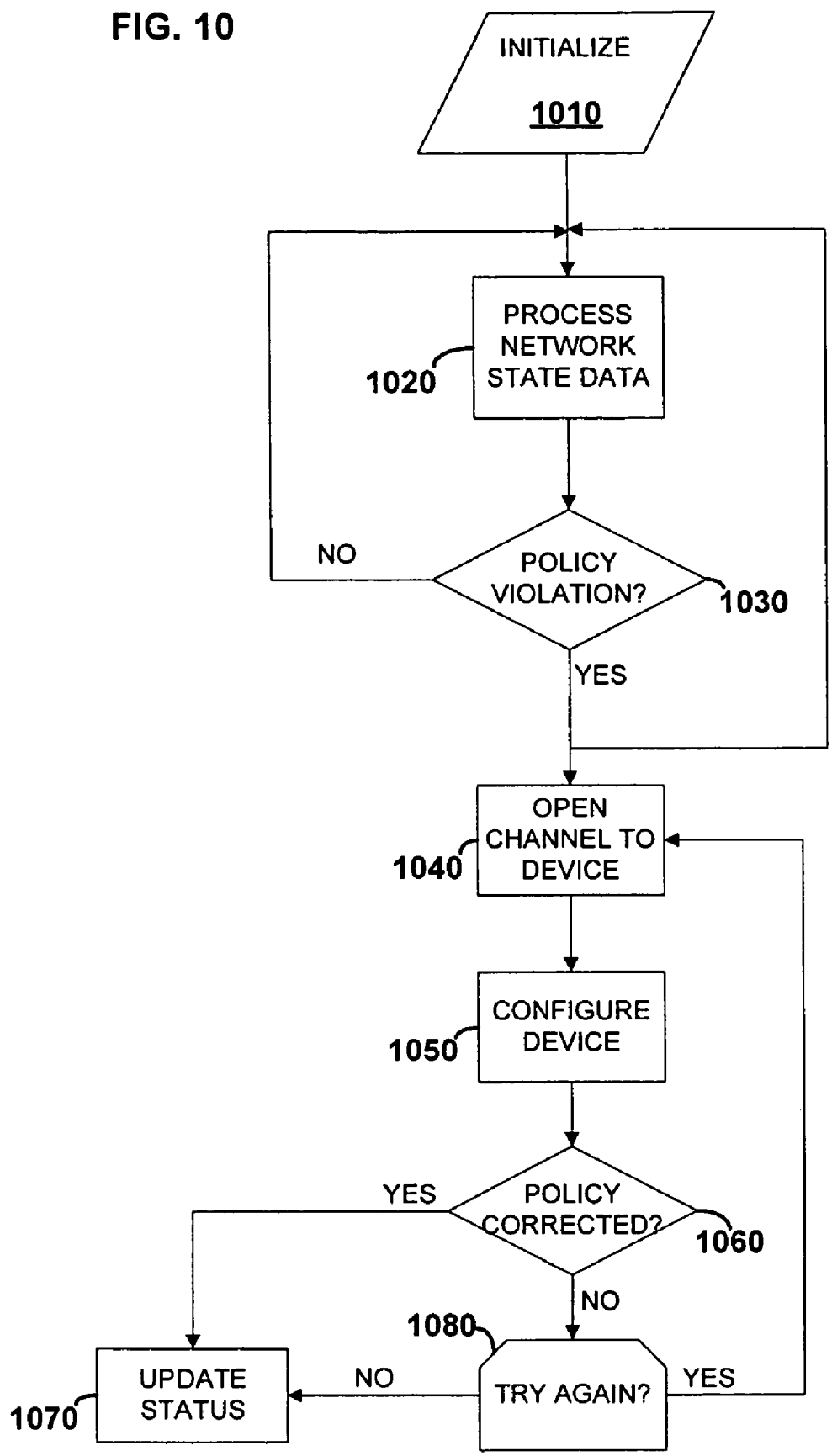
FIG. 10 is a flow chart depicting an automated wireless network policy enforcement process.

FIG. 10 depicts an exemplary process that includes automated policy enforcement. An initialization step occurs to retrieve expected norms and configure data monitoring processes in step 1010. Normal monitoring of network activity occurs in steps 1020. The monitored activity is checked for compliance with established constraints in step 1030. If a violation was not detected, processing continues at step 1020.

If a constraint is violated, a notification (alert) can be generated and forwarded to a user and/or other systems (not shown). Such notifications can, in some instances, include information regarding the violation and/or one or more links that upon activation: (1) cause the display of information regarding the violation, (2) cause the activation of an interactive interface via which a user can attempt to manually rectify and/or manage the violation and/or (3) cause automatic attempts to wholly, or partially, rectify the violation. The notification can be sent via any suitable delivery platform as provided hereinabove with respect to alerts in general.

If a violation was detected, normal monitoring for additional violations can continue as depicted by simultaneously returning to step 1020 as well as proceeding to step 1040; alternatively, normal monitoring could be suspended until handling of the detected violation is complete.

The violation will typically have associated with it a set of one or more wireless network attributes. A procedure associated with the detected violation, and/or the attributes associated therewith, is triggered that attempts to manually, semi-automatically or automatically rectify the underlying cause of the violation. At step 1040 a communication channel is established with one or more devices associated with the detected violation, and/or the attributes associated with the detected violation. Commands to rectify the detected violation can then be sent to impacted devices in step 1050. The commands sent will depend at least in part upon the detected violation and/or the attributes associated therewith. At this point, the process may end in some implementations.

Some implementations may further make a determination as to whether the reconfiguration attempt was successful in step 1060. In some such implementations, the determination may include a determination of a success level indicating partial handling of the violation. Based upon the outcome of the determination, some implementations may make further attempts to correct, or complete the correction of, the violation through additional attempts to reconfigure the same or different devices as in the previous correction attempts. Step 1070 represents a decision as to whether further attempts should be made. This decision may rest on a number of factors including, without limitation, number of correction attempts, degree of success of prior attempts, appearance of additional issues resulting from prior attempts, etc.

If the attempt to enforce the policy is successful or unsuccessful, status information concerning the network can be updated in step 1080. For instance, if the procedure successfully, or partially successfully, rectifies the cause of the violation, any triggered alert or alerts can be cancelled, updated or otherwise modified to indicate the present status of the violation.

These steps can be executed upon a system processor or can be stored as executable instructions upon or across one or more computer readable media. Data used by the steps can be stored within the SDS described above. The communication channel established with the one or more devices can be made through one or more communication interfaces; such communication interfaces can be network interfaces, serial or parallel interfaces (e.g., USB, etc.), modem, or other suitable communication interface allowing communication between the system processor and the device.

Automatic resolution of the policy violation can employ a management and control interface on the monitored equipment to effect the desired change. This interface may be in the form of an HTTP, HTTPS, SNMP or vendor-specific command line interface reachable via Telnet, SSH or another remote login interface; in addition, or instead, alternative interfaces could be provided via automated voice and/or tone recognition systems for handling telephone based configuration of the environment. Multiple such interfaces could be simultaneously available. An example Web-based interface is depicted in FIGS. 13A1, 13A1a, 13A2, 13B1 and 13B2.

Active Defense

In some environments, one or more active defense mechanisms may be triggered in response to alarm conditions, in addition to, or instead of, the notification process described above. The system may provide active defense from attacks by broadcasting data into the wireless network as well as being able to trap and/or map an intruder's workstation by triangulating the position of the intruder's workstation relative to the wireless network access points. It also may attempt alter the access point configuration in a manner that makes it difficult or impossible for the targeted attacker to continue communications.

By introducing CRC errors into the wireless stream, the system can actively defeat an attacker that is monitoring the stream for patterns to crack the encryption. CRC errors are introduced by transmitting at the same time as the detected intruder. Due the shared medium nature of the wireless computer network, the cause the packet transmission to be corrupted, preventing the intruder from successfully communicating with the network.

By introducing chaf, the system can actively defeat the attacker by placing random frames into the stream so that the encryption pattern becomes undetectable. Chaf is a form of randomized packet transmission that is designed to reduce the probability that a statistical analysis of the packet sequence would result in breaking of the encryption key. This is done by emitting a low-rate background transmission of packets that are emitted using the same characteristics (e.g., address, initialization vector, etc.) of legitimately observed traffic but with a randomized payload.

In addition, an active defensive measure can include de-authorizing a wireless station or access point, disabling a selected access point's wireless transceiver, and/or alerting an external network management system or an associated network component. In de-authorizing a wireless station or access point, the anomalous or unauthorized station or access point is removed from the set of authorized wireless network components. In the case of disabling an access point's transceiver, a particular access point identified as unauthorized or providing access to unauthorized stations can have its wireless transceiver disabled in order to block further intrusion. In the case of alerting an external network management system or an associated network component, the active defense measure involves coordination and data exchange between an attacked network and a central management system or component. This allows detection of higher level patterns in attempted intrusion. Such an alert could be transmitted in any suitable format including without limitation SNMP or an XML formatted alert.

Some environments may also include an adaptive location tracking component that locates and tracks identified stations and access points. In the case of unauthorized stations and access points, the detection and tagging for location tracking can be another form of active defense.

The system can lock-down a wireless network by jamming, a technique to prevent any unauthorized access to the wireless access point by introducing enough noise into the wireless network that workstations cannot physically connect to the wireless network. Jamming is a physical layer transmission that is performed to disrupt all unwanted wireless communications. It is equivalent to introducing a noise signal on top of the unwanted signal transmission such that any receiver would not be able to successfully receive the transmission.

The system can also lock-down a wireless network through logical jamming or disruption. In this case, unauthorized access is prevented through disruption at the communications protocol layer. This is done via use of standard network management, control and data messages.

In a Physical Device approach, one environment would utilize a standalone sensor to implement any of the Active Defense mechanisms. Dynamic channel change can be used to reroute authorized traffic to a different communication channel to avoid an intruder detected on a particular channel. In this approach, a channel change request is transmitted to the access point believed to be compromised and authorized stations use the new channel to communicate with the access point. This approach can also be used to avoid interference causing problems in communication between an access point and its authorized stations.

Figure 5:
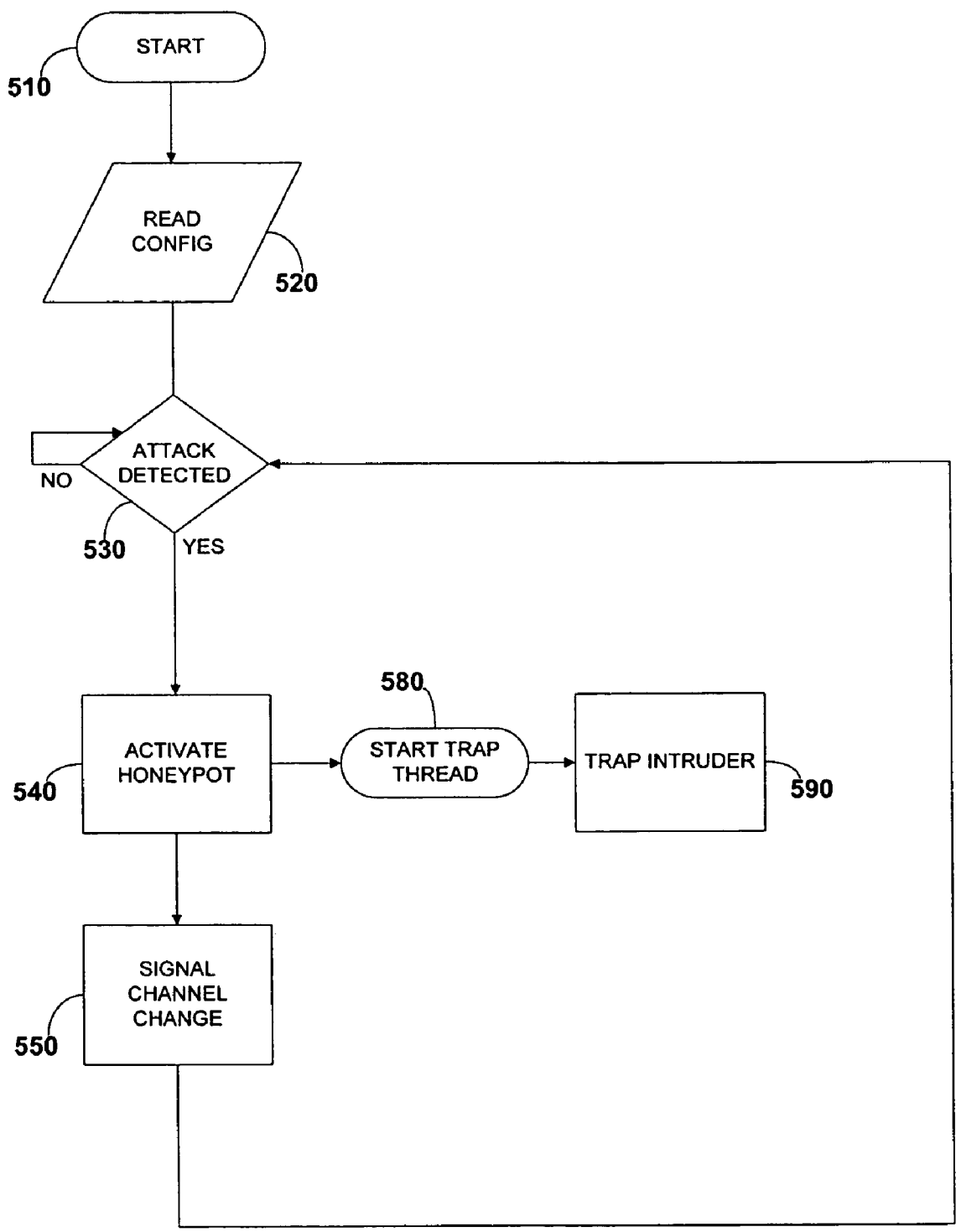
FIG. 5 is a flow chart of an exemplary dynamic channel change active defense process that includes a honeypot trap.

Some environments including dynamic channel change may further use a honeypot trap that tricks the attacker into thinking the original channel is still valid and provides the necessary forensic information to identify the attacker. FIG. 5 depicts a flow chart of a process starting at step 510 used in some such instances incorporating the honeypot trap.

In step 520, configuration information is received. This step is much the same as previously described steps 305 and 410 in FIGS. 3 and 4 respectively. Step 530 represents a waiting loop that waits until an attack has been detected. Typically, an intrusion detection system generates a signal that triggers departure from this loop; in some cases, the intrusion detection system contains the hardware and/or executes the process described above. The signal from the intrusion detection system typically includes an indicator of the access point believed to be under attack.

In the case that an attack has been detected in 530, processing is passed to step 540 to activate the honeypot trap. A trap thread is started in step 580; the thread initializes itself with the identity of the monitored access point believed to be attacked. This identity typically includes the MAC address, Service Set Identifier, encryption mode, network mode and transmission modes. Once initialized, the thread moves to step 590, the Trap Intruder process. This process is designed to logically fool the identifier attacker into believing communication is still occurring with the original access point. This is accomplished through complete emulation of the original access point's identity and behavior. By maintaining communication with the attacker, a trap is created such that the attacker's physical proximity is assured as long as communication continues. Optionally, a new identity may be assumed such that a weaker or more vulnerable appearing access point can be presented to the attacker. This is done by again emulating access point functionality, but in this case with an identity and set of characteristics that appear vulnerable. This vulnerability appearance may be created through the use of no or weak encryption modes or the appearance of default manufacturing modes with known passwords and user IDs.

In step 550 a control packet is sent to the original access point to change channels or suspend transmission while the trap is engaged. This packet encapsulates a message indicating the above request and may be sent in or out-of-band to the access point. In-band refers to over-the-air transmission to the access point's wireless network interface whereas out-of-band transmission refers to transmission to the wired side interface of the access point.

Processing in the main loop then returns to attack detection in 530.

In response to alarm activity or manual operation intervention, location tracking may be enabled to estimate the position of the desired device. This estimation is based upon receive signal characteristics and may include but is not limited to estimation based on time of arrival, differential time of arrival, angle of arrival or signal strength.

In some implementation, triangulation determines the location of an attacker by mapping her relative position within the deployed wireless access points. An exemplary mapping and location detection process is depicted in FIGS. 6A-B and discussed in greater detail below.

Figure 6A:
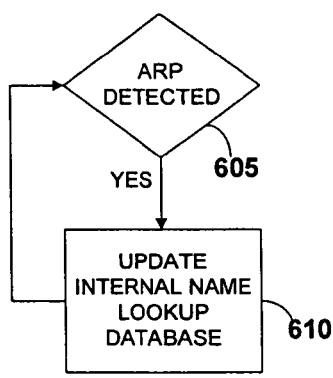
FIGS. 6A-B are flow charts of example station identification and location mapping processes.

The process of FIG. 6A is used to create an internal database of IP addresses and/or names mapped to corresponding MAC addresses. Every Address Resolution Protocol (ARP) transaction is detected in step 605. In step 610, the information in the detected transaction is used to update the internal database. Some implementations can perform the identification and location processing such as depicted in FIG. 6B without reference to such an internal database. This database is created and maintained in one implementation to make the station identification and location process easier and more efficient.

Figure 6B:
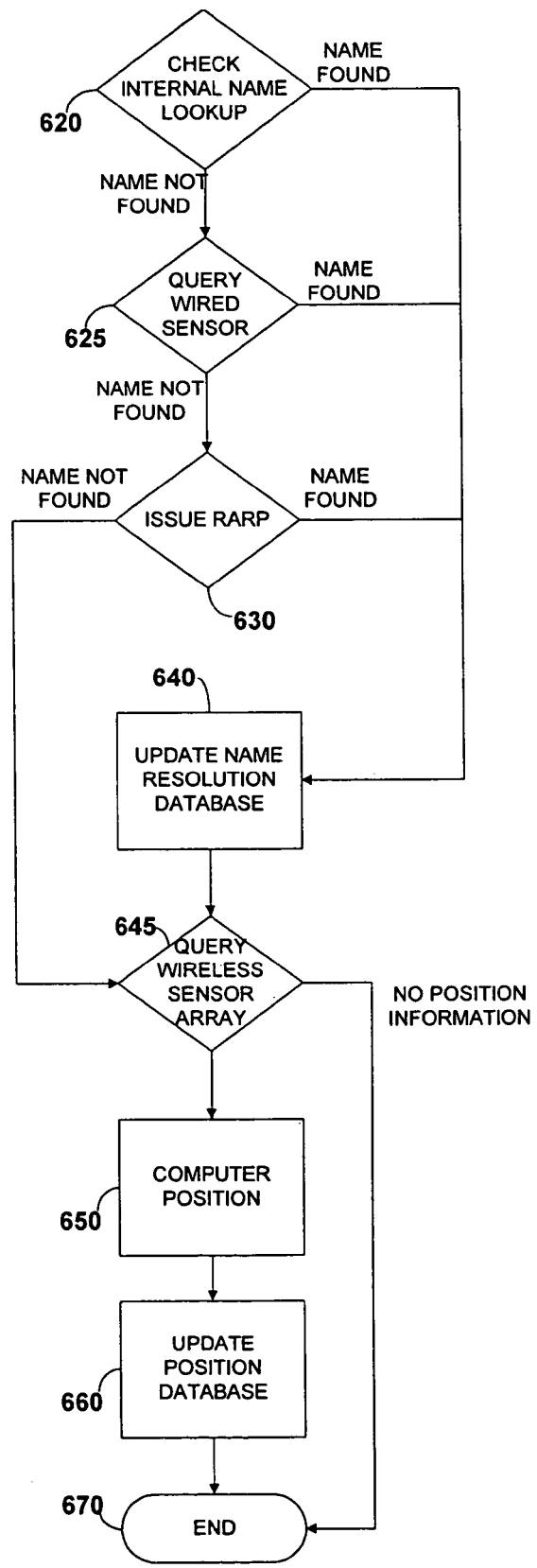

FIG. 6B depicts a process for identifying and locating a station within the wireless network. In some environments, this process can be used to pinpoint the location of a potential attacker; in some such environments, activation of the process is triggered by an intrusion detection system. In a particular implementation, the process is triggered by one of the intrusion detection systems and methods described in detail above.

In step 620, a lookup occurs in the internal database, such as created via the process depicted in FIG. 6A, on the current MAC address to determine if an IP or name mapping is already available. If found, the internal database is updated in step 640 and execution proceeds to step 645 to query the wireless sensor array—to begin position or location resolution. As indicated above, the internal database is one approach to acquiring the desired information. Some implementations may skip this step and use either the wired network sensor or the reverse address resolution protocol (RARP) approach discussed below.

Otherwise, an optional wired network sensor can be queried for the name mapping in step 625. This sensor is preferably deployed within the wired network at a location convenient to sniffing DHCP, LDAP, DNS or other service/name mapping protocols. If found, the internal database is updated in step 640 and execution proceeds to step 645 to query the wireless sensor array—to begin position or location resolution. Some implementations may not include such a wired network sensor; in which case this step is skipped.

If name is still not found, execution proceeds to step 630 where a RARP request is issued. This request asks the receiver population for the IP address of the MAC address in question. If found, the internal database is updated in step 640 and execution proceeds to step 645 to query the wireless sensor array—to begin position or location resolution.

If not found, name/IP mapping is not available at current time for this MAC address. In some environments, name/IP mapping may not be desired but location or position information is in which case the process can begin in such environments at step 645.

Step 645 begins the position or location resolution with a query to the wireless sensor array. Each sensor is queried for tracking information on the current MAC address in question. This tracking information identifies whether the MAC is currently observable by a given sensor, the sensor ID, and the signal strength associated with the MAC in question. The sensor array may include not only sensor devices (e.g., 230A, 230B) but also other wireless nodes accessible from this process such as devices 210A-D and/or host system 220.

From the data received via the query, the position relative to grid of sensors is calculated in step 650 by computing the "signal strength" distance to each sensor. This distance is computed as the square root of the sum of squares of three sensor signal strength values. The position is then estimated to be within the proximity of the sensors determined to have the smallest signal strength distance to the MAC address in question per the above computation. Once the set of sensors is selected, the position is further refined by selected the position as within the proximity of the sensor within above set with the strongest signal strength. In some implementations, the process ends at this point with the position information being returned.

In implementations maintaining a position database, this database is updated in step 660 with the position of the MAC address in question. The process then ends at step 670.

In some implementations, location tracking can be adaptive in nature. To facilitate the estimation and tracking of user location based upon pre-configured or dynamically determined criteria. This mechanism utilizes the sensor-based monitoring infrastructure to derive estimates of position based upon received signal characteristics.

In pre-configured mode, a static list of device identifiers representing the objects to be tracked is maintained within the system data store. As one or more of these devices become visible to the monitoring infrastructure, location tracking is automatically enabled and position estimates are automatically calculated and made available via the management, reporting and notification subsystems.

In adaptive mode, the tracking and position estimation of a given object is based upon some combination of operational and security assessments that the system automatically derives and assesses. These criteria may be based on time, traffic level, threat level, protocol characteristics, usage characteristics, etc. Once tracking has been engaged, it may be adapted based on continued monitoring of these criteria. Tracking may be engaged on a full-time basis, sampled periodically or ramped off over time. The level of tracking detail may also be varied dynamically depending on the above criteria, which can be used to drive the level of tracking granularity associated with a particular device.

This feature facilitates the estimation and tracking of user location based upon pre-configured or dynamically determined criteria. This feature uses the sensor-based monitoring infrastructure to derive estimates of position based upon received signal characteristics. In pre-configured mode, a static list of device identifiers representing the objects to be tracked is maintained within the system data store. The list can be updated either automatically or upon user request. Automatic update can include time-based additions and/or deletions and/or event-based additions and/or deletion. In adaptive mode, the tracking and position estimation of a given object is based upon some combination of operational and security assessments that the system automatically derives and assesses, which could include an initial list of one or more device identifiers. These criteria may be based on time, traffic level, threat level, protocol characteristics, usage characteristics, etc. Once tracking has been engaged, it may be adapted based on continued monitoring of these criteria.

Tracking may be engaged on a full-time basis, sampled periodically or ramped off over time. The level of tracking detail may also be varied dynamically depending on the above criteria, which can be used to drive the level of tracking granularity associated with a particular device.

A wireless device is identified for tracking. This identification is typically based upon one or more tracking criteria and/or device indicators, which in some instances are stored in a system data store. The tracking criteria can in some implementations include one or more of time, traffic level, threat level, protocol characteristics and/or usage characteristics. The tracking criteria can be statically defined or dynamically determined based upon network characteristics and/or configured preferences.

Tracking data is received from one or more wireless receivers; such tracking data can include signal strength data and directional data. The position of the identified wireless device is calculated based upon this received tracking data and outputted.

The position information can be outputted to any suitable output platform. Such output platforms can include, without limitation, e-mail, a web page, a facsimile, a graphic, an XML page, an SNMP message and/or a page. The target for the outputted position can be an end user or a further computer system.

In some instances, unauthorized wireless devices can be designated for dynamic identification and inclusion for tracking. RF characteristics for the identified unauthorized wireless device can be sensed and/or stored. In some cases, one or more additional sensors can be selected for collection of additional data to improve tracking performance.

The entire process can, in some implementations, be performed on a periodic or a periodic basis. The periodicity of periodic performance can be according to a predetermined maintenance, reporting and/or analysis schedule and, in some implementations, can be adaptive based upon analysis schedule and/or various tracking criteria. A periodic repetition can occur as a result of an external request from a user or other system or upon occurrence of one or more predetermined events.

Figure 16:
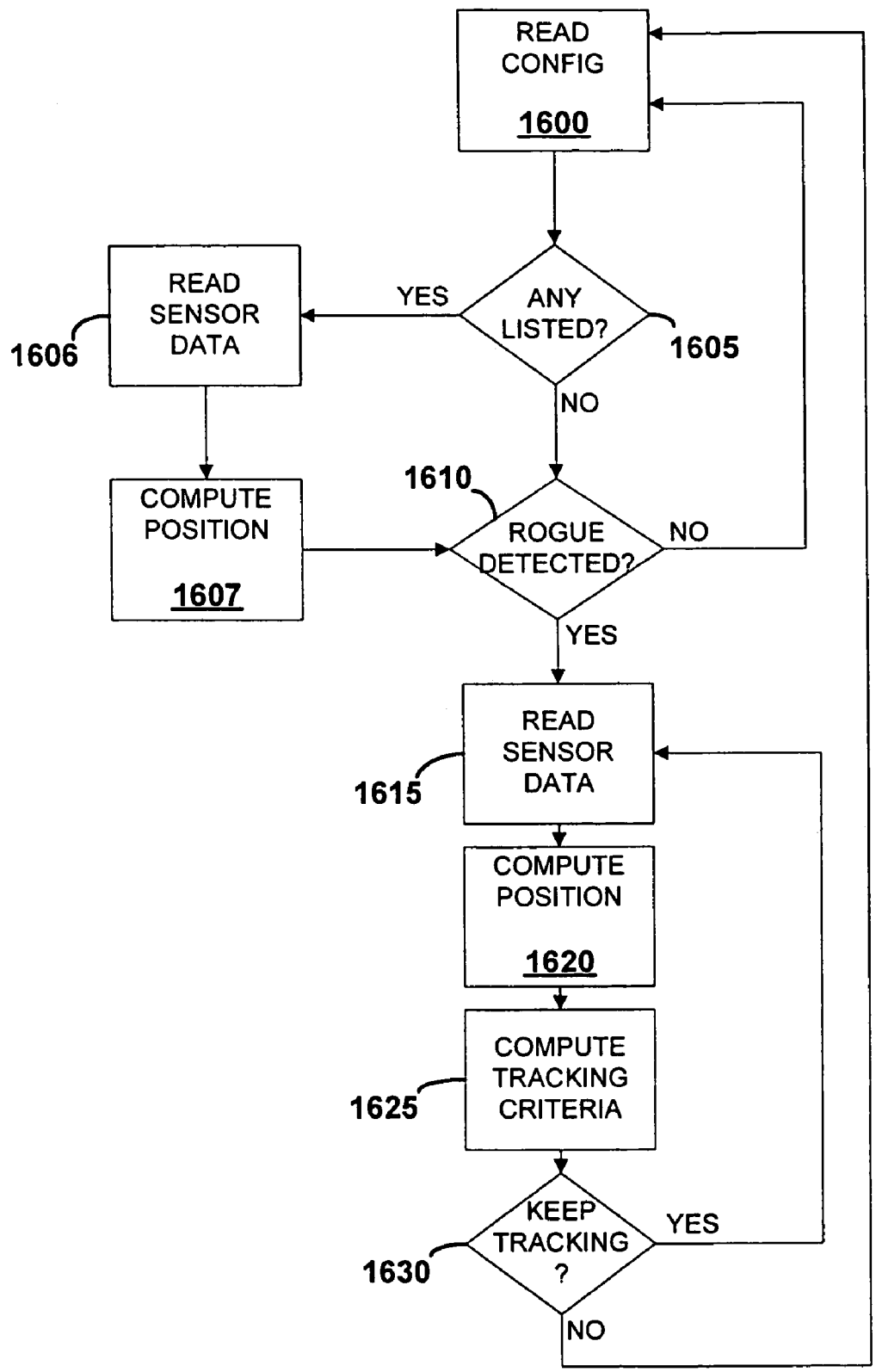
FIG. 16 is a flow chart depicting adaptive location tracking process.

FIG. 16 depicts a process that facilitates the estimation and tracking of user location based upon pre-configured or dynamically determined criteria. This mechanism can use the sensor-based monitoring infrastructure to derive estimates of position based upon received signal characteristics. In pre-configured mode, a static list of device identifiers representing one or more objects to be tracked can be maintained within the system data store. In adaptive mode, the list of devices can be dynamically developed from an empty list or from a pre-configured static list. In some embodiments including an adaptive mode, a pre-configured static list can be provided that cannot be altered in adaptive mode; while in others, the objects in a pre-configured static list can be removed and/or modified just as objects dynamically added to the list of objects to be tracked.

First a wireless device for tracking is identified for tracking based upon data from the system data store in step 1600. As one or more of these devices become visible to the monitoring infrastructure, location tracking is automatically enabled and stations for tracking appear in a list in step 1605. Sensors are read in step 1606 and position estimates are automatically calculated in step 1607 and stored and/or made available via the management, reporting and/or notification subsytems.

In adaptive mode, the tracking and position estimation of a given object is based upon some combination of operational and security assessments that the system automatically derives and assesses. These criteria may be based on time, traffic level, threat level, protocol characteristics, usage characteristics, etc. The system tracks a wireless device in step 1605 through 1607.

When a rogue is detected based on selected criteria in step 1610, sensors are read in step 1615. The position of the wireless device is identified based upon the received data in step 1620. Once tracking has been engaged, it may be adapted based on continued monitoring of these criteria in step 1625. Tracking may be engaged on a full-time basis, step 1630 and then the sensors are read again in step 1615. Tracking may also be sampled periodically or ramped off over time. The level of tracking detail may be varied dynamically depending on the above criteria, which can be used to drive the level of tracking granularity associated with a particular device.

Referring to FIG. 19, an alternative process is depicted. Step 1900 performs much the same as step 1600 described above. Configuration information is read and a list of devices to be tracked is determined based at least in part on the read configuration information. A determination is then made at step 1905 if any devices to be tracked are listed. If not, configuration the process can repeat beginning at step 1900 either on a periodic basis or upon occurrence of an event such as a request from a user or another system.

If one or more objects are listed, these objects are tracked through reading of sensors at step 1910 and position estimation at step 1915, much as steps 1606 and 1607 described above. The position estimates can then be stored and/or made available via the management, reporting and/or notification subsytems. After listed items have been tracked, a determination is made as to whether a rogue object has been detected at step 1920. If not, processing continues at 1900 as before on a periodic basis or upon event occurrence.

If a rogue was detected, a determination is made as to whether dynamic rogue tracking is enabled at step 1925. If not, processing continues at 1900 as before on a periodic basis or upon event occurrence. If rogue tracking is enabled, the identified rogues is added to the tracking list at step 1930, sensor data is read at step 1935 and the location of the detected rogue is estimated and stored and/or made available via the management, reporting and/or notification subsytems at step 1940.

Encrypted Network Analysis and Management

The techniques utilized to monitor WLANs can apply in general to monitoring and analyzing any network link using encryption of the payload or at the IP layer and above rather than just WLANs. In this case, Layer 1 and Layer 2 are observed and decisions made at these layers in terms of signature, protocol, policy and statistical anomaly analysis to assess network health and security. This technique is thus applicable to any network (wired or wireless) exhibiting the above encryption characteristics of the network traffic. In other words, the multi-dimensional IDS implemented per our framework is more broadly applicable to managing and securing any encrypted network. In this case, a WLAN running WEP is one particular instance of an encrypted network.

Throughout this application, various publications may have been referenced. The disclosures of these publications in their entireties are hereby incorporated by reference into this application in order to more fully describe the state of the art to which this application pertains.

The examples described above are given as illustrative only. It will be readily appreciated by those skilled in the art that many deviations may be made from the specific examples disclosed above without departing from the scope of the inventions set forth in this application.

The indentations and/or enumeration of limitations and/or steps in the claims that follow are provided purely for convenience and ease of reading and/or reference. Their useage is not intended to convey any substantive inference as to parsing of limitations and/or steps and/or to convey any substantive ordering of, or relationship between or among, the so indented and/or enumerated limitations and/or steps.

What is claimed is:

1. A method of managing wireless network sensors, the method comprising the steps of:
   (a) dynamically identifying a plurality of wireless network sensors in a selected network region;
   (b) selecting for each of the wireless network sensors in the plurality a designation of primary or secondary with respect to the selected network region, the designation of primary or secondary being operable to allocate responsibility for monitoring a first portion of the selected network region, wherein a wireless sensor designated as secondary for a first portion of the selected network region is designated as primary for a second portion of the selected network region;
   (c) determining a collection agent for the selected network region, the collection agent being operable to collect scan data from the plurality of wireless sensors;
   (d) communicating an indicator of the determined collection agent to the plurality of wireless network sensors in the network region; and
   (e) receiving scan data for the selected network region from the collection agent, wherein the received scan data is derived at least in part from data monitored by a wireless network sensor with a primary designation for that network region.

2. The method of claim 1, and further comprising the step of (f) communicating the selected designation to the wireless network sensor for which the designation was selected.

3. The method of claim 1, and further comprising the step of (f) receiving network configuration information and wherein the step of (a) dynamically identifying the plurality of wireless network sensors uses the received network configuration information.

4. The method of claim 1, and further comprising the step of (f) repeating steps (a) through (e) for a plurality of selected network regions.

5. The method of claim 4, and further comprising the step of (g) repeating steps (a) through (e) for a selected network region.

6. The method of claim 5, wherein step (g) occurs at periodic intervals or upon occurrence of an event.

7. The method of claim 6, and further comprising the step of (h) detecting a status change in one or more of the wireless network sensors in the plurality identified for the selected network region and wherein step (g) occurs in response to the detected status change.

8. The method of claim 6, and further comprising the step of (h) receiving a configuration request with respect to the selected region and wherein step (g) occurs in response to the received configuration request.

9. The method of claim 4, wherein step (f) occurs at periodic intervals or upon occurrence of an event.

10. The method of claim 9, and further comprising the step of (g) detecting a network status change and wherein (f) occurs in response to the detected network status change.

11. The method of claim 9, and further comprising the step of (g) receiving a configuration request and wherein step (f) occurs in response to the received configuration request.

12. The method of claim 1, and further comprising the step of (f) repeating steps (a) through (e) for the network region.

13. The method of claim 12, wherein step (f) occurs at periodic intervals or upon occurrence of an event.

14. The method of claim 13, and further comprising the step of (g) detecting a network status change and wherein (f) occurs in response to the detected network status change.

15. The method of claim 13, and further comprising the step of (g) receiving a configuration request and wherein step (f) occurs in response to the received configuration request.

16. The method of claim 1, wherein the identification step (a) comprises the steps of:
    (i) broadcasting a message to one or more wireless sensors;
    (ii) receiving acknowledgments from the one or more wireless sensors; and
    (iii) determining whether the wireless sensor is within the network region.

17. The method of claim 16, wherein the broadcasting step (i) comprises addressing the broadcast message to a predetermined logical port.

18. The method of claim 16, wherein the broadcasting step (i) comprises broadcasting the message over a wired network.

19. The method of claim 1, wherein the selecting step (b) selects the designation for each wireless sensor based upon sensor coverage area, functional capability, numerical priority of device address or combinations thereof.

20. The method of claim 1, wherein the collection agent determining step (c) determines one of the wireless sensors as to be the collection agent.

21. The method of claim 1, wherein the received scan data is further derived at least in part from data monitored by a wireless network sensor with a secondary designation for the network region.

22. The method of claim 1, wherein the determined collection agent for the selected network region is a selected wireless network sensor from the plurality of wireless network sensors in the selected network region.

23. The method of claim 22, wherein the selected wireless network sensor is one of the plurality of wireless network sensors for the selected region that has a primary designation.

24. One or more computer readable media storing instructions that upon execution by a computer cause the computer to perform the steps comprising:
    dynamically identifying a plurality of wireless network sensors in a selected network region;
    selecting for each of the wireless network sensors in the plurality a designation of primary or secondary with respect to the selected network region;
    determining a collection agent for the selected network region;
    communicating an indicator of the determined collection agent to the plurality of wireless network sensors in the network region; and
    receiving scan data for the selected network region at the collection agent from the plurality of wireless network sensors in the network region, wherein the received scan data is derived at least in part from data monitored by a wireless network sensor with a primary designation for that network region.

25. A system for managing wireless network sensors, the system comprising:

means for storing identifiers for a plurality of wireless network sensors for a selected network region, wherein associated with each identifier is a primary or a secondary designation;

means for broadcasting a message to one or more wireless sensors, for receiving acknowledgments from the one or more wireless sensors, for determining whether each of the one or more wireless sensors is within the selected network region, and for each wireless network sensor determined within the selected network region, storing an identifier of that wireless network sensor in the storing means;

means for determining a collection agent for the selected network region;

means for communicating an indicator of the collection agent determined by the determining means to each of the plurality of wireless network sensors for which identifiers are stored in the storing means; and means for receiving scan data for the selected network region from the collection agent, wherein the received scan data is derived at least in part from data monitored by a wireless network sensor with a primary designation for that network region.

26. A system for managing wireless network sensors, the system comprising:

a system data store capable of storing identifiers for a plurality of wireless network sensors for a selected network region and an identifier for a collection agent for the selected network region;

a communication interface allowing communication with a plurality of wireless network sensors;

a system processor in communication with the system data store and communication interface, wherein the system processor comprises one or more processing elements programmed or adapted to:

(a) broadcast a message to the plurality of wireless network sensors via the communication interface;

(b) receive acknowledgments from the plurality wireless network sensors;

(c) determine whether each wireless network sensor in the plurality is within the selected network region;

(d) designate each wireless network sensor determined to be within the selected network region as primary or secondary with respect to the selected network region, wherein each designation is based upon sensor coverage area, functional capability, numerical priority of device address or combinations thereof;

(e) determine a collection agent for the selected network region, the collection agent being operable to receive scan data from the plurality of wireless sensors and to sort the scan data based upon the designation associated with the wireless network sensors for a particular portion of the selected network region;

(f) communicate an indicator of the collection agent to each wireless network sensor determined to be within the selected network region; and (g) receive scan data for the selected network region from the collection agent, wherein the received scan data is derived at least in part from data monitored by a wireless network sensor with a primary designation for that network region.

27. The system of claim 26, and further comprising at least one wireless network sensor.

28. The system of claim 26, wherein the collection agent is a wireless network sensor from the plurality of wireless network sensors determined to be in the selected network region.

29. The system of claim 26, wherein the collection agent is the system for managing wireless network sensors.

* * * * *